(12) United States Patent
Takaoka

(10) Patent No.: US 9,615,670 B2
(45) Date of Patent: Apr. 11, 2017

(54) CORE MATERIAL FOR CUSHION, AND CUSHION

(71) Applicant: C-ENG CO., LTD., Gamagori-shi, Aichi (JP)

(72) Inventor: Nobuyuki Takaoka, Gamagori (JP)

(73) Assignee: C-ENG CO., LTD., Gamaggori-Shi, Aichi (JP)

( * ) Notice: Subject to any disclaimer, the term of this patent is extended or adjusted under 35 U.S.C. 154(b) by 0 days.

(21) Appl. No.: 14/904,995

(22) PCT Filed: Feb. 23, 2015

(86) PCT No.: PCT/JP2015/000885
§ 371 (c)(1),
(2) Date: Jan. 14, 2016

(87) PCT Pub. No.: WO2015/125497
PCT Pub. Date: Aug. 27, 2015

(65) Prior Publication Data
US 2016/0174725 A1 Jun. 23, 2016

(30) Foreign Application Priority Data

Feb. 23, 2014 (JP) .................................. 2014-032381
Mar. 15, 2014 (JP) .................................. 2014-052852

(51) Int. Cl.
A47C 27/00 (2006.01)
A47C 27/12 (2006.01)
(Continued)

(52) U.S. Cl.
CPC .......... *A47C 27/122* (2013.01); *A47C 27/006* (2013.01); *A47C 27/12* (2013.01);
(Continued)

(58) Field of Classification Search
CPC .......... A47C 27/00; A47C 27/12; A47C 27/15
(Continued)

(56) References Cited

U.S. PATENT DOCUMENTS 9,021,639 B1 * 5/2015 Lin ...................... A47C 27/121
5/727
2003/0092335 A1 * 5/2003 Takaoka ................. B29C 43/02
442/1
(Continued)

FOREIGN PATENT DOCUMENTS

JP 58-93270 U 6/1983
JP 7-189104 A 7/1995
(Continued)

*Primary Examiner* — Fredrick Conley
(74) *Attorney, Agent, or Firm* — Matthias Scholl, PC; Matthias Scholl

(57) ABSTRACT

An object is to provide a hygienic cushion that has an adequate thickness to provide the repulsive force of or above a specified level and the body-holding property, is light in weight, has excellent air permeability and is washable with water. The core material for cushion 1 comprising the three-dimensional net-like structure, which is comprised of a polyethylene thermoplastic resin, a polyester thermoplastic elastomer or a mixture of a polyethylene thermoplastic resin and a polyethylene thermoplastic elastomer. The three-dimensional net-like structure has a first layer that includes a thermoplastic resin and a second layer that is stacked on a single surface or both surfaces of the first layer and includes a thermoplastic resin different from the thermoplastic resin of the first layer. The three dimensional net-like structure has an impact resilience of not lower than 13 cm, a hysteresis loss of not higher than 34% and not lower than 13%, and a thermal expansion rate of 0 to 8% in the longitudinal direction before and after a hot-air drying test that is performed at a temperature of 90° C. for 30 minutes with regard to the polyethylene thermoplastic resin, that is per- (Continued)

formed at a temperature of 130° C. for 30 minutes with regard to the polyester thermoplastic elastomer and that is performed at a temperature of 90° C. for 30 minutes with regard to the mixture of the polyethylene thermoplastic resin and the polyethylene thermoplastic elastomer.

13 Claims, 29 Drawing Sheets

(51) Int. Cl.
| | |
|---|---|
| D04H 3/16 | (2006.01) |
| D04H 3/03 | (2012.01) |
| B32B 5/18 | (2006.01) |
| B32B 7/02 | (2006.01) |
| B32B 27/08 | (2006.01) |
| B32B 27/20 | (2006.01) |
| B32B 27/30 | (2006.01) |
| B32B 27/32 | (2006.01) |
| B32B 27/36 | (2006.01) |
| B32B 27/40 | (2006.01) |
| A61G 7/057 | (2006.01) |

(52) U.S. Cl.
CPC ............ *A47C 27/127* (2013.01); *A61G 7/057* (2013.01); *A61G 7/05715* (2013.01); *B32B 5/18* (2013.01); *B32B 7/02* (2013.01); *B32B 27/08* (2013.01); *B32B 27/20* (2013.01); *B32B 27/306* (2013.01); *B32B 27/32* (2013.01); *B32B 27/36* (2013.01); *B32B 27/40* (2013.01); *D04H 3/03* (2013.01); *D04H 3/16* (2013.01); *B32B 2262/02* (2013.01); *B32B 2266/0278* (2013.01); *B32B 2270/00* (2013.01); *B32B 2274/00* (2013.01); *B32B 2307/724* (2013.01)

(58) Field of Classification Search
USPC .................................. 5/739–740, 727, 655.9
See application file for complete search history.

(56) References Cited

U.S. PATENT DOCUMENTS

| | | | |
|---|---|---|---|
| 2015/0104604 A1* | 4/2015 | Rock ....................... | B32B 27/08 428/86 |
| 2016/0157628 A1* | 6/2016 | Khambete ............ | A47C 27/122 5/652 |

FOREIGN PATENT DOCUMENTS

| | | |
|---|---|---|
| JP | 7-300757 A | 11/1995 |
| JP | 8-336443 A | 12/1996 |
| JP | 11-169050 A | 6/1999 |
| JP | 2001-328153 A | 11/2001 |
| JP | 2003-62029 A | 3/2003 |
| JP | 2003-250666 A | 9/2003 |
| JP | 2004-173828 A | 6/2004 |
| JP | 2004-180977 A | 7/2004 |
| JP | 2005-312649 A | 11/2005 |
| JP | 2008-113798 A | 5/2008 |
| JP | 2011-31456 A | 2/2011 |
| JP | 2012-111826 A | 6/2012 |

* cited by examiner

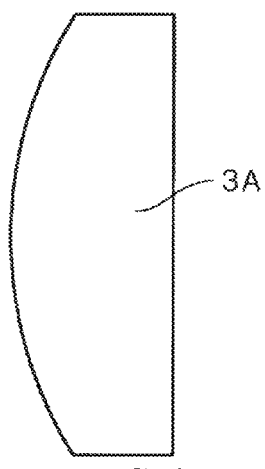  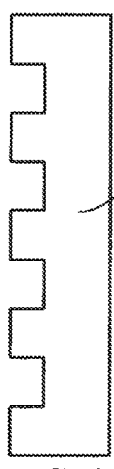 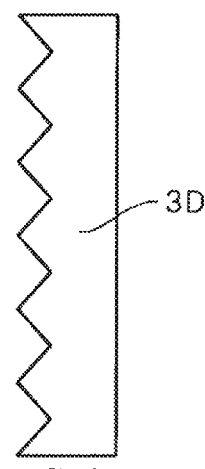
FIG. 4A　　FIG. 4B　　FIG. 4C　　FIG. 4D
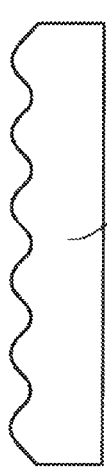  
FIG. 4E　　FIG. 4F　　FIG. 4G

FIG. 9B  FIG. 9C

CORE MATERIAL FOR CUSHION, AND CUSHION

TECHNICAL FIELD

The present invention relates to a core material for cushion that utilizes a three-dimensional net-like structure, as well as cushions produced by covering the core material with various covers and cushions for medical care.

BACKGROUND ART

A three-dimensional net-like structure formed by bending molten filaments of a synthetic resin material extruded from multi-hole nozzle in random coil shape to be welded to one another and solidified is conventionally used as a core material for cushion.

The cushion, for example, mattress is required to satisfy various needs, such as the recycling efficiency and the low cost, in addition to various conditions for proving a comfortable sleep, for example, the elasticity, the adequate repulsive force, the good maintenance property, vibration damping property, quietness, air permeability and light. It is difficult, however, that the single three-dimensional net-like structure satisfies all these physical properties. A mattress has been proposed to make one surface soft and the other surface hard by stacking two three-dimensional net-like assemblies having different bending densities (Patent Literature 1 and Patent Literature 2). Patent Literature 1, however, does not take into account the lightness and the air permeability and does not teach concrete examples of the material. Patent Literature 2, on the other hand, changes the pitch of holes arrayed in a longitudinal direction of a nozzle in each divisional area, so as to change the density of ejected filaments and integrally mold a multi-density net-like structure. The material used is, however, only polyester elastomer.

A multi-layered net-like structure has been disclosed, in which a thermoplastic elastic resin layer and a thermoplastic non-elastic resin layer are stacked and fused to provide a stacked net-like body having substantially flattened surface, and a non-woven fabric made of continuous fiber is joined with a single surface of the stacked net-like body for the purpose of supporting and reinforcing (Patent Literature 3). This multi-layered net-like structure requires joining the non-woven fabric as the reinforcing layer for supporting the cushion material. This disclosure recommends using polyester for both the thermoplastic elastic resin layer and the thermoplastic non-elastic resin layer that are fused to or joined with each other in terms of recovery and recycling after wasting and avoids the use of polyolefin.

A layered cushion structure has been disclosed, in which a cushion material made of a fiber assembly is placed on a surface layer and a woven fabric providing small cavities for releasing heat and moisture is stacked as a back layer. The layered cushion structure has at least two layers of the cushion material made of the fiber assembly, and the hardness of the respective layers gradually decreases toward the surface layer (Patent Literature 4). This disclosure uses polyether ester elastomer for the cushion material and avoids the use of polyolefin.

A bed mattress has been proposed, in which a wadding layer (hard cotton layer) formed from double raschel knit is stacked on an upper surface of a cushion layer, and the entire surfaces are covered with a case (Patent Literature 5). Stacking the wadding layer provides the function of increasing the degree of freedom following the deformation pressure and moving the contact point supporting the compressive force even in response to a slight change. The cushion layer is a single layer and serves to receive a local external force transmitted from the wadding layer relieve the concentration of stress (enhance the body pressure dispersion property). This configuration is unlikely to provide the sufficient body-holding function and eliminate the uncomfortable sinking feeling. The disclosure suggests using polyester as the material for both the cushion layer and the wadding layer in terms of the recycling efficiency, the heat resistance and the durability. This means that the core material is substantially made of 100% polyester.

The techniques of Patent Literature 2 to Patent Literature 5 have the problem of a significant increase in total weight in order to ensure the repulsive force equivalent to polyolefin, reduce the uncomfortable sinking feeling due to excessive sink and provide the body-holding function.

Various techniques have been proposed for a three-dimensional net-like structure formed by conventional extrusion molding to have filaments partly tangled in loops and a two-surface or four-surface molding method of the three-dimensional net-like structure. One example is described in Patent Literature 6 in order to mold a three-dimensional net-like structure. A proposed method of molding a three-dimensional net-like structure presses down molten filaments made of or mainly made of a thermoplastic synthetic resin from a die equipped with a nozzle having a plurality of holes at an edge, makes the molten filament free fall between endless conveyors that are fully or partly submerged in water, and hauls off the filaments at a lower speed than the falling speed, so as to manufacture a three-dimensional net-like structure. The endless conveyors are arranged to face each other to form a specified shape (for example, quadrilateral) in a direction perpendicular to the extrusion direction. The interval between the endless conveyors facing each other is set to be narrower than the width of an assembly of extruded filaments. Two surfaces or four surfaces of the outer periphery of the filament assembly are brought in contact with the endless conveyors downstream and upstream of the location where the endless conveyors are submerged in water.

The prior art three-dimensional net-like structure has loops formed at random and is shrunk by application of heat. For example, in an application for a mattress, the cover is likely to be wrinkled by repeated high-temperature sterilization. This makes the user feel uncomfortable and may cause bedsore by long-term use. Especially shrinkage of the three-dimensional net-like structure in the longitudinal direction has significant effect and high likelihood of wrinkles.

Additionally, the prior art three-dimensional net-like structure is unlikely to exert the functions according to the characteristics of the human body. For example, in an application of a mattress, the human body has the natural adjustment function of performing posture control during sleep, stretching and changing the body position, relaxing the muscles and the body to equalize the load of the body and reset the body stress. The proposed three-dimensional net-like structure, however, has insufficient structural characteristics following the natural adjustment function. There are a diversity of needs for products using the three-dimensional net-like structure and needs for high quality of products. This causes a difficulty in satisfying both the diversity of needs to be fit for the characteristics of the human body and the needs for the high quality of products.

A cushion material made of urethane foam has excellent durability and body pressure dispersion property of a certain level and is conventionally employed for mattress. This cushion material, however, has a problem of low performance of absorbing shear force, which is noted as one cause of bedsore. Low-resilient urethane foam has been proposed as the material having excellent performance of absorbing shear force. The low-resilient urethane foam, however, has low air permeability, in addition to difficulty in roll-over and a temperature-dependent change in hardness.

Using urethane having the open cell foam for a mattress has been proposed (Patent Literature 7). Patent Literature 7 describes that impregnating the urethane having the open cell foam with a resin having pressure-sensitive adhesiveness provides the excellent performance for trapping and collecting ticks. This urethane, however, originally has low repulsive force, so that even increasing the thickness does not provide the sufficient functions as a mattress.

A layer-structured mattress formed from urethane foam has been proposed, in which a lower layer is made of high-density urethane foam, a middle layer is made of low-resilient urethane foam and an upper layer is made of filter foam having the open cell structure (Patent Literature 8 and Patent Literature 9). This mattress takes into account the repulsive property and the body-holding function but uses the urethane foam of low air permeability for the lower layer and the middle layer. This is likely to cause sweating during sleep and is undesirable in terms of sanitation. A proposed technique to solve this problem has air holes provided in a low-resilient mattress (Patent Literature 10). This technique is, however, insufficient for release of heat and vapor through the side face of the mattress and intake of the outside air.

A three-dimensional net-like structure formed by bending a plurality of molten filaments in random coil shape to be thermally fused to one another has been proposed as an alternative of the urethane foam having low water permeability and likeliness of sweating (Patent Literature 5). Patent Literature 5 has proposed a double raschel knit joined with or stacked on a single surface or respective surfaces of the three-dimensional net-like structure.

CITATION LIST

Patent Literature

Patent Literature 1: JU S58-93270A
Patent Literature 2: JP H07-189104A
Patent Literature 3: JP H07-300757A
Patent Literature 4: JP 2011-031456A
Patent Literature 5: JP H08-336443A
Patent Literature 6: JP 2001-328153A
Patent Literature 7: JP H11-169050A
Patent Literature 8: JP 2004-173828A
Patent Literature 9: JP2004-180977A
Patent Literature 10: JP 2005-312649A

SUMMARY OF INVENTION

Technical Problem

An object of the invention is to provide a cushion that provides repulsive force of or above a specified level, is light in weight, is readily handled and has sufficient heat resistance in terms of sanitation and sterilization.

Another object of the invention is to provide a configuration that is thermally expandable in a longitudinal direction and additionally has a hysteresis loss and an elastic property fit for the characteristics of the human body, thus satisfying a diversity of needs for the quality.

Another object of the invention is to provide a hygienic cushion that has an adequate thickness to provide repulsive force of or above a specified level and the body-holding property, is light in weight, has excellent air permeability and is washable with water.

Solution to Problem

By taking into account the above problems, according to one aspect of the invention, there is provided a core material for cushion comprising a three-dimensional net-like structure in a plate-like form that is formed by spirally tangling a plurality of filaments, which are made of or mainly made of a thermoplastic resin as a raw material, at random and partially bonding the tangles by heat, wherein the three-dimensional net-like structure has a first layer that includes a thermoplastic resin and a second layer that is stacked on a single surface or both surfaces of the first layer and includes a thermoplastic resin different from the thermoplastic resin of the first layer, wherein the thermoplastic resin of the first layer has a higher melt temperature than the thermoplastic resin of the second layer, the first layer or the second layer forms the three-dimensional net-like structure that has a longitudinal direction corresponding to an extrusion direction, a lateral direction and a thickness direction perpendicular to the extrusion direction and is comprised of a polyethylene thermoplastic resin, a polyester thermoplastic elastomer or a mixture of a polyethylene thermoplastic resin and a polyethylene thermoplastic elastomer, wherein the three-dimensional net-like structure has an impact resilience of not lower than 13 cm, a hysteresis loss of not higher than 34% and not lower than 13%, and a thermal expansion rate of 0 to 8% in the longitudinal direction before and after a hot-air drying test that is performed at a temperature of 90° C. for 30 minutes with regard to the polyethylene thermoplastic resin, that is performed at a temperature of 130° C. for 30 minutes with regard to the polyester thermoplastic elastomer and that is performed at a temperature of 90° C. for 30 minutes with regard to the mixture of the polyethylene thermoplastic resin and the polyethylene thermoplastic elastomer. Forming the three-dimensional net-like structure to have stacked layers of different materials provides a low-cost bed mattress that has the adequate body-holding function, is light in weight and is readily handled. In this configuration, the layer having relatively high heat resistance is placed on the outer side. This configuration suppresses deterioration of the characteristics of the first layer even in the case where the three-dimensional net-like structure is heated to high temperature for the purpose of sterilization, heat retention and the like. The three-dimensional net-like structure of this aspect is an excellent three-dimensional net-like structure that has a low hysteresis loss, softness and high repulsive characteristic and provides an elastic property fit for the characteristics of the human body. These excellent properties are fit for the characteristics of the human body to meet a diversity of needs for the elastic properties of products and needs for the high quality of products. This accordingly provides a three-dimensional net-like structure suitable for a cushion material or a surface material used in healthcare products, beddings, furniture, vehicle sheets and the like. For example, in an application of a mattress for medical care, the adequate elastic property of the three-dimensional net-like structure matches the natural adjustment functions of the human body during sleeping to adequately suppress bedsore and the like and assist the patient to sit up. The caretaker takes advantage of the repulsive force of the mattress to reposition the patient with less effort. The hardness of the mattress may be changed according to the area of the mattress. Additionally, the three-dimensional net-like structure has thermal expansion characteristic in the longitudinal direction. In an application for a mattress, this advantageously suppress shrinkage of the mattress and wrinkles of the cover even in the case of high-temperature sterilization, as well as bedsore due to wrinkles. The three-dimensional net-like structure of this aspect is readily sterilized with heat and readily dried and is thus unlikely to cause hospital-acquired infection. The three-dimensional net-like structure provided is suitable to produce a cushion material required for medical treatment and care.

It is preferable that the first layer includes a polyolefin resin, and the second layer includes a polyester elastomer and/or polyurethane elastomer. In this configuration, the layer having relatively high heat resistance is placed on the outer side. This configuration suppresses deterioration of the characteristics of the polyolefin resin layer even in the case where the three-dimensional net-like structure is heated to high temperature for the purpose of sterilization, heat retention and the like. Molto filler, urethane, hard cotton and the like may be used for the second layer, in place of the polyester elastomer and/or polyurethane elastomer. It is preferable to integrate the polyester elastomer with a cushion.

The core material may be substantially comprised of the three-dimensional net-like structure. This simplifies the manufacturing process and eliminates the need for separately providing a moisture-absorbing and moisture-desorbing fibrous layer or a wadding layer. This reduces the component cost and the manufacturing cost and additionally eliminates the need for removing the separate material joined with the three-dimensional net-like structure for recovery and recycling.

It is preferable that the layer including the polyolefin resin has a thickness of not less than 8 mm and less than 250 mm, and the layer including the polyester elastomer and/or polyurethane elastomer has a thickness of 3 mm to 160 mm. Controlling the thickness to this range maximizes the characteristics of the two materials, i.e., the polyester or polyurethane and the polyethylene and reduces the noise during roll-over, change in body position, and the like.

According to another aspect of the invention, in the core material for cushion, at least a partial area on a side of the core material for cushion that faces the second layer is covered with an air-permeable cover. This take advantage of the excellent air permeability of the three-dimensional net-like structure placed inside.

According to another aspect of the invention, in a cushion for medical area comprising the core material for cushion, at least a partial area on a side of the core material for cushion that faces the second layer is covered with a water-impermeable material. A patient who lies on a bed for a long time period during long-term care at home or in hospital suffers from constriction of blood flow through capillaries due to local compression in the body and often has bedsore caused by local necrosis of cells in the compressed site (mainly bony prominence). Using the core material of the above aspect provides a body pressure dispersion mattress effective for suppressing the local compression of the body and provides a cushion suitable as a posture holding device for holding and fixing the whole body or part of the body of a patient during operation in orthopedics and surgery. Covering the core material of the above aspect with a water-impermeable sheet or cover allows for in-bed bath required in terms of sanitation.

In view of the above problems, the invention provides a core material for cushion, comprising a three-dimensional net-like structure that is formed by spirally tangling filaments, which are made of or mainly made of a polyolefin resin, a polyester elastomer and/or polyurethane elastomer, or a mixture of a polyethylene thermoplastic resin and a polyethylene thermoplastic elastomer as a raw material, at random and partially bonding the tangles by heat, and a soft urethane foam that is stacked on a single surface or both surfaces of the three-dimensional net-like structure and has an open cell foam and/or a continuous space. Stacking the soft urethane foam having the open cell foam and/or the continuous space protects the body side in the case of lying on the side and provides soft and comfortable sleep. This prevents deterioration of the characteristics of the lower three-dimensional net-like structure layer even in combined use with an electric blanket or a hot-water bottle for the purpose of heat retention and cold protection in winter, improves the heat resistance and uniformly warms the lying surface by the open cell structure. This also produces a cushion that suppresses sweating and provides coolness in summer, in combination with the excellent air permeability of the three-dimensional net-like structure.

The three-dimensional net-like structure may be configured to have a longitudinal direction corresponding to an extrusion direction, a lateral direction and a thickness direction perpendicular to the extrusion direction and is comprised of a polyethylene thermoplastic resin, a polyester thermoplastic elastomer or a mixture of a polyethylene thermoplastic resin and a polyethylene thermoplastic elastomer. The three-dimensional net-like structure may be configured to have an impact resilience of not lower than 13 cm and a hysteresis loss of not higher than 34% and not lower than 13%. The three-dimensional net-like structure may be configured to have a thermal expansion rate of 0 to 8% in the longitudinal direction before and after a hot-air drying test that is performed at a temperature of 90° C. for 30 minutes with regard to the polyethylene thermoplastic resin, that is performed at a temperature of 130° C. for 30 minutes with regard to the polyester thermoplastic elastomer and that is performed at a temperature of 90° C. for 30 minutes with regard to the mixture of the polyethylene thermoplastic resin and the polyethylene thermoplastic elastomer.

The three-dimensional net-like structure preferably has a thermal expansion rate of 0 to 8% in the lateral direction before and after the hot-air drying test that is performed at the temperature of 90° C. for 30 minutes with regard to the polyethylene thermoplastic resin, and that is performed at the temperature of 130° C. for 30 minutes with regard to the polyester thermoplastic elastomer.

It is preferable that the three-dimensional net-like structure has an anisotropic thermal expansion characteristic providing different thermal expansion rates in the longitudinal direction and in the lateral direction. The anisotropic thermal expansion characteristic having different thermal expansion rates in the longitudinal direction and in the lateral direction enables the three-dimensional net-like structure to be fit for its application and the characteristics of the human body in the application.

It is preferable that the three-dimensional net-like structure has an impact resilience change rate of not higher than 20% after a repeated load test.

It is preferable that the three-dimensional net-like structure has an apparent density of 0.025 g/cm$^3$ to 0.2 g/cm$^3$, a thickness of 5 mm to 500 mm in each layer and a filament diameter of 0.1 mm to 1.5 mm.

It is preferable that the polyethylene thermoplastic resin is selected from the group consisting of polyethylene, an ethylene/α-olefin copolymer resin that is mainly made of ethylene and an α-olefin containing 3 or more carbon atoms, and an ethylene/vinyl acetate copolymer resin.

It is preferable that the mixture of the polyethylene thermoplastic resin and the polyethylene thermoplastic elastomer is a mixture of an ethylene/α-olefin copolymer resin, which is mainly made of ethylene and an α-olefin containing 3 or more carbon atoms, and the polyethylene thermoplastic elastomer, and a content of the polyethylene thermoplastic elastomer in the mixture is not higher than 45% in weight ratio.

It is preferable that the three-dimensional net-like structure has a plurality of surfaces, among which two surface, three surfaces or four surfaces are molded to have a profiled shape.

In one aspect, the soft urethane foam has an impact resilience of 25% to 85% measured in conformity with JIS K6400 as one form of the soft urethane foam. The impact resilience in the above range provides, in combination with the lower three-dimensional net-like structure layer, the repulsive force adequate for the lying surface.

In one aspect, the soft urethane foam has an open cell foam size of not lower than 5 cells/25 mm and not higher than 40 cells/25 mm measured in conformity with JI K6400-1, Appendix 1 as one form of the soft urethane foam. The open cell foam size in the above range satisfies both the effect of uniformly warming the entire lying surface and the effect of providing soft and comfortable sleep.

The soft urethane foam is a polyether urethane foam. Using the polyether urethane foam is unlikely to cause water absorption and hydrolysis.

According to a further aspect of the present invention, there is provided a cushion comprising the core material for cushion, wherein at least a partial area on a side of the core material for cushion that faces the soft urethane foam is covered with an air-permeable cover. This takes advantage of the excellent air permeability of the core material for cushion.

According to a yet further aspect of the present invention, there is provided a cushion for medical area comprising the core material for cushion, wherein at least a partial area on a side of the core material for cushion that faces the soft urethane foam is covered with a water-impermeable material. A patient who lies on a bed for a long time period during long-term care at home or in hospital suffers from constriction of blood flow through capillaries due to local compression in the body and often has bedsore caused by local necrosis of cells in the compressed site (mainly bony prominence). Using the core material of the above aspect provides a body pressure dispersion mattress effective for suppressing the local compression of the body and provides a cushion suitable as a posture holding device for holding and fixing the whole body or part of the body of a patient during operation in orthopedics and surgery. Covering the core material of the above aspect with a water-impermeable sheet or cover allows for sterilization with hot water and in-bed bath required in terms of sanitation.

Advantageous Effects of Invention

The above aspects of the invention provide a cushion that provides repulsive force of or above a specified level, is light in weight, is readily handled and has sufficient heat resistance in terms of sanitation, sterilization, and heat retention in combined use with an electric blanket or a hot-water bottle. This provides a significant potential in various industries. The above aspects of the invention have the thermal expansion characteristic in the longitudinal direction and in the lateral direction and thereby suppress shrinkage of the cushion and wrinkles of the cover even in the case of high-temperature sterilization, as well as bedsore due to wrinkles. The above aspects of the invention have the anisotropic thermal expansion characteristic having different thermal expansion rates in the longitudinal direction and in the lateral direction. This enables the three-dimensional net-like structure to be fit for its application and the characteristics of the human body in the application. Additionally, the above aspects of the invention have the low hysteresis loss, the softness and high repulsion characteristic and thereby provide the elastic property fit for the characteristics of the human body. This accordingly meet a diversity of needs for the elastic properties of products and needs for the high quality of products.

Additionally, the aspects of the invention provide a hygienic cushion that has an adequate thickness to provide the repulsive force of or above a specified level and the body-holding property, is light in weight, has excellent air permeability and is washable with water. This provides a significant potential in various industries.

BRIEF DESCRIPTION OF DRAWINGS

FIGS. 4A to 4G are sectional views illustrating respective layers of a core material for cushion according to a third embodiment;

FIG. 9B is a side view illustrating the apparatus for manufacturing the core material for cushion; FIG. 9C is a side view illustrating an apparatus for manufacturing a core material for cushion of another configuration in the case of four-surface molding.

DESCRIPTION OF EMBODIMENTS

The following describes embodiments of the present invention with reference to drawings.

Figure 1:
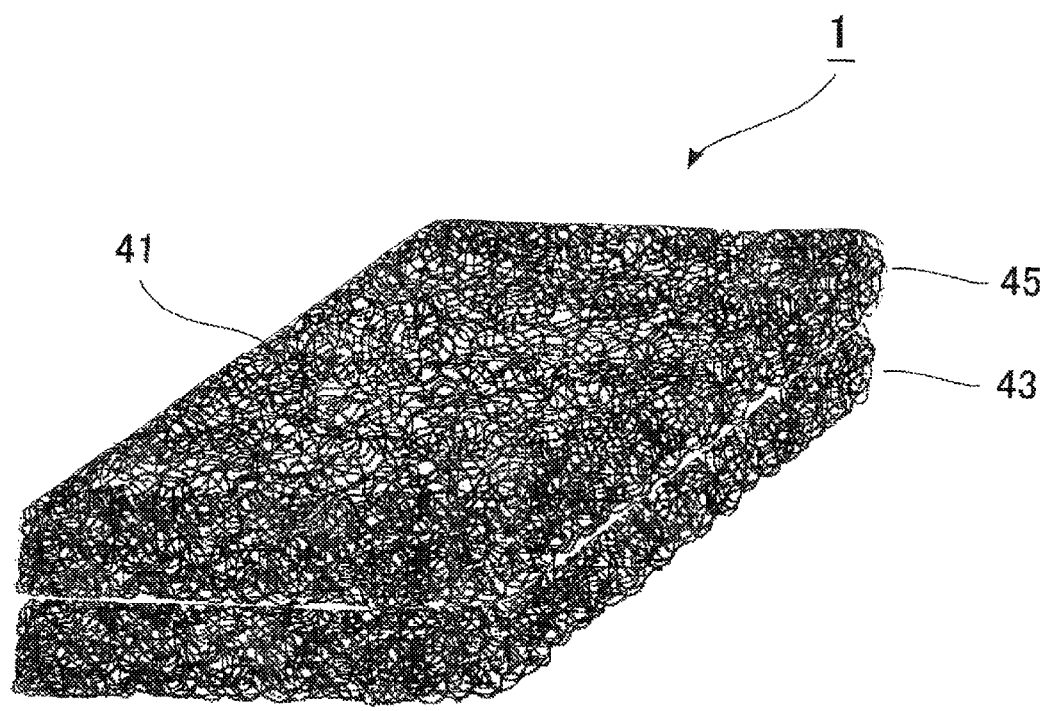
FIG. 1 is a perspective view illustrating a core material for cushion according to a first embodiment of the invention.
Figure 2A:
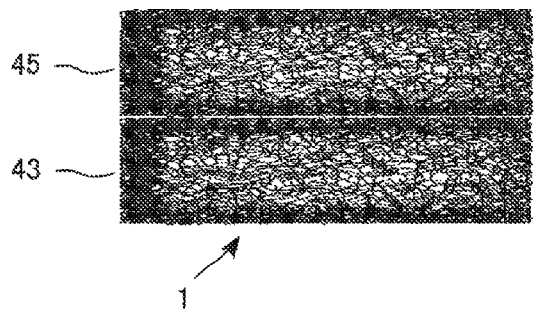
FIG. 2A is a vertical sectional view illustrating the core material for cushion according to the first embodiment of the invention.

Core materials for cushion according to first to ninth embodiments are described first. A core material for cushion 1 according to a first embodiment is comprised of a three-dimensional net-like structure 41 in a plate-like form that is made of or mainly made of a thermoplastic resin as a raw material and is formed by spirally tangling a plurality of filaments at random and partially bonding the tangles by heat as shown in FIG. 1 and FIG. 2A. The three-dimensional net-like structure 41 is configured by stacking a layer 45 including a polyester elastomer and/or a polyurethane elastomer on one surface of a layer 43 including a polyolefin resin as the core or the base.

The sectional structure of filaments is solid in this embodiment but may be hollow. The hollow filaments are preferable since the air is enclosed in the tubular bodies to provide the properties of air spring and special cushioning properties. This also suppresses buckling. Inclusion of the air maintains the rigidity of the three-dimensional structure. The hollow configuration may be continuous or discrete. In one example, one filament may be configured to include both a hollow portion and a filled portion. The mixing ratio of solid filaments to hollow filaments is preferably solid:hollow=10 to 80:90 to 20. A preferable configuration uses hollow filaments in a middle portion and covers the outer periphery of the hollow filaments with solid filaments to provide the good touch sensation.

The cross section of filaments is in a circular shape in this embodiment but may be in an atypical shape such as triangular shape, Y shape or star shape.

A three-dimensional net-like structure used for respective layers (first layer and second layer) is formed by tangling a plurality of filaments at random in loops and thermally welding the tangles. The three-dimensional net-like structure has a three-dimensional ladder-like sparse-dense configuration having sparse portions of a lower bulk density and dense portions of a higher bulk density arranged alternately in an extruding direction during manufacture.

The three-dimensional net-like structure may have any configuration, for example, a structure having harder edges, a structure including a surface layer and a rear face layer having different thicknesses, a structure including a surface and a rear face having different softness levels, and an internally pierced structure.

The respective layers 43 and 45 of the core material for cushion 1 of the invention preferably has hysteresis losses of not higher than 34%. The lower hysteresis loss means the higher return force provided at the earlier time after a release. The hysteresis loss of lower than 34% ensures the high restoring force and preferably provides the softness and the high resilience which the invention aims for. The hysteresis loss of higher than 34% undesirably leads to the delayed and low elastic repulsive force. The hysteresis loss is more preferably 15 to 34% and is furthermore preferably 20% to 34%.

The apparent density of the respective layers 43 and 45 of the core material for cushion 1 is an important factor to provide the softness and the high resilience and is designed as appropriate. The apparent density is preferably 0.025 g/cm$^3$ to 0.2 g/cm$^3$ and is more preferably 0.04 g/cm$^3$ to 0.09 g/cm$^3$. The apparent density of lower than 0.025 g/cm$^3$ does not maintain the shape, while the apparent density of higher than 0.20 g/cm$^3$ is unsuitable for mattress.

The layers 43 and 45 of the invention are three-dimensional spring structures formed by welding randomly looped continuous filaments in the molten state, which have filament diameter (diameter) of 0.3 mm to 1.5 mm and are made of a thermoplastic resin or a thermoplastic elastomer. The filaments may be in irregular shape or in hollow shape. The filament diameter is, however, an important factor to provide the soft touch. The excessively small filament diameter does not maintain the hardness required for the cushioning properties, while the excessively large filament diameter provides the too much hardness. The filament diameter is thus to be set in an adequate range.

The layers 43 and 45 preferably have loop lengths of 5 to 50 mm or especially 8 to 15 mm. The loops on the surface may be laid down according to the purpose.

The thicknesses of the respective layers 43 and 45 are significantly related to the softness and the high resilience and are preferably 5 mm to 500 mm, more preferably 10 to 150 mm and furthermore preferably 30 to 110 mm. The thickness of less than 5 mm undesirably leads to the low resilience, while the thickness of greater than 500 mm undesirably leads to the excessively high resilience.

In the case of mattress, cushion or the like, the dimensions of the layers 43 and 45 may be, for example, 300 to 2000 mm in width, 300 to 2500 mm in length and 2 to 120 mm in height.

In the three-dimensional net-like structure of the invention, the thermal expansion rate of the polyethylene thermoplastic resin in the longitudinal direction and in the lateral direction before and after a hot-air drying test at 90° C. is not higher than 8% and is preferably not higher than 3%. The thermal expansion rate of higher than 8% at 90° C. undesirably causes a difficulty in placing the three-dimensional net-like structure in the cover. The thermal expansion rate of lower than 0% before and after the hot-air drying test at 90° C. undesirably causes shrinkage of the product during high temperature sterilization and makes the cover creased. In the three-dimensional net-like structure of the invention, the thermal expansion rate of the polyester thermoplastic elastomer in the longitudinal direction and in the lateral direction before and after a hot-air drying test at 130° C. is not higher than 8% and is preferably not higher than 3%. The thermal expansion rate of higher than 8% at 130° C. undesirably causes a difficulty in placing the three-dimensional net-like structure in the cover. The thermal expansion rate of lower than 0% before and after the hot-air drying test at 130° C. undesirably causes shrinkage of the product during high temperature sterilization and makes the cover creased.

In the case where the three-dimensional net-like structure of the invention is used for the cushion material, the resin used, the filament diameter, the loop diameter, the surface layer, the bulk density and the shape should be adequately selected according to the purpose of use and the location used. For example, in the case where an adequate material for the preference of hardness in a country is selected and is used for a layer, the bulk density should differ between a surface layer and an intermediate layer. The three-dimensional net-like structure may be molded with a die to a configuration suitable for the purpose of use to such an extent that does not damage the three-dimensional configuration and used for car seat, airplane seat, boat seat, chair and furniture. In order to satisfy required performances, the three-dimensional net-like structure may be used in combination with a hard cushion material, polyurethane or non-woven fabric. The material may be treated to have fire retardancy, non-flammability, antibiotic property and color.

With regard to the material of this three-dimensional net-like structure, it is preferable to use a polyethylene thermoplastic resin for the layer 43 and a polyester thermoplastic elastomer for the layer 45. The stacking sequence may be upside down.

The polyethylene thermoplastic resin of the layer 43 is preferably a low-density polyethylene resin having the bulk density of not higher than 0.94 g/cm$^3$ and is more preferably an ethylene/α-olefin copolymer resin of ethylene and a three or more carbon atom-containing α-olefin. Using the material having the bulk density of higher than 0.94 g/cm$^3$ undesirably provides the hard cushion material. The bulk density is more preferably not higher than 0.935 g/cm$^3$ and is furthermore preferably not higher than 0.91 g/cm$^3$. The lower limit of the bulk density is preferably not lower than 0.8 g/cm$^3$ and is more preferably not lower than 0.85 g/cm$^3$ in terms of maintaining the strength.

The polyolefin resin included in the layer 43 is preferably an ethylene/α-olefin copolymer and is more preferably a copolymer of ethylene and a three or more carbon atom-containing α-olefin described in JP H06-293813A. Examples of the three or more carbon atom-containing α-olefin include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pendadecene, 1-hexadecene, 1-heptadecene, 1-octadecene, 1-nonadecene and 1-eicosene. Preferable are 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pendadecene, 1-hexadecene, 1-heptadecene, 1-octadecene, 1-nonadecene and 1-eicosene. Two or more of these α-olefins may be used. The content of the α-olefin in the copolymer is generally 1 to 40% by weight.

This copolymer may be obtained by copolymerizing ethylene with an α-olefin using a catalyst system including a specific metallocene compound and an organometallic compound as the base configuration.

The polyester elastomer and/or polyurethane elastomer included in the layer 45 is preferably a polyester thermoplastic elastomer and is more preferably a thermoplastic polyester elastomer block copolymer (A) including a high melting-point crystalline polymer segment (a) mainly made of a crystalline aromatic thermoplastic polyester elastomer unit and a low melting-point polymer segment (b) mainly made of an aliphatic polyether unit and/or an aliphatic thermoplastic polyester elastomer unit as main components.

Among thermoplastic elastomers, a polyester block copolymer (polyester elastomer) including a crystalline aromatic polyester unit as the hard segment and an aliphatic polyether unit such as poly(alkylene oxide) glycol and/or an aliphatic polyester unit such as polylactone as the soft segment has excellent low-temperature and high-temperature properties and has rigidity of relatively low temperature dependency.

The bulk density of the three-dimensional net-like structure using the polyester thermoplastic elastomer as raw material is preferably 1.01 to 1.60 g/cm$^3$ and is more preferably 1.05 to 1.20 g/cm$^3$.

The polyester thermoplastic elastomer is preferably used in terms of the decreased temperature dependency in a wide temperature range. The polyester thermoplastic elastomer includes a high melting-point crystalline polymer segment (a1) made of a crystalline aromatic polyester unit and a low melting-point polymer segment (a2) made of an aliphatic polyether unit and/or an aliphatic polyester unit as main components. The high melting-point crystalline polymer segment (a1) is a polyester mainly made of an aromatic dicarboxylic acid or its ester-forming derivative and a diol or its ester-forming derivative. Concrete examples of the aromatic dicarboxylic acid include terephthalic acid, isophthalic acid, phthalic acid, naphthalene-2,6-dicarboxylic acid, naphthalene-2,7-dicarboxylic acid, anthracene dicarboxylic acid, diphenyl-4,4'-dicarboxylic acid, diphenoxyethane dicarboxylic acid, 4,4'-diphenylether dicarboxylic acid, 5-sulfoisophathanic acid and sodium 3-sulfoisophthalate. The aromatic dicarboxylic acid is mainly used, but part of the aromatic dicarboxylic acid may be substituted as appropriate with an alicyclic dicarboxylic acid such as 1,4-cyclohexane dicarboxylic acid, cyclopentane dicarboxylic acid or 4,4'-dicyclohexyl dicarboxylic acid or with an aliphatic dicarboxylic acid such as adipic acid, succinic acid, oxalic acid, sebacic acid, dodecanedioic acid or dimer acid. Ester-forming derivatives of these dicarboxylic acids, for example, lower alkyl esters, aryl esters, carbonates and acid halides may be used similarly. Concrete examples of the diol are diols having the molecular weight of not higher than 400. For example, preferable are aliphatic diols such as 1,4-butanediol, ethylene glycol, trimethylene glycol, pentamethylene glycol, hexamethylene glycol, neopentyl glycol and decamethylene glycol and alicyclic diols such as 1,1-cyclohexanedimethanol, 1,4-dicyclohexanedimethanol and tricyclodecanedimethanol, and aromatic diols such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxyl)phenyl]sulfone, 1,1-bis[4-(2-hydroxyethoxy)phenyl]cyclohexane, 4,4'-dihydroxy-p-terphenyl and 4,4'-dihydroxy-p-quarterphenyl. Ester-forming derivatives of these diols, for example, acetylates and alkali metal salts may be used similarly. Two or more of these dicarboxylic acids and their derivatives or two or more of these diols and their derivatives may be used in combination. A preferable example of the high melting-point crystalline polymer segment (a1) is a poly(butylene terephthalate) unit derived from terephthalic acid and/or dimethyl terephthalate and 1,4-butanediol. A poly(butylene terephthalate) unit derived from terephthalic acid and/or dimethyl terephthalate and a poly(butylene isophthalate) unit derived from isophthalic acid and/or dimethyl isophthalate and 1,4-butanediol are also used preferably.

The low melting-point polymer segment (a2) of the polyester thermoplastic elastomer used in the invention is an aliphatic polyether and/or an aliphatic polyester. Examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymer of poly(propylene oxide) glycol and copolymer glycol of ethylene oxide and tetrahydrofuran. Examples of the aliphatic polyester include poly(ε-caprolactone), polyenantholactone, polycaprylolactone, polybutylene adipate and polyethylene adipate. Among these aliphatic polyethers and/or aliphatic polyesters, in terms of the elastic property of the resulting polyester block copolymer, preferably used are poly(tetramethylene oxide) glycol, ethylene oxide addition product of poly(propylene oxide) glycol, copolymer glycol of ethylene oxide and tetrahydrofuran, poly(ε-caprolactone), polybutylene adipate and polyethylene adipate. Among them, especially preferably used are poly(tetramethylene oxide) glycol, ethylene oxide addition product of poly(propylene oxide) glycol and copolymer glycol of ethylene oxide and tetrahydrofuran. The number-average molecular weight of the low melting-point polymer segment is preferably about 300 to 6000 in the copolymerized form.

The copolymerization amount of the low melting-point polymer segment (a2) in the polyester thermoplastic elastomer used in the invention is not specifically limited but is preferably 10 to 90% by weight, more preferably 30 to 85% by weight and furthermore preferably 50 to 80% by weight. The copolymerization amount of the low melting-point polymer segment (a2) of lower than 10% by weight provides the poor flexibility and poor bending fatigue resistance. The copolymerization amount of the low melting-point polymer segment (a2) of higher than 90% by weight, on the other hand, provides insufficient mechanical properties, insufficient high-temperature properties, insufficient oil resistance and insufficient chemical resistance.

The polyester thermoplastic elastomer used in the invention may be produced by any known method. Available methods include a method of polycondensing a reaction product by transesterification of a lower alcohol diester of dicarboxylic acid, an excess of low molecular-weight glycol and a low melting-point polymer segment component in the presence of a catalyst and a method of polycondensing a reaction product by esterification of a dicarboxylic acid, an excess of glycol and a low melting-point polymer segment component in the presence of a catalyst.

Any of the above block copolymers may be used alone or a mixture of two or more of the above block copolymers may be used.

Additionally, a mixture including a non-elastomer component or a copolymer including a non-elastomer component may also be used in the invention.

The polyurethane elastomer is not specifically limited but may be any elastic polymer having urethane bond in the main chain. The polyurethane elastomer may be, for example, a block copolymer including a hard segment comprised of a diisocyanate and a glycol and a soft segment comprised of a polyester, a polyether, a polycarbonate or an aliphatic polyol with a diisocyanate as appropriate. One or a mixture of two or more of polyurethane elastomers may be used. An antimicrobial, an incombustible material or a flame retardant may be mixed with the polyurethane elastomer as the raw material to provide a layer including the polyurethane elastomer with the corresponding function.

The melting point of the low-density polyethylene in the layer 43 is preferably 100° C. to 135° C. The melting point of the thermoplastic elastomer is preferably 155° C. or higher to maintain the heat durability and is more preferably 160° C. or higher to improve the heat durability. An antioxidant, a light-resistant agent or the like may be added as appropriate to improve the durability. Increasing the molecular weight of the thermoplastic resin is also effective to improve the heat durability and the permanent set resistance.

The following describes a measurement method and a measurement apparatus of the filament diameter decrease rate of the polyethylene resin. Capilograph 1D (manufactured by Toyo Seiki Seisaku-Sho, Ltd.) is used for the measurement apparatus of the filament diameter decrease rate. The raw material resin is extruded at an extrusion rate of 3 g/10 min by applying downward a pressure to a capillary having an inner diameter $D_1$ of 1.0 mm $\phi$ and a length of 10 mm at temperature of 190° C. The filaments of the extruded raw material resin are cooled down by an alcohol. $D_2$ represents a diameter of the filament cut at a cross section. The filament diameter decrease rate is calculated as $D_2/D_1$. The filament diameter decrease rate is measured at each shear rate of the raw material resin.

A measurement method and a measurement apparatus of the filament diameter decrease rate of the polyester thermoplastic elastomer are similar to those described above, except that the temperature is changed to 210° C.

The melt flow rate (hereinafter referred to as MFR) of the polyethylene resin is 3.0 to 35 g/10 min.

The filament diameter decrease rate of the polyethylene resin is preferably 0.93 to 1.16 at the shear rate of 24.3 $sec^{-1}$, 1.00 to 1.20 at the shear rate of 60.8 $sec^{-1}$, 1.06 to 1.23 at the shear rate of 121.6 $sec^{-1}$, 1.11 to 1.30 at the shear rate of 243.2 $sec^{-1}$, 1.15 to 1.34 at the shear rate of 608.0 $sec^{-1}$ and 1.16 to 1.38 at the shear rate of 1216 $sec^{-1}$.

The melt flow rate (hereinafter referred to as MFR) of the polyester thermoplastic elastomer is 3.0 to 35 g/10 min.

The filament diameter decrease rate of the polyester thermoplastic elastomer is preferably 1.10 to 1.38 at the shear rate of 60.8 $sec^{-1}$, 1.12 to 1.39 at the shear rate of 121.6 $sec^{-1}$, 1.15 to 1.42 at the shear rate of 243.2 $sec^{-1}$, 1.17 to 1.43 at the shear rate of 608.0 $sec^{-1}$ and 1.19 to 1.47 at the shear rate of 1216 $sec^{-1}$.

The continuous filaments of the thermoplastic resin used to form the three-dimensional net-like structure of the invention may be combined with another thermoplastic resin to a composite form in such a range that does not adversely affect the object of the invention. The composite form may be composite of filaments.

The three-dimensional net-like structured composite may be, for example, a sandwich-structure of elastomer layer/non-elastomer layer/elastomer layer, a two-layered structure of elastomer layer/non-elastomer layer and a composite structure in which a non-elastomer layer is placed partly in a center part in an elastomer layer of a matrix.

The three-dimensional net-like structure of the invention may be any adequately selected and multi-layered three-dimensional net-like structure to satisfy the required performances among various three-dimensional net-like structures, for example, those having different sizes of loops, those having different filament diameters, those having different compositions and those having different densities. Bonding or non-bonding of the cushion is designed according to the application and the relationship to the cover. In the composite or multi-layered structure using elastomer, the melting point becomes closer to the melting point of the non-elastomer resin. A plurality of extruding machines may be used to produce the composite or multi-layered structure.

Additionally, the three-dimensional net-like structure may be bonded and integrated with a case or a wadding layer to provide a seat cushion. A hard cushion (preferably made of elastomer-based thermally bonded fibers) is used as a wadding layer and is thermally bonded and integrated with a case to provide a cushion.

A core material for cushion 2 according to a second embodiment (shown in FIG. 2A) differs from the core material for cushion 1 according to the first embodiment by that a layer 45 including a polyethylene thermoplastic resin and a polyethylene thermoplastic elastomer is stacked instead of the layer 45 including the polyester elastomer and/or the polyurethane elastomer.

Figure 2E:
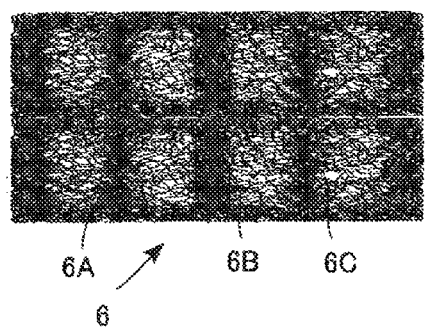
FIG. 2E is a vertical sectional view illustrating a core material for cushion according to a sixth embodiment.
Figure 2B:
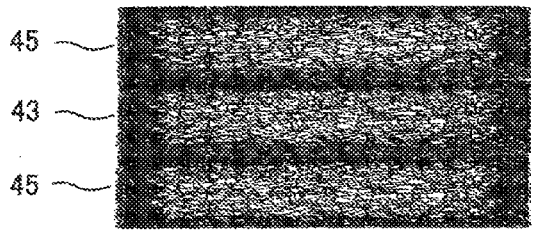
FIG. 2B is a vertical sectional view illustrating a core material for cushion according to a second embodiment.

The core material for cushion 2 according to the second embodiment (shown in FIG. 2B) differs from the core material for cushion 1 according to the first embodiment by that the layer 45 including the polyester elastomer and/or the polyurethane elastomer is stacked on both surfaces of the layer 43 including the polyolefin resin as the core or the base. Each layer is formed by four-surface molding to have flat surfaces. In the core material for cushion 1 according to the first embodiment, areas of predetermined depths inward from side faces are formed to have the higher density, and an inner middle area is formed to have the lower density. In other words, areas of predetermined depth inward from all the surfaces except the upper face and the bottom face are formed to have the higher density.

A core material for cushion 3 according to a third embodiment is configured such that each layer or at least one layer has a surface of an atypical shape or a polygonal shape. Examples of this configuration include a core material 3A having a convex surface (shown in FIG. 4A), a core material 3B having a concave surface (shown in FIG. 4B), a core material 3C having continuously formed concavo-convex surface (shown in FIG. 4C), a core material 3D having a jagged surface (shown in FIG. 4D), a core material 3E having a corrugated surface (shown in FIG. 4E), a core material 3F having curved corners (shown in FIG. 4F), a core material 3G having corners chamfered at a predetermined angle (45 degrees in the illustrated example) (shown in FIG. 4G) and their adequate combinations. A concavo/convex surface may be provided only on a lying surface in a layer having the lying surface. A concavo/convex surface may be formed in each layer, and the respective layers may be stacked such that the concavo/convex surfaces are opposed to each other. In the latter case, the respective layers may be stacked such that a convex surface of one layer is fit in a concave surface of the other layer or may be stacked such that convex surfaces come into contact with each other.

Figure 2F:
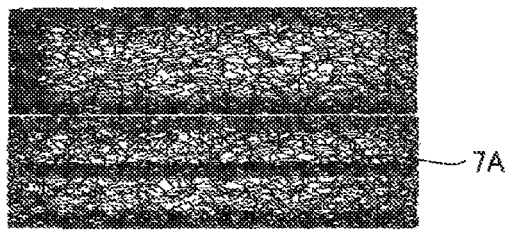
FIG. 2F is a vertical sectional view illustrating a core material for cushion according to a seventh embodiment.
Figure 2C:
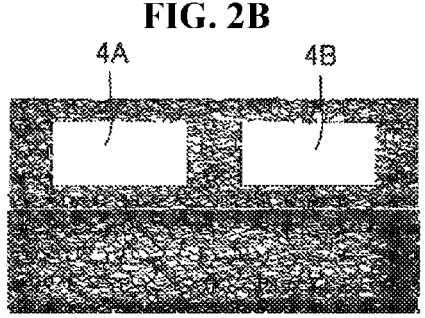
FIG. 2C is a vertical sectional view illustrating a core material for cushion according to a fourth embodiment.

A core material for cushion 4 according to a fourth embodiment (shown in FIG. 2C) is configured to have a single or a plurality of (two in the illustrated example) cavities 4A and 4B formed in one layer, in order to achieve further cost reduction.

Figure 2G:
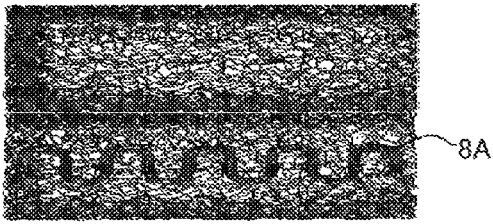
FIG. 2G is a vertical sectional view illustrating a core material for cushion according to an eighth embodiment.
Figure 2D:
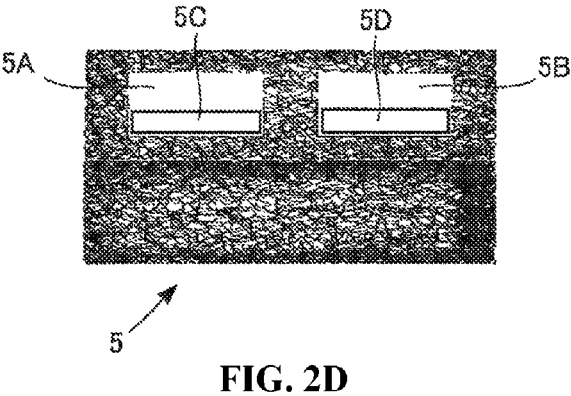
FIG. 2D is a vertical sectional view illustrating a core material for cushion according to a fifth embodiment.

A core material for cushion 5 according to a fifth embodiment (shown in FIG. 2D) is configured to have recycled members 5C and 5D of an identical material or different materials, for example, recycled veneer plates or recycled shredder residue plates, placed in cavities 5A and 5B which are formed in one layer similarly to the cavities 4A and 4B in the core material for cushion 4 of the fourth embodiment. The recycled plate members are placed for the purpose of improving the sound absorbing power and the cushioning properties.

A core material for cushion 6 according to a sixth embodiment (shown in FIG. 2E) is configured to have a single or a plurality of (three in the illustrated example) beam-like high density areas 6A, 6B and 6C formed at predetermined intervals by partly increasing the density in the thickness direction inside of each layer of the core material for cushion 1 of the first embodiment. This configuration improves the sound absorbing power, the cushioning properties and the impact resistance.

A core material for cushion 7 according to a seventh embodiment (shown in FIG. 2F) is configured to have a single or a plurality of (one in the illustrated example) high density area 7A formed by partly increasing the density in the width direction inside of the lower layer (first layer) of the core material for cushion 1 of the first embodiment. This configuration improves the sound absorbing power, the cushioning properties and the impact resistance.

A core material for cushion 8 according to an eighth embodiment (shown in FIG. 2G) is configured to have a corrugated high density area 8A in placed of the high density area of the seventh embodiment. This configuration improves the sound absorbing power, the cushioning properties and the impact resistance.

Figure 3A:
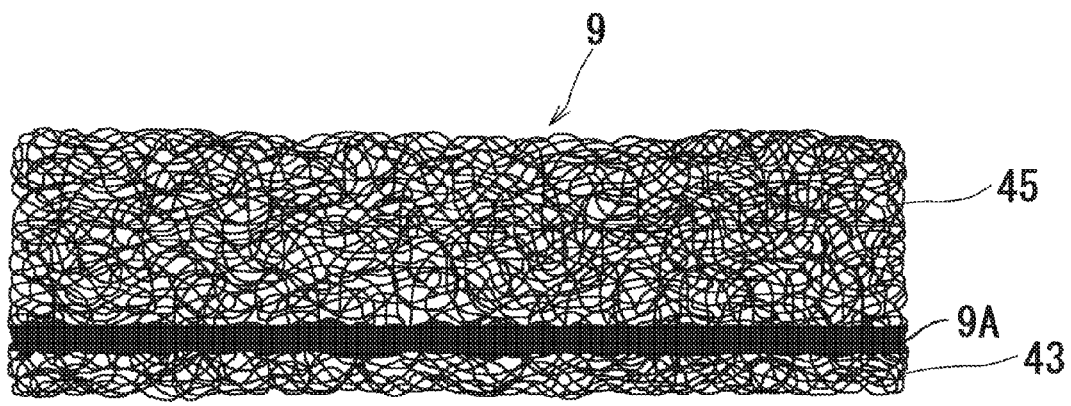
FIG. 3A is a vertical sectional view illustrating a core material for cushion according to a ninth embodiment.
Figure 11A:
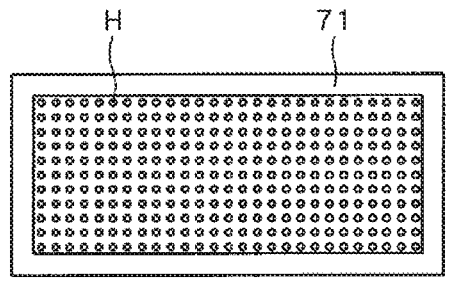
FIGS. 11A to 11H are plan views and a front view illustrating various modifications of a nozzle in a die.
Figure 11E:
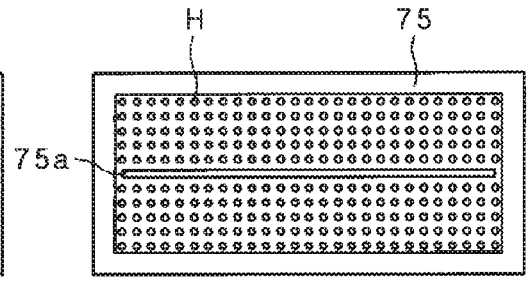

A core material for cushion 9 according to a ninth embodiment (shown in FIG. 3A) is configured by stacking the respective layers via a sheet 9A (area with no pores). This configuration improves the sound absorbing power, the cushioning properties and the impact resistance. The filaments (resin filaments) are tangled around the sheet 9A. The sheet 9A may be provided over the entire width as illustrated or may be provided partly, for example, in a center part. In the core material for cushion 9 of the ninth embodiment (shown in FIG. 3B), the sheet 9A is formed in an approximately corrugated shape for the purpose of improving the sound absorbing power, the cushioning properties and the impact resistance. The corrugated shape is formed by the lower haul-off speed of the roll than the falling speed of the resin filaments as described later. The interval, the height and the width of each waveform of the sheet 9A depend on the manufacturing conditions and are not limited to the illustrated example. In the case of the narrow interval of waveform in the sheet 9A, the adjacent waveforms may be joined with each other. A slit (linear through groove) 75a shown in FIG. 11E may be employed for the ninth embodiment.

(Apparatus for Manufacturing Core Material for Cushion)

The following describes an apparatus 10 for manufacturing the core materials for cushion of the first to the ninth embodiments.

Figure 5:
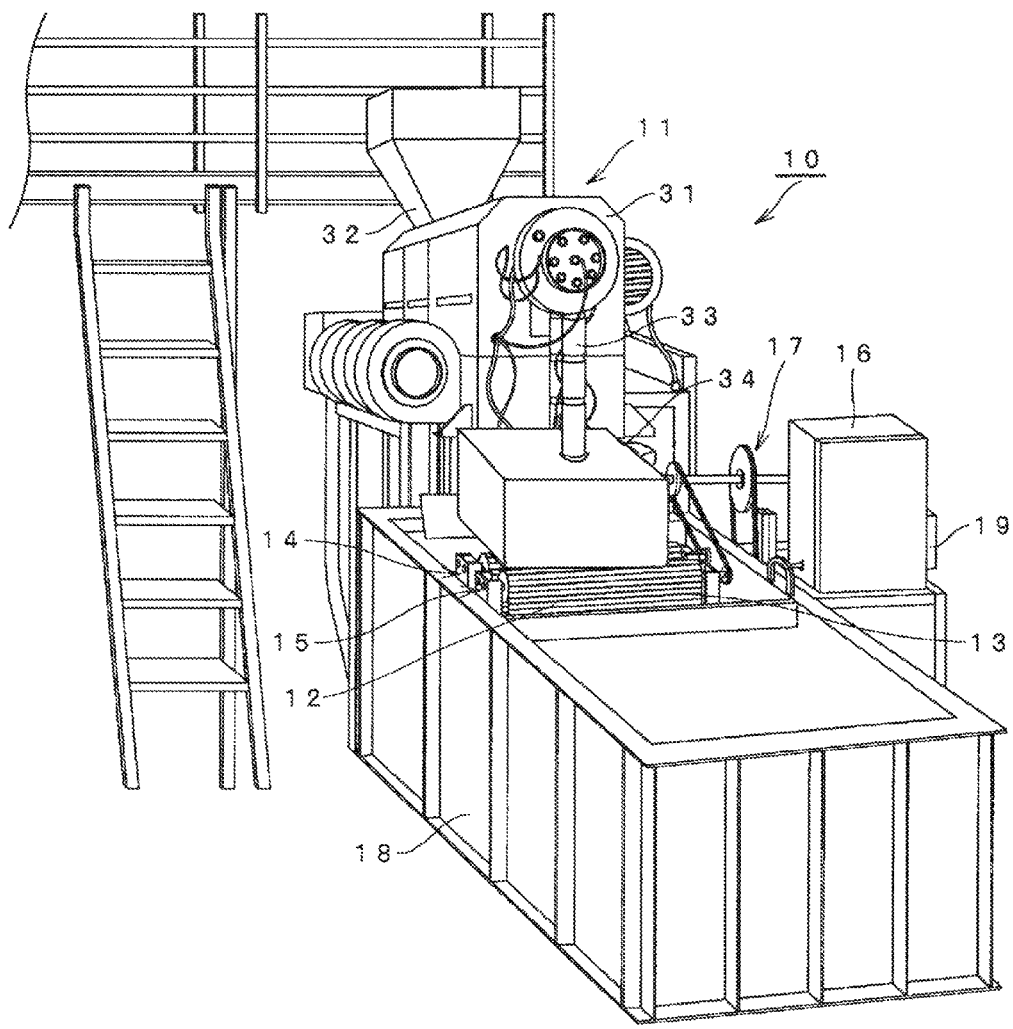
FIG. 5 is a perspective view illustrating an apparatus for manufacturing the core material for cushion according to the first embodiment.
Figure 7A:
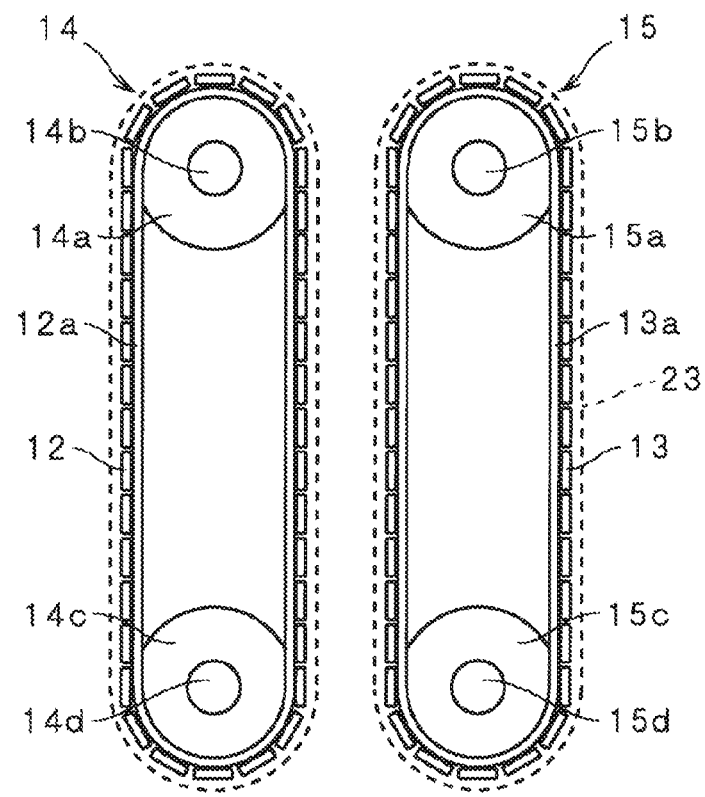
FIGS. 7A and 7B are respectively a side view and a front view illustrating endless conveyors in the apparatus for manufacturing the core material for cushion.
Figure 7B:
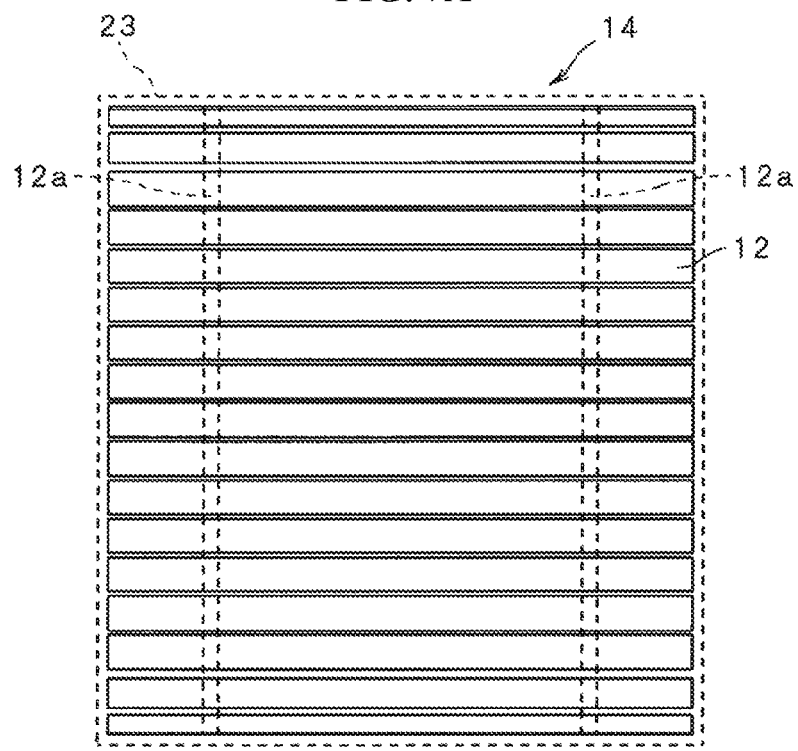

As shown in FIG. 5, this manufacturing apparatus 10 includes an extrusion molding machine 11, a pair of endless conveyors 14 and 15 configured to have endless belts 12 and 13 (shown in FIG. 7), a drive motor 16 configured to drive the endless belts 12 and 13, a transmission 17 configured to have chains and gears and change the moving speeds of the endless belts 12 and 13, a water tank 18 configured to make the pair of endless conveyors 14 and 15 partly submerged in water, a controller 19 and various meters and gauges.

Figure 8A:
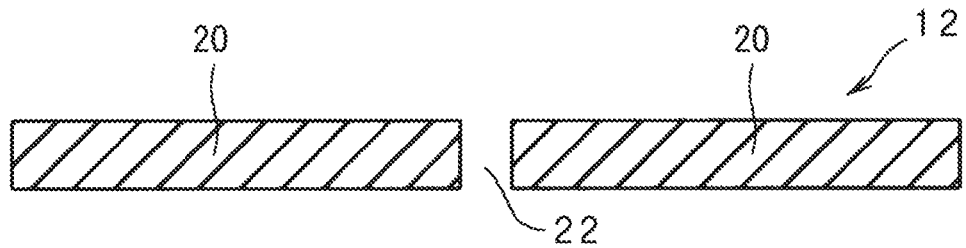
FIGS. 8A to 8F are side views illustrating the apparatus for manufacturing the core material for cushion and endless conveyors of modified configurations.
Figure 8B:
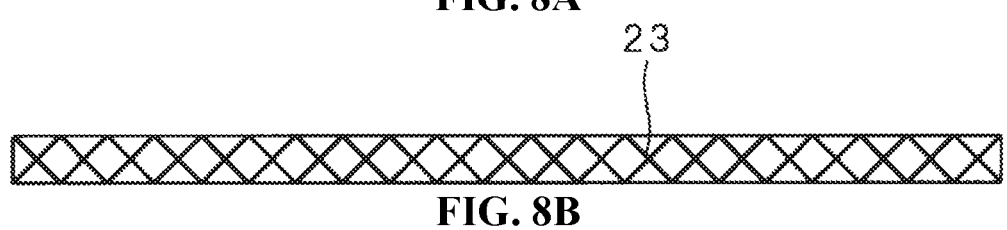
Figure 8C:
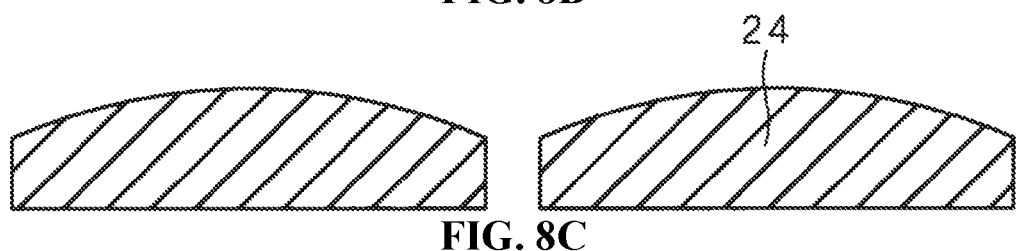
Figure 8D:
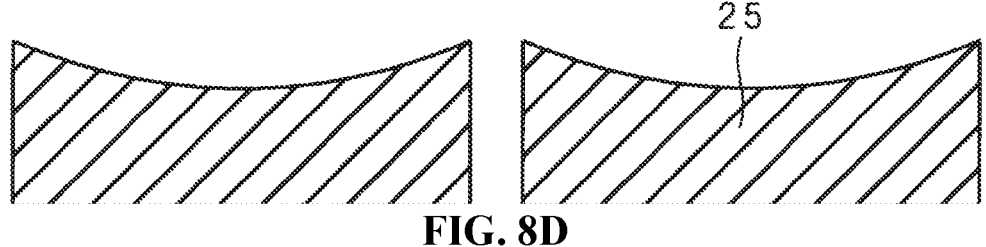
Figure 8E:
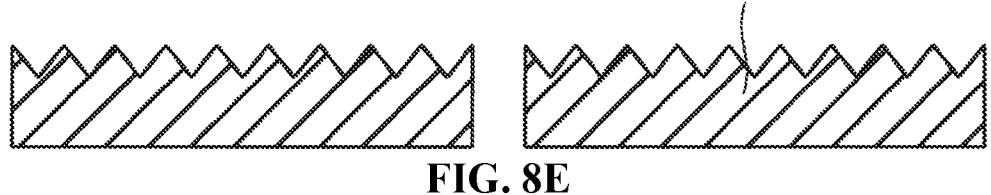
Figure 8F:
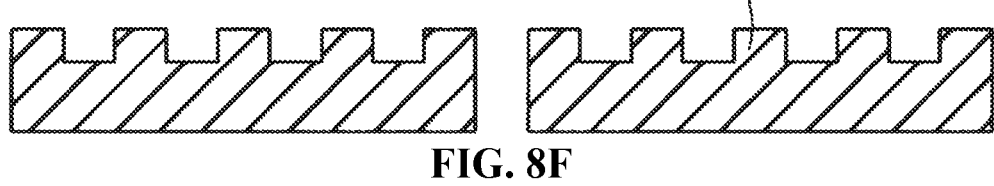

The endless belts 12 and 13 are configured by coupling a plurality of metal (for example, stainless steel) plate members 20 across predetermined clearances 22 (shown in FIG. 8A) with a plurality of (for example, two) endless chains 12a and 13a (shown in FIGS. 7A and 7B) by means of screws (not shown). A belt 23 of, for example, stainless steel mesh (wire) without clearances 22 as shown in FIG. 8B may alternatively be used. This mesh belt is formed by combination of spirals and rods (ribs). Various mesh belts may be formed by changing the shapes, the line diameters and the pitches of these two elements. The mesh belt is smoothly movable, easily keeps the belt surface in a horizontal position and has high resistance to high temperature and easy repair and maintenance. As shown by the dotted lines in FIG. 7, the stainless steel mesh belts 23 may be provided around the outer peripheries of the endless belts 12 and 13. This is advantageous for preventing formation of irregularities by the clearances 22. The plate member 20 is formed in a rectangular sectional shape but may be formed in various other sectional shapes, for example, a convex shape 24 (shown in FIG. 8C), a concave shape 25 (shown in FIG. 8D), a jagged shape 26 (shown in FIG. 8E) or a continuous concavo-convex shape 27 (shown in FIG. 8F).

As shown in FIG. 7, the endless conveyor 14 has a vertically placed drive shaft 14b having a sprocket 14a which the endless chain 12a is wound on, and a vertically placed driven shaft 14d having a sprocket 14c. The endless conveyor 15 is driven in synchronism with the endless conveyor 14. The endless conveyor 15 has a vertically placed driven shaft 15b having a sprocket 15a which the endless chain 13a is wound on, and a vertically placed driven shaft 15d having a sprocket 15c.

Figure 6:
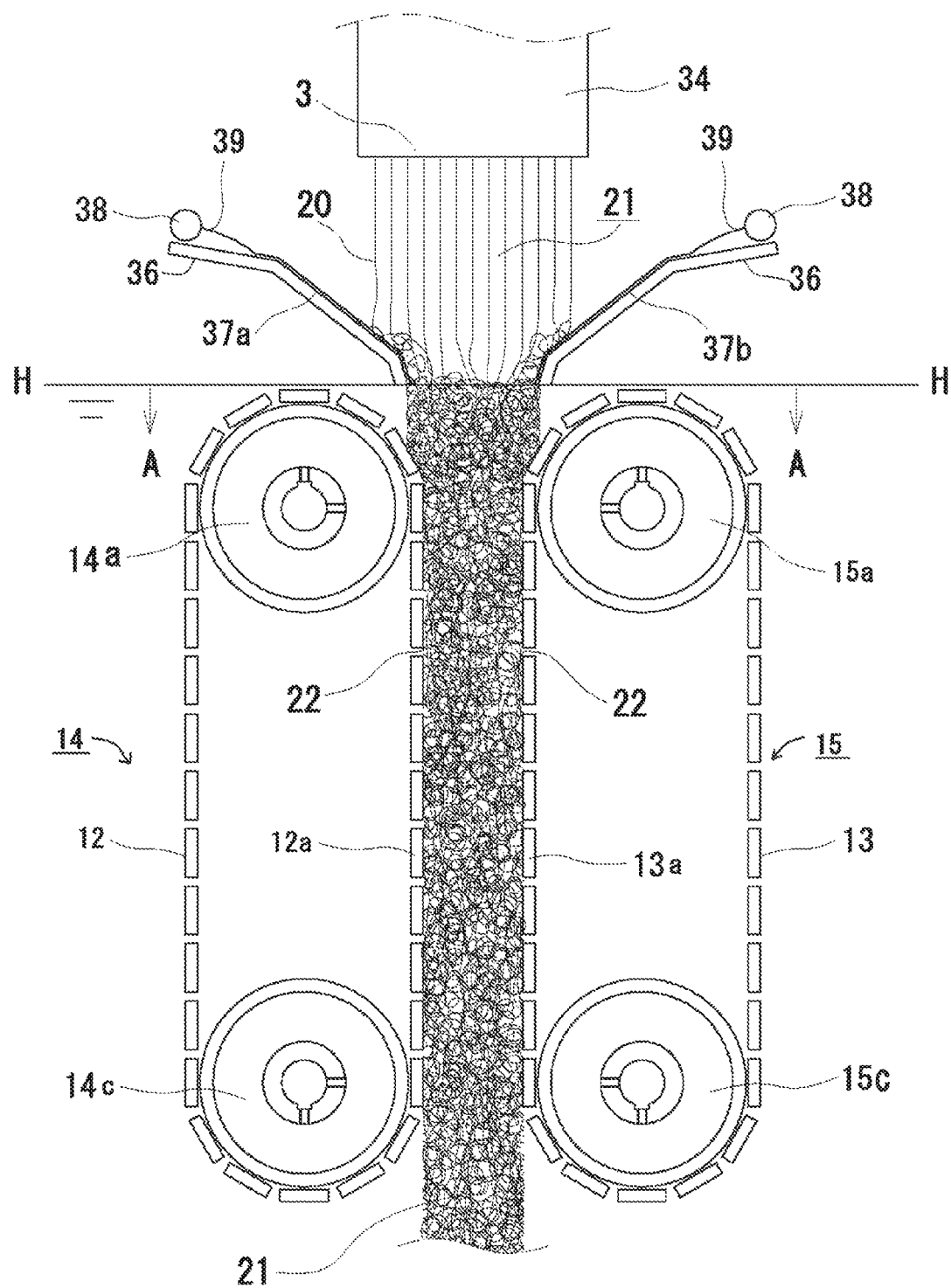
FIG. 6 is a diagram illustrating the operations of the apparatus for manufacturing the core material for cushion according to the first embodiment.

As shown in FIG. 6, the water tank 18 is configured to make a predetermined part of the apparatus 10 for manufacturing the core material for cushion submerged in water and thereby cool down and solidify a filament assembly 21 in the molten state. A water level H is preferably set to or above the height of lower ends of inclined planes 37a and 37b of chutes 36 (shown in FIG. 6). The water level H is set irrespective of the height at which the chutes 36 are placed but is set based on the lower ends of the inclined planes 37a and 37b. Part of the endless conveyor belts 14 and 15 may be exposed above the water. The water level H is preferably set to satisfy $0 \leq Wd \leq 45$ (mm), where Wd denotes the height from the lower ends of the inclined surfaces 37a and 37b, is more preferably set to satisfy $0 \leq Wd \leq 30$ (mm) and is furthermore preferably set to satisfy $0 \leq Wd \leq 22$ (mm). The water level H is preferably equal to or higher than the height of the lower ends of the chutes 36.

As shown in FIG. 5, the extrusion molding machine 11 includes a container 31, a material feed port 32 that is provided in the upper portion of the container 31, a die 33, and a nozzle 34 that is detachably mountable to a lower end of the die 33. The internal temperature range of the die of the extrusion molding machine 11 may be set to 100 to 400° C., and the extrusion rate may be set to 20 to 200 kg/hour. The pressure of the die 33 ranges from 0.2 to 25 MPa and may be based on, for example, the ejection pressure of a 75 mm screw. In the case where the thickness of each layer in the three-dimensional net-like structure exceeds 100 mm, equalization of the die pressure by a gear pump or the like may be needed. In this case, the internal pressure of the die should be increased by the gear pump or the like to uniformly eject the filaments from the entire area of the die. The respective faces of the endless conveyors 14 and 15 are freely movable to form the shape of a three-dimensional net-like sheet. A product having a desired density and a desired strength is manufactured by regulating the shape of the nozzle 34 of the die 33 (density or diameter of holes H) and adjusting the conveying speed of the endless conveyors 14 and 15. This meets a diversity of needs for products.

As shown in FIG. 6, filaments 20 made of a thermoplastic synthetic resin are tangled in loops at random and are thermally bonded to one another at contact portions. The manufacturing apparatus 10 includes chutes 36 that are placed below the nozzle 34, water supply pipes 38 that are placed above the chutes 36 and have water supply ports 39 as ends of the water supply assembly. The chutes 36 are placed below the nozzle 34 and include a pair of longer side chutes placed to face each other across longer side faces of the falling filament assembly 21 and (optionally) a pair of shorter side chutes placed to face each other across shorter side faces of the filament assembly 21 and forms a molding opening at the lower end. The facing chutes 36 respectively have inclined planes 37a and 37b that are inclined downward toward the filament assembly 21. Similarly the facing shorter side chutes respectively have inclined planes that are inclined downward toward the filament assembly 21.

The water supply ports 39 are provided in the supply pipes 38 arranged over approximately the full length in the longitudinal direction above the chutes 36 to supply cooling water to the inclined planes 37a and 37b. The supply pipes 38 are connected with an upstream water supply source (not shown). The cooling water may be supplied to the shorter side chutes by adjusting the water flows from the supply pipes 38 or by providing similar supply pipes (not shown) above the shorter side chutes.

Figure 9A:
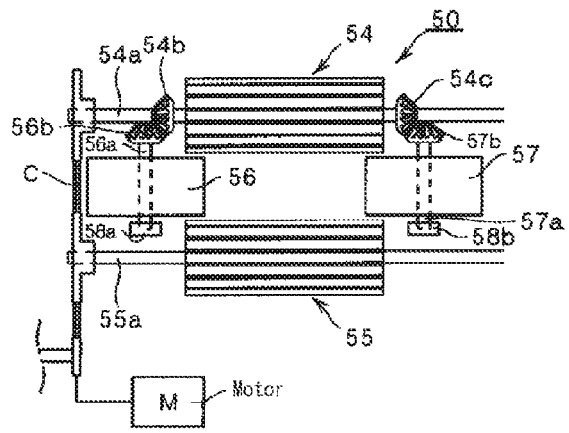
FIG. 9A is a plan view illustrating endless conveyors in the apparatus for manufacturing the core material for cushion in the case of four-surface molding.
Figure 9D:
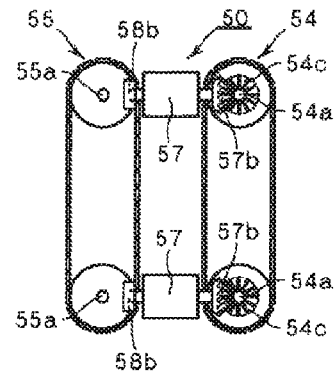
FIG. 9D is a plan view illustrating four-surface molding by the apparatus for manufacturing the core material for cushion.
Figure 9D:
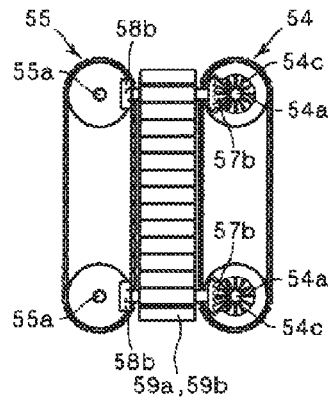
Figure 9D:
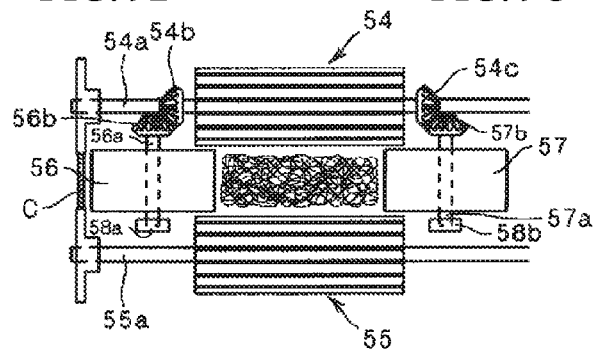
Figure 9E:
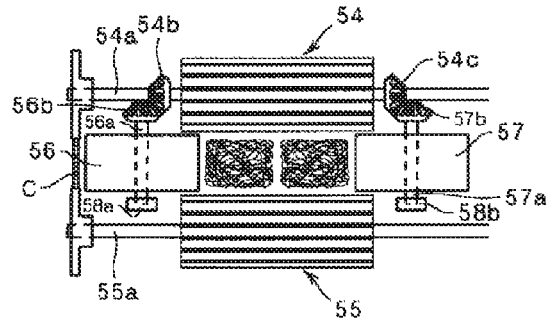
FIG. 9E is a plan view illustrating three-surface molding by the apparatus for manufacturing the core material for cushion.

The following describes an apparatus 50 for manufacturing a core material for cushion provides as a two- to four-surface molding machine shown in FIGS. 9A and 9B. The apparatus 50 for manufacturing the core material for cushion includes endless conveyors 54 and 55 that correspond to the endless conveyors 14 and 15 of two-surface molding shown in FIG. 7 and respectively have rotating shafts 54a and 55a, and a pair of rolls 56 and 57 that are placed at respective ends in the longitudinal direction of the endless conveyors 54 and 55 to have rotating shafts perpendicular to the endless conveyors 54 and 55 and are configured to be rotatable about rotating shafts 56a and 57a. The rotating shaft 54a has bevel gears 54b and 54c. The rotating shafts 56a and 57a respectively have bevel gears 56b and 57b. The bevel gears 54b and 54c engage with the bevel gears 56b and 57b. The rotating shafts 54a and 55a are synchronously driven via a chain C by means of a motor M, so that the rotating shafts 56a and 57a are synchronously driven. The other ends of the rotating shafts 56a and 57a are supported by bearings 58a and 58b. As shown in FIG. 9C, a pair of short endless conveyors 59a and 59b having the similar configuration to that of the endless conveyors 54 and 55 may be arranged perpendicularly. This configuration ensures the more accurate molding and improves the dimensional accuracy. This apparatus may be applied to four-surface molding as shown in FIG. 9D or applied to three-surface molding as shown in FIG. 9E. Two dies may be provided according to the type of the three-dimensional net-like structure to extrude filaments in parallel. This doubles the production efficiency.

Figure 10A:
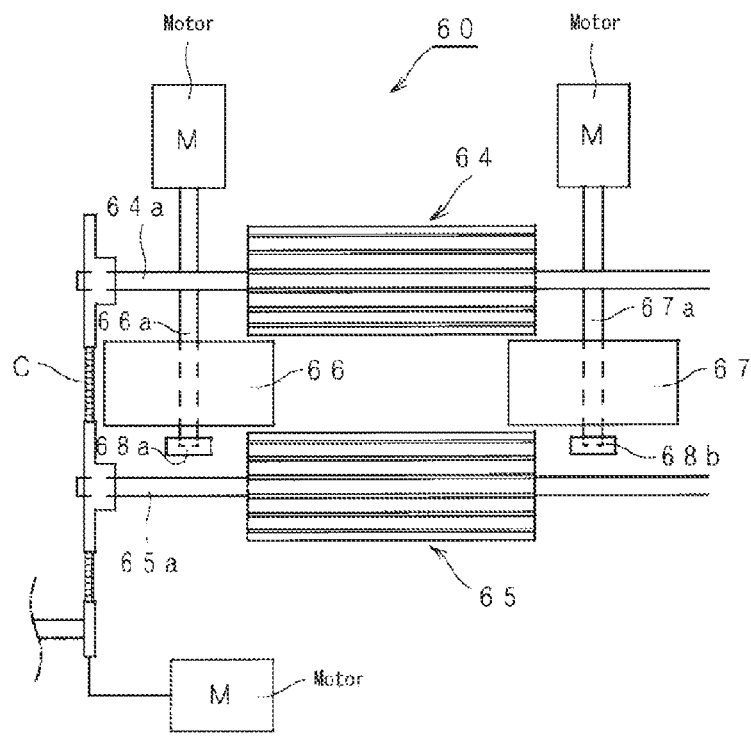
FIG. 10A is a plan view illustrating endless conveyors of an independent drive configuration in an apparatus for manufacturing a core material for cushion in the case of four-surface molding.

As shown in FIG. 10A, one modified configuration in place of the synchronous driving system described above provides separate driving sources (for example, motors) to independently drive endless conveyors 64 and 65 and rolls 66 and 67 (or endless conveyors). This modified configuration for three-surface or four-surface molding includes the endless conveyors 64 and 65 having rotating shafts 64a and 65a, and the pair of rolls 66 and 67 that are placed at respective ends in the longitudinal direction of the endless conveyors 64 and 65 to have rotating shafts perpendicular to the endless conveyors 64 and 65 and are configured to be rotatable about rotating shafts 66a and 67a. Separate motors M are provided for the rotating shafts 66a and 67a to independently drive the rotating shafts 66a and 67a. The other ends of the rotating shafts 66a and 67a are supported by bearings 68a and 68b.

Figure 10B:
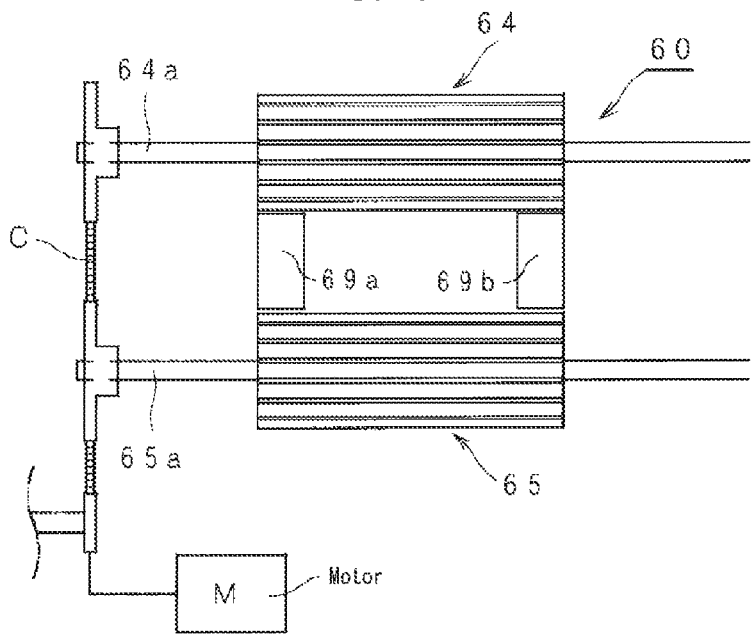
FIG. 10B is a view illustrating endless conveyors in an apparatus for manufacturing a core material for cushion having a sliding plate provided on an end plane.
Figure 10C:

As shown in FIG. 10B, another modified configuration omits the pair of rolls 66 and 67, the rotating shafts 66a and 67a, the bearings 68a and 68b and the motors M from the above configuration and provides slidable chutes 69a and 69b that have polytetrafluoroethylene-containing surfaces and are placed at the positions of the rolls 66 and 67. This simplifies the driving mechanism. These chutes 69a and 69b are configured in an arc shape in the side view to gradually narrow the interval downward and are formed in a rectangular shape in the plan view.

Figure 11B:
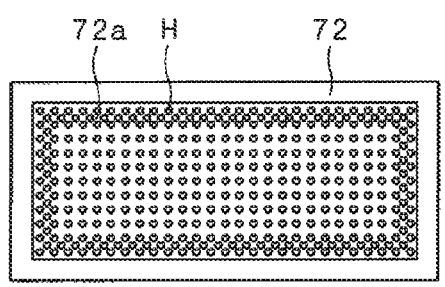
Figure 11F:
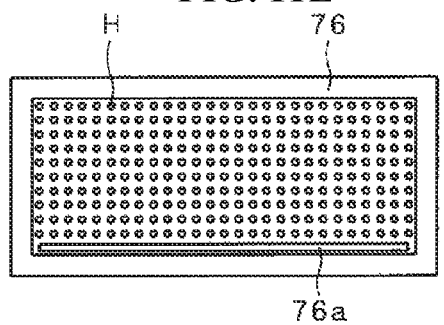
Figure 11C:
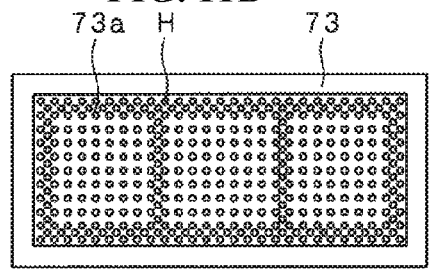
Figure 11G:
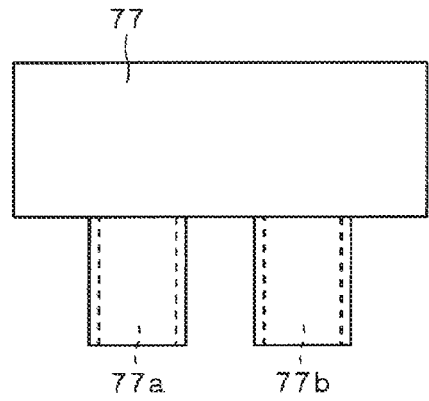
Figure 11D:
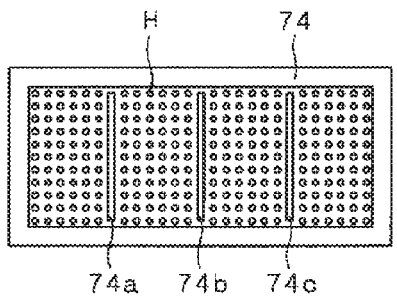
Figure 11H:
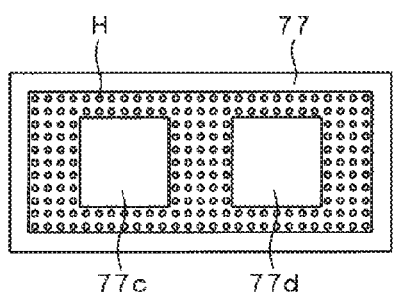

The holes of the nozzle 34 are formed to face downward to make the filaments fall down. The holes may be arranged at equal intervals or at different intervals. The plurality of holes may be arranged in any of various arrays, for example, in zigzag or at right angles. An available method of changing the array density intentionally increases the density only in end areas. A diversity of needs for products are satisfied by changing the configuration of the nozzle. Available examples of the nozzle include a nozzle 71 which has about 3500 holes H of 0.5 mm in diameter arranged at substantially equal intervals in an area of 1.0 m×180 mm (the size of the area filled with the nozzle holes H occupies 90% of the total area of the nozzle 71) (shown in FIG. 11A); a nozzle 72 which has a higher density of holes H in a peripheral area 72a (shown in FIG. 11B); a nozzle 73 which has a higher density of holes H in a frame portion 73a to form grid-like areas (shown in FIG. 11C); a nozzle 74 which has slits (linear through holes) 74a to 74c formed in parallel to one another in the shorter direction, in addition to a large number of holes H (shown in FIG. 11D; a nozzle 75 which has a slit (linear through hole) 75a formed in a center part in the longitudinal direction, in addition to a large number of holes H (shown in FIG. 11E); a nozzle 76 which has a slit (linear through hole) 76a formed in the longitudinal direction at a position close to a longitudinal side, in addition to a large number of holes H (shown in FIG. 11F); and a nozzle 77 which includes areas 77c and 77d without holes H formed in predetermined locations for formation of cavities and has rectangular guide members (for example, pipes) 77a and 77b that are extended downward from the areas 77c and 77d (shown in FIGS. 11G and 11H). The density of the holes H formed in the nozzle is preferably 1 to 5 holes/cm².

(Method of Manufacturing Core Material for Cushion)

The following describes one exemplary method of manufacturing the core material for cushion 1 of the embodiment, but this manufacturing method is not restrictive. As described in, for example, JP 2001-328153A, a raw material including polyethylene or a thermoplastic elastomer as the main component is molten at a melt temperature that is higher than the melting point of the main component by 10° C. to 20° C. The molten raw material is fed into the die 33. Under application of a pressure, a plurality of filaments are ejected from a plurality of extrusion holes of the nozzle 34 at the lower end to form a filament assembly 21 according to the array of the plurality of extrusion holes and free-fall. In the case where the polyolefin resin and the polyester elastomer and/or polyurethane elastomer have significantly different melt temperatures or have significantly different changes of properties in the cooling process, a general manufacturing process individually produces the respective layers in different water tanks 18 or in separate processes and stacks the respective layers to produce the core material for cushion 1. The respective layers are produced by the following procedure. A thermoplastic resin as the raw material of each layer is heated and dried for the purpose of preventing hydrolysis or the like and is supplied from the material feed port 32 into the container 31. A finishing agent, an antimicrobial, a flame retardant and other additives may be added as appropriate. In the description hereof, the melt temperature is obtained by differential scanning calorimetry.

The internal temperature range of the die may be set to 100 to 400° C., and the extrusion rate may be set to 20 to 200 Kg/hour. The internal pressure of the die 33 may be based on, for example, the ejection pressure of a 75 mm screw and ranges about 0.2 to 25 MPa.

The diameter of the hole of the nozzle in the die corresponds to filament diameter of the filaments of the three-dimensional net-like structure and is preferably 0.2 to 4.0 mm and more preferably 0.4 to 1.8 mm.

The filaments in the molten state are received by at least the pair of left and right chutes 36 (WO 2012/157289A) to which water or heated water is supplied and come into contact with one another to be fused, form a three-dimensional net-like structure and reach the water surface. The properties of the three-dimensional net-like structure are determined according to the angle of the chutes 36, the flow of supplied water, the diameter of the extrusion holes, the distances between the nozzle surface, chutes and haul-off conveyors, the melt viscosity of the resin, the diameter and the ejection rate of the extrusion holes, the loop diameter and the filament diameter of the filaments. The filament diameter (diameter) is 0.1 to 1.8 mm, and the average diameter (length) of random loops is 5 mm to 50 mm.

The filaments of the filament assembly located on the peripheral longitudinal side faces come into contact with the inclined planes 37a and 37b of the chutes 36 on which water flows. This configuration disturbs the vertically falling trajectory, and the filaments are tangled with adjacent filaments in loops and are slid down on the inclined planes 37a and 37b with the flow of water or heated water supplied from the supply pipes 38. The filaments directly receive the effect of gravity and are tangled along the inclined planes 37a and 37b to form loops.

The water supply ports 39 are provided in the supply pipes 38 that are arranged in the longitudinal direction above the respective chutes 36 to supply water or heated water in a temperature range of 10 to 90° C. or preferably 40 to 60° C. to the respective inclined planes 37a and 37b. The supply pipes 38 are connected with an upstream water supply source. The heated water may be supplied to the chutes 36 by adjusting the water flows from the supply pipes 38.

The filaments of the filament assembly that do not come into contact with either of the inclined planes of the chutes but fall down pass through the molding opening. The filaments that pass through the vicinity of the lower sides of the inclined planes 37a and 37b among the filaments passing through the molding opening come into contact with the filaments slid down on the inclined planes 37a and 37b to be tangled in loops. The filaments fall, while disturbance of the falling trajectory by the contact tangling is propagated to adjacent filaments in the center direction in a certain range. The filaments that pass through the center of the molding opening among the filaments passing through the molding opening reach the water surface. The haul-off speed of the endless conveyors 14 and 15 is lower than the falling speed of the filament assembly. The respective filaments reaching the water surface are bent and are tangled in loops in the vicinity of the water surface. The speed of the endless conveyors 14 and 15 is preferably 5 to 40 m/hour.

The water level H of the water tank 18 is preferably equal to or higher than the height of the lower ends of the inclined planes 37a and 37b of the chutes 36. The water level H is set irrespective of the height at which the chutes 36 are placed but is set based on the lower ends of the inclined planes 37a and 37b. Part of the endless conveyor belts 14 and 15 may be exposed above the water.

The filament assembly free-falls between the pair of partly submerged endless conveyors 14 and 15 and is hauled off at the lower speed than the falling speed. The interval between the pair of endless conveyors 14 and 15 is set to be narrower than the width of the extruded assembly of the molten resin. Both surfaces or a single surface of the assembly of the molten resin is brought in contact with the endless conveyors 14 and 15 downstream or upstream of the location where the endless conveyors 14 and 15 are submerged in water. The respective surface portions of the assembly of the molten thermoplastic resin fall on the endless conveyors 14 and 15 and move inward of the assembly of the molten thermoplastic resin to become dense. The respective surface portions accordingly have a lower porosity than that of the center portion which directly falls into water and have a larger number of intersections compared with the center portion having the higher porosity. This significantly increases the tensile strength. The surface portions having the lower porosity have the smaller area of pores and serves as impact absorbing layers.

The filament assembly 21 is hauled off and fed by the endless conveyors 14 and 15. The filament assembly 21 in the molten state is cooled down and is solidified by water. The filament assembly 21 in the fixed shape is placed between the rolls and is taken out of the water tank 18.

A procedure of forming a three-dimensional net-like structure in an atypical shape into the shape of a product equalizes the internal pressure of the die and hauls off two surfaces, three surfaces or four surfaces or a middle part of the three-dimensional net-like structure. The molten filaments in the random spiral shapes are formed to a flat plate-like shape having the apparent density described above. The front face, the rear face, the left end face or the right end face in the thickness direction of the three-dimensional net-like structure may be formed to a plane or a convex/concave atypical shape. The shape of the nozzle of the die to form the three-dimensional net-like structure may be set to a rod-like shape, any atypical shape (for example, pipe shape or Y shape) or a combination thereof, so as to provide various three-dimensional net-like structures. The three-dimensional net-like structure is formed to a highly dense sheet structure by roll compression of the endless conveyors. The internal pressure of the die is equalized to uniformly eject the resin from the die and form the respective layers. The three surfaces or four surfaces of the assembly of the molten resin extruded to manufacture a three-dimensional net-like sheet come into contact with haul-off conveyors to be formed in specific shapes. In other words, the three surface or the four surfaces of each layer in the assembly of the molten resin are formed in shapes corresponding to the final product shape. For example, the resin assembly may be hauled off to a polygonal conveyor as appropriate to be formed in the final product shape. One method of producing a three-dimensional net-like sheet uses a plurality of dies to extrude the molten resin downward and make the molten resin free-fall to the water surface or between the partly submerged conveyors. This forms random spiral shapes to produce the three-dimensional net-like structure.

The three-dimensional net-like structure having the cross section in the similar shape to that of the molding opening is drained and is conveyed by rollers to a drying heat treatment tank to be subjected to drying heat treatment with the hot air for annealing. It is preferable to set different haul-off speeds of rollers downstream and upstream of the drying heat treatment tank. For example, the haul-off speed of the rollers placed near to the outlet of the drying heat treatment tank is set to be lower than the haul-off speed of the rollers placed near to the inlet of the drying heat treatment tank. After the drying heat treatment, the three-dimensional net-like structure is cut into a desired length. The three-dimensional net-like structure may alternatively be cut into a desired length prior to the drying heat treatment.

The three-dimensional net-like structure taken out of the water tank and drained is subjected to drying heat treatment and annealing at a drying temperature for a predetermined time duration. In the case of a low-density polyethylene, the drying temperature is preferably not higher than the melting point of the low-density polyethylene and is more preferably lower than the melting point by 10 to 70° C. In the case of a thermoplastic elastomer, the drying temperature is preferably not higher than the melting point of the thermoplastic elastomer and is more preferably lower than the melting point by 10 to 70° C.

The annealing process may place the three-dimensional net-like structure taken out of the water tank and drained in a frame in the compressed state, perform heat treatment with the hot air and then release the frame from the three-dimensional net-like structure. In the case of a low-density polyethylene, the drying temperature of such annealing is preferably not higher than the melting point of the low-density polyethylene and is more preferably lower than the melting point by 10 to 70° C. In the case of a thermoplastic elastomer, the drying temperature is preferably not higher than the melting point of the thermoplastic elastomer and is more preferably lower than the melting point by 10 to 70° C.

As described above, annealing may be performed in a post process (hereinafter referred to as supplementary annealing) after shape-forming of the three-dimensional net-like structure in the water tank. Annealing may be performed supplementarily during production (hereinafter referred to as during-production annealing) by supplying the heated water to the water tank.

The during-production annealing is preferably performed at a temperature that is lower than the melting point of the polyethylene thermoplastic rein or the melting point of the polyester thermoplastic elastomer by at least 10 to 70° C.

The during-production annealing supplies heated water in the range of 20 to 90° C. (preferably in the range of 20 to 80° C. or more preferably in the range of 25 to 50° C.) to at least one pair of chutes, instead of supplying water of ordinary temperature to the chutes, so as to thermally weld the filaments at random and form random loops while performing annealing. The temperature of heated water is preferably 25 to 50° C. for the low-density polyethylene and is 25 to 70° C. for the thermoplastic elastomer. The heated water may be supplied, for example, by (A) heating water flowed to the chutes, (B) heating the entire water tank 18, (C) increasing the internal temperature of the chutes formed in a tank-like shape or a combination thereof. The excessively high temperature of the heated water supplied to the chutes is likely to cause the resin to adhere to the chutes. It is thus desirable to control the heated water to an adequate temperature range, for example, 10 to 60° C. The supplementary annealing soaks the three-dimensional net-like structure taken out of the water tank in heated water or causes the three-dimensional net-like structure to pass through the hot air.

The annealing may be single annealing of either supplementary annealing by drying heat treatment or during-production annealing with the heated water in the water tank or the like, may be two-step annealing of supplementary annealing after during-production annealing, or may be two-step annealing of supplementary annealing performed twice. In the last case, the temperature of second supplementary annealing is set to be higher than the temperature of first annealing.

The three-dimensional net-like structure of the invention manufactured by the above manufacturing method has the softness, high resilience, and the thermal expansion properties in both the longitudinal direction and the lateral direction. The thermal expansion properties differ in the longitudinal direction and in the lateral direction. According to the analysis of the inventors, the mechanism to provide the elastic properties and the thermal expansion properties or more specifically the anisotropic thermal expansion rates is complicated and is not fully elucidated. It is, however, basically thought that the characteristic variations and fluctuations of the thickness of the filaments differ the forms of tangling in the longitudinal direction and in the lateral direction in the process of free-fall, tangling and cooling of the filaments by adequately controlling the filament diameter decrease rate of the raw material in the adequate range, the melt viscosity, the MFR, extrusion molding from the holes of the nozzle, loop-forming of the filaments, cooling of the filament, supplementary annealing by drying heat treatment, and during-production annealing.

The three-dimensional net-like structure has the thermal expansion properties in the lateral direction and the longitudinal direction according to the filament diameter decrease rate of the raw material, the diameter of the holes of the nozzle, the haul-off speed of the conveyors and annealing as the factors.

Chemicals may be added to the three-dimensional net-like structure of the invention in a certain range that does not deteriorate the performances in any stage from production of resin to production of a molded product to provide various functions such as deodorizing, antibacterial, odor-eliminating, mildew-proofing, coloring, fragrance, flame retardant, incombustible, moisture-absorbing or moisture-desorbing functions.

Figure 12A:
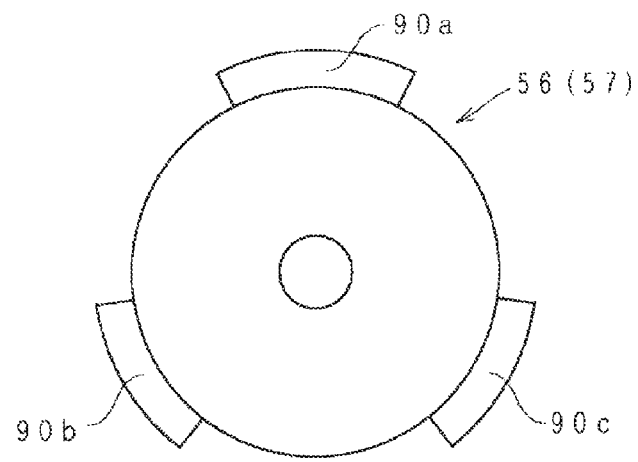
FIGS. 12A and 12B are front views illustrating modifications of the endless conveyors in the apparatus for manufacturing the core material for cushion in the case of four-surface molding.
Figure 12B:
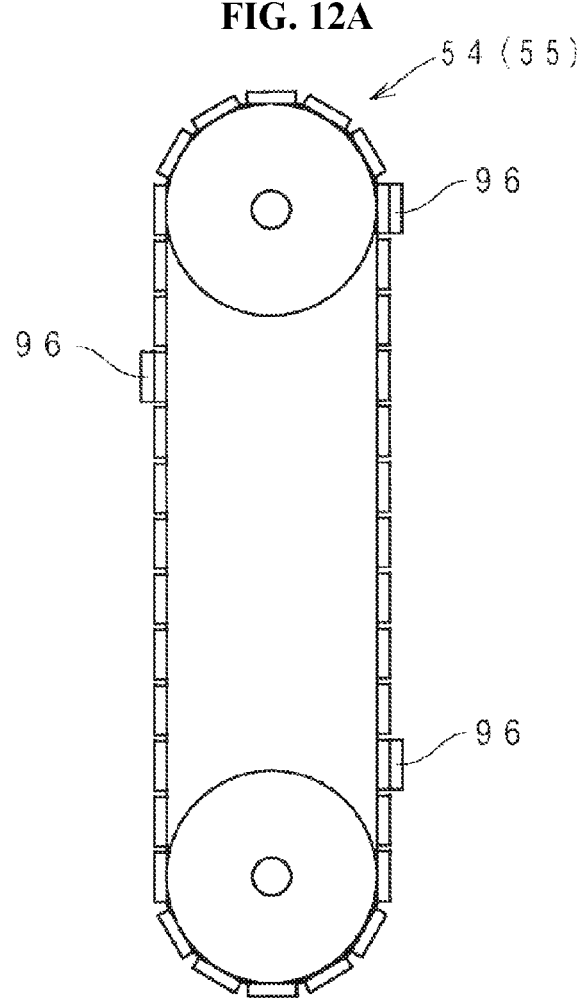

FIG. 12 is diagrams illustrating modifications of the apparatus 50 for manufacturing the core material for cushion in the case of four-surface molding. FIG. 12A corresponds to FIG. 9B. A single or a plurality of projections 90a to 90c are provided on the surface of the pair of rolls 56 and 57 described above (the roll 57 and its projections are omitted from illustration). These projections 90a to 90c are provided to form concavities in the side face of the three-dimensional net-like structure. The projections 90a to 90c are formed in an arc shape and a rectangular sectional shape. The concavities are theoretically formed in a rectangular shape, but the fall of the resin filaments generates blinds to provide areas without the resin filaments. The concavities on the side face of the three-dimensional net-like structure are thus formed in a curved shape. FIG. 12B corresponds to FIG. 9C. A single or a plurality of projections 96 are provided on the surfaces of the pair of endless conveyors 54 and 55 described above (the endless conveyor 55 and its projections are omitted from illustration). A cam and a spring may be placed in the rotating bodies of the rolls 56 and 57 or the endless conveyors 54 and 55. The projections may be configured such that the cam presses the projections outward synchronously with the rotation. This reduces the blinds and allows for more accurate formation of concavities. The other configuration is similar to FIGS. 9B and 9C and is not specifically illustrated or described.

The following describes core materials for cushion according to tenth to fifteenth embodiments.

In terms of recycling, the polyolefin resin and the polyester elastomer and/or polyurethane elastomer of the core material for cushion should not be molded integrally. In the case where the polyolefin resin and the polyester elastomer and/or polyurethane elastomer have similar melt temperatures or similar cooling behaviors, however, these layers may be produced simultaneously with a view to improving the productivity. There are also a need for changing the density in each layer, a need for first forming an outer part including the polyester elastomer and/or polyurethane elastomer and subsequently forming a core part including the polyolefin resin, a need for changing the shape and a need for enhancing the moldability. The embodiments accordingly aim for the smooth recycling of the thermoplastic resin and easiness of the shape change.

Figure 13A:
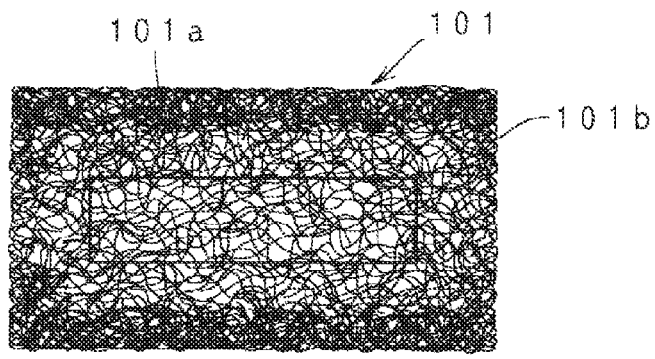
FIG. 13A is a vertical sectional view illustrating a core material for cushion according to a tenth embodiment.

As shown in FIG. 13A, a core material for cushion 101 according to a tenth embodiment is a three-dimensional net-like structure in a plate-like form that is made of or mainly made of a thermoplastic resin as a raw material and is formed by spirally tangling a plurality of filaments at random and partially bonding the tangles by heat. The core material for cushion 101 is comprised of an inner area 101a including a polyolefin resin and an outer area 101b including a polyester elastomer or polyurethane elastomer. The boundary between the inner area 101a and the outer area 101b is shown by the solid line. The solid line is a phantom line showing the boundary. The same applies to the subsequent other embodiments. It is preferable that the density of two, three or four surface portions of the three-dimensional net-like structure is relatively higher than the density of a residual portion other than the surface portions. More specifically, the core material for cushion 101 of the tenth embodiment (shown in FIG. 13A) is formed by two-surface molding to have the higher density in areas of predetermined depths inward from opposed surfaces and the lower density in an inner middle area and have other surfaces left uneven. This configuration advantageously eliminates the need for further processing in the post process. A pair of wide surfaces that form the lying surface and the mounting surface and one side face are forcibly molded by endless conveyors or the like as described above to have aligned edges compared with the other side face.

Figure 13B:
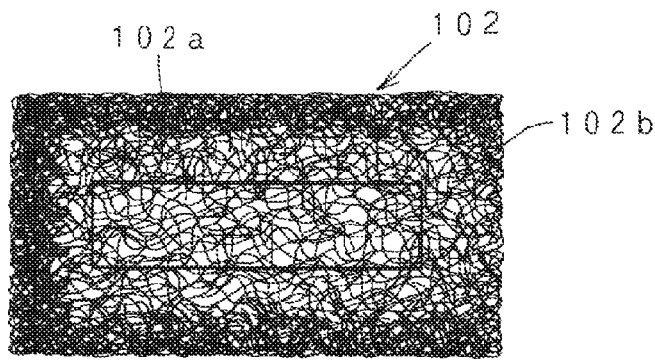
FIG. 13B is a vertical sectional view illustrating a core material for cushion according to an eleventh embodiment.

A core material for cushion 102 according to an eleventh embodiment (shown in FIG. 13B) is formed by three-surface molding to have all the surfaces except end faces and one side face aligned and have the higher density in areas of predetermined depths inward from all the surfaces except a right side face. The core material for cushion 102 is comprised of an inner area 102a including a polyolefin resin and an outer area 102b including a polyester elastomer or polyurethane elastomer.

Figure 13C:
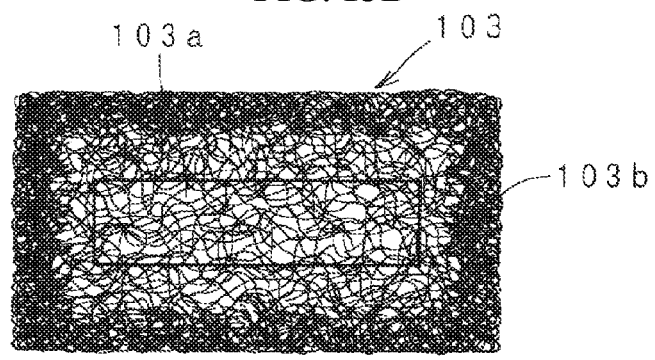
FIG. 13C is a vertical sectional view illustrating a core material for cushion according to a twelfth embodiment.

A core material for cushion 103 according to a twelfth embodiment (shown in FIG. 13C) is formed by four-surface molding to have all the surfaces except end faces aligned and have the higher density in areas of predetermined depths from the side and right side faces of the core material for cushion 1 of the first embodiment and the lower density in an inner middle area. In other words, the areas of the predetermined depths inward from all the side faces are set to have the higher density. The core material for cushion 103 is comprised of an inner area 103a including a polyolefin resin and an outer area 103b including a polyester elastomer or polyurethane elastomer.

Figure 13D:
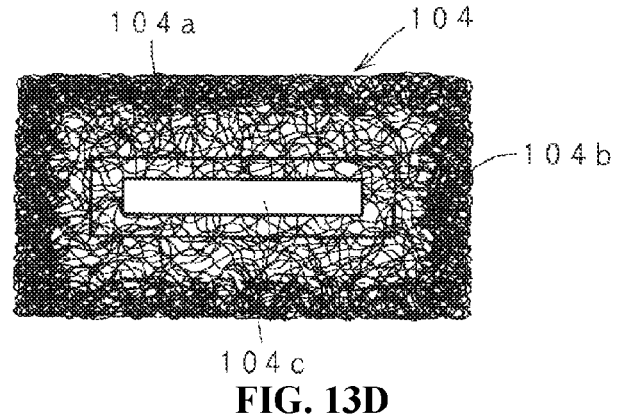
FIG. 13D is a vertical sectional view illustrating a core material for cushion according to a thirteenth embodiment.

A core material for cushion 104 according to a thirteenth embodiment (shown in FIG. 13D) is configured to have a single or a plurality of (one in this embodiment) cavities 104c, for the purpose of further cost reduction. The core material for cushion 104 is comprised of an inner area 104a including a polyolefin resin and an outer area 104b including a polyester elastomer or polyurethane elastomer.

Figure 14A:
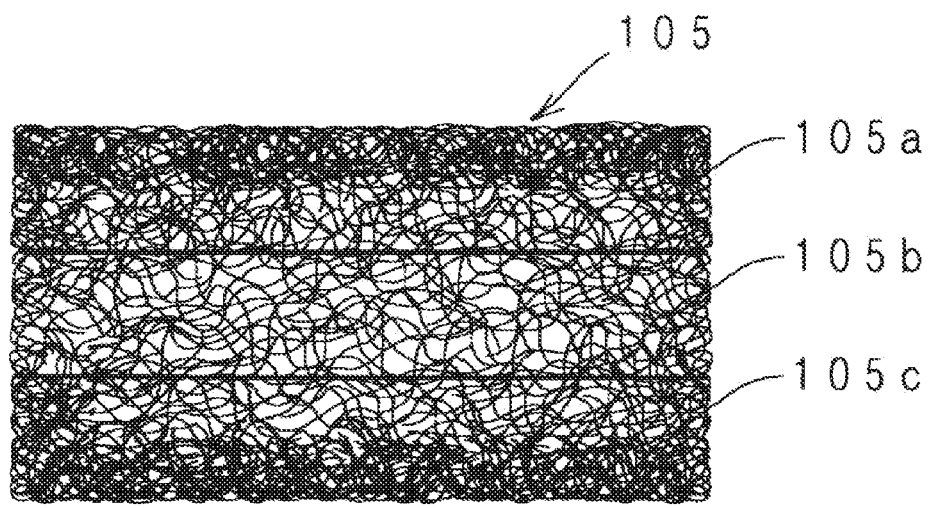
FIG. 14A is a vertical sectional view illustrating a core material for cushion according to a fourteenth embodiment.

A core material for cushion 105 according to a fourteenth embodiment (shown in FIG. 14A) is configured to have three layer areas 105a, 105b and 105c made of different raw materials (for example, sequentially a layer including a polyester elastomer, a layer including a polyolefin resin and a layer including a polyurethane elastomer). The area 105a and the area 105c may be made of an identical raw material (i.e., polyester or polyurethane elastomer), while the area 105b may be made of a different raw material (i.e., polyolefin resin). The three layer area 105a, 105b and 105c are parted along the longitudinal direction.

Figure 14B:
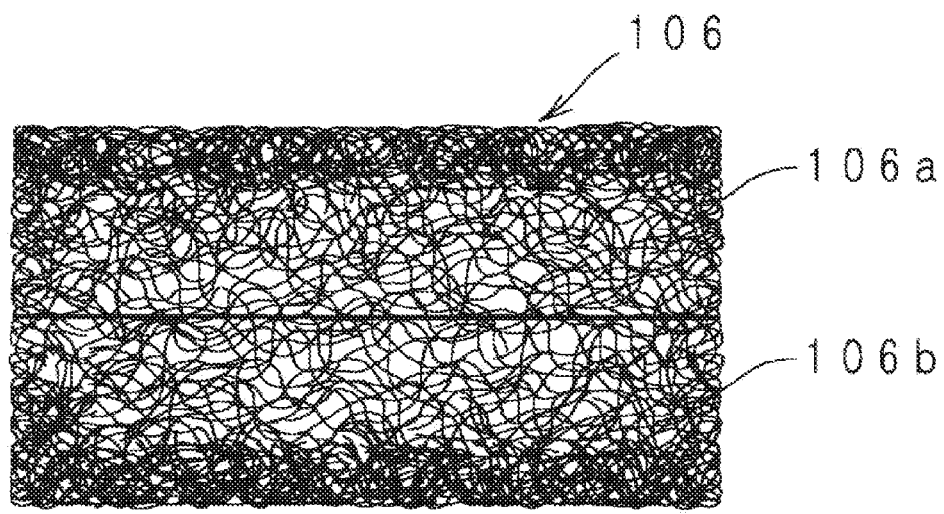
FIG. 14B is a vertical sectional view illustrating a core material for cushion according to a fifteenth embodiment.

A core material for cushion 106 according to a fifteenth embodiment (shown in FIG. 14B) is configured to have two layer areas 106a and 106b made of different raw materials (a layer including a polyester or polyurethane elastomer and a layer including a polyolefin resin). The two layer areas 106a and 106b are parted along the breadth direction. As described above with reference to FIG. 3, the sheet 9A of the higher density (filled area with substantially no pores) and other area may be formed at predetermined locations along the breadth direction by separate pathways from different extrusion molding machines. Although not being specifically illustrated, this configuration is also applicable to various atypical shapes such as triangular shape and Y shape. As described above, the manufacturing conditions such as the temperature of the raw material and the extrusion rate of filaments are readily adjustable by separately supplying the raw materials to two or more areas provided in the nozzle.

Figure 15:
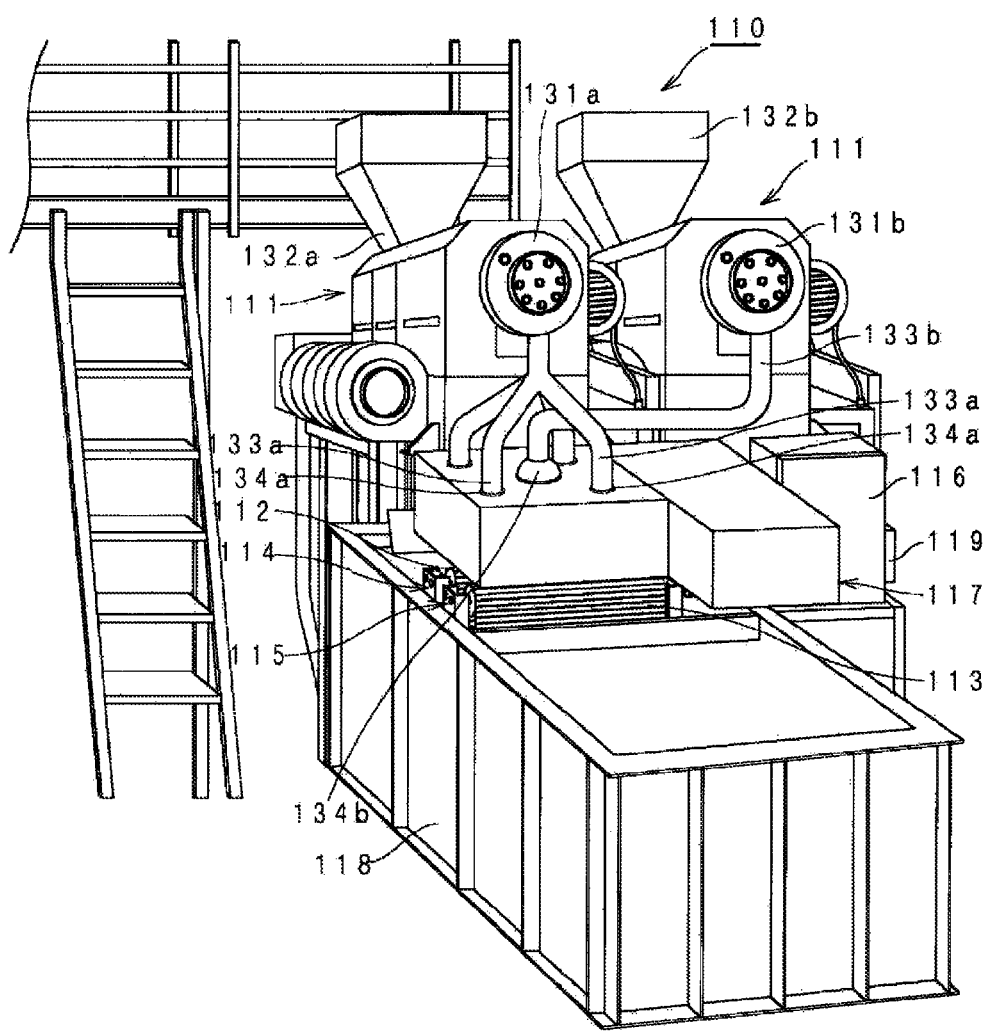
FIG. 15 is a perspective view illustrating an apparatus for manufacturing a core material for cushion according to a second embodiment.

The following describes an apparatus 110 for manufacturing the core materials for cushion according to the tenth to the fifteenth embodiments. As shown in FIG. 15, this manufacturing apparatus 110 includes an extrusion molding machine 111, a pair of endless conveyors 114 and 115 configured to have endless belts 112 and 113, a drive motor 16 configured to drive the endless belts 112 and 13, a transmission 117 configured to have chains and gears and change the moving speeds of the endless belts 112 and 113, a water tank 118 configured to make the pair of endless conveyors 114 and 115 partly submerged in water, a controller 119 and various meters and gauges.

The above description regarding the apparatus 10 or the apparatus 50 for manufacturing the core material for cushion is applied to the endless belts 112 and 113 or the like.

Figure 16A:
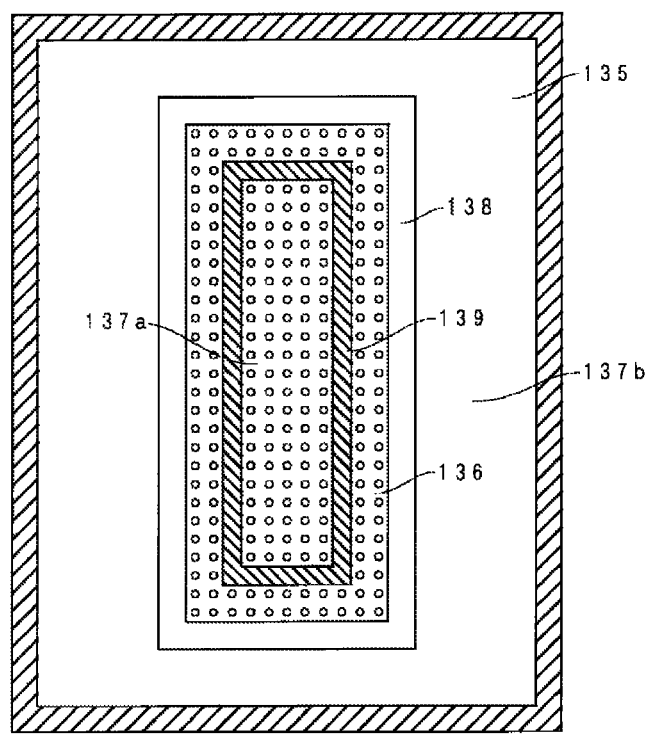
FIG. 16A is a vertical sectional view illustrating the periphery of an upper portion of a nozzle in a complex die in the apparatus for manufacturing the core material for cushion of the second embodiment.
Figure 16B:
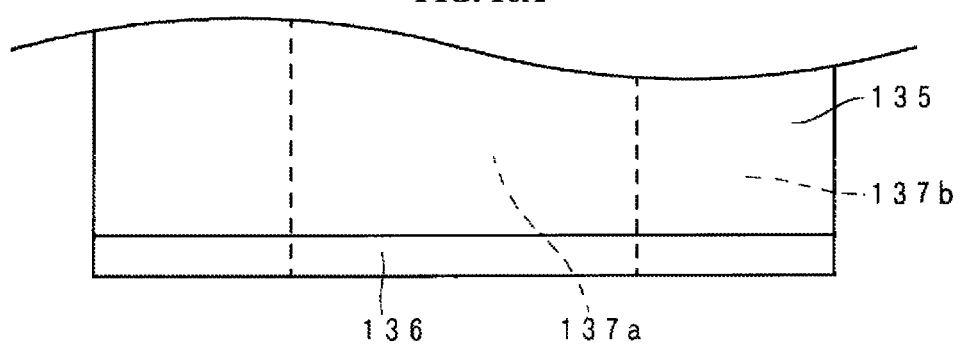
FIG. 16B is a front view illustrating a lower portion of the complex die.
Figure 17A:
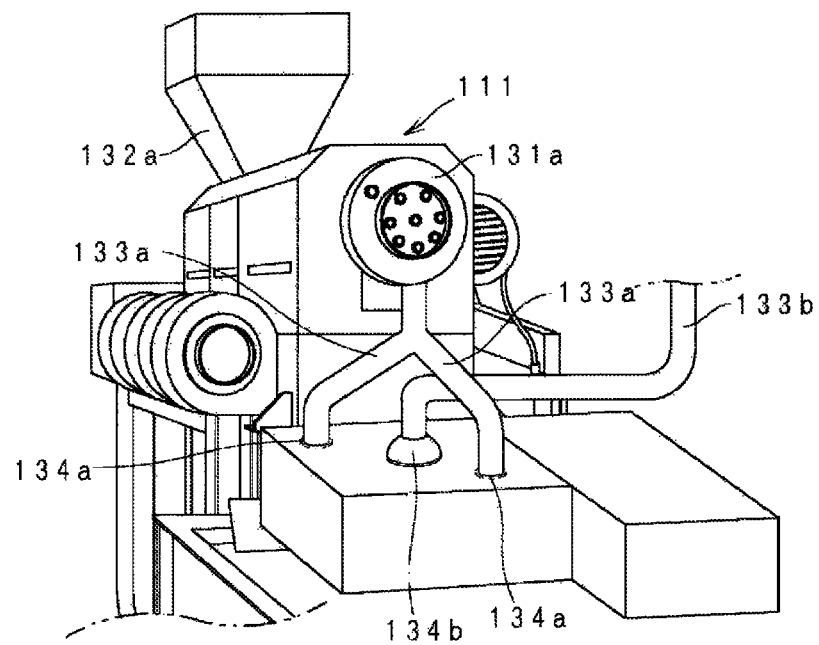
FIGS. 17A and 17B are diagrams illustrating modifications of the apparatus for manufacturing the core material for cushion of the second embodiment.
Figure 17B:
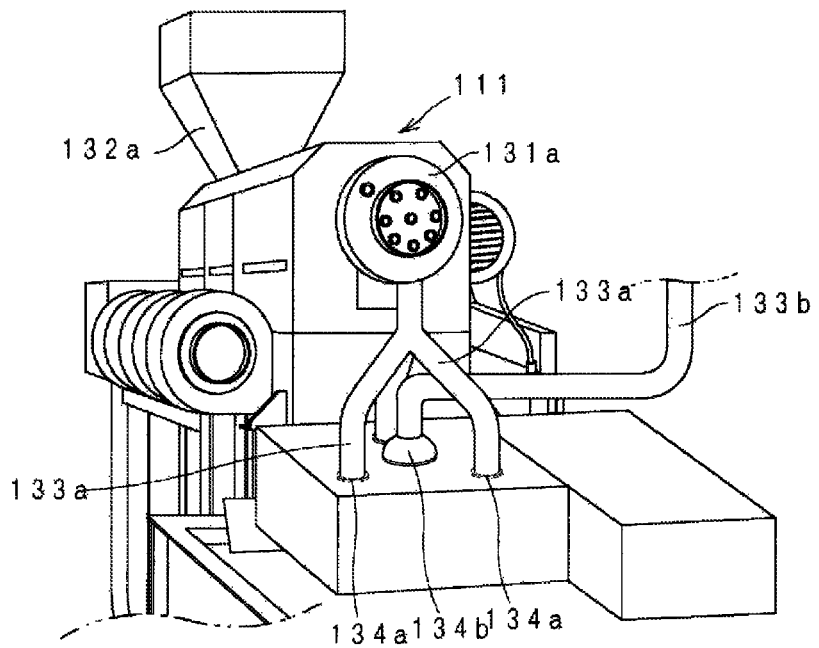

As shown in FIG. 15, the extrusion molding machine 111 includes containers 131a and 131b that are configured to store an identical or different thermoplastic resin raw materials, material feed ports 132a and 132b that are respectively provided above the containers 131a and 131b, material supply pipes 133a and 133b that are respectively connected with the containers 131a and 131b, a complex die 135 (shown in FIG. 16) that is connected with the material supply pipes 133a and 133b via packing elements 134a and 134b, and a nozzle 136 (shown in FIG. 16) that is detachably mountable to a lower end of the complex die 135. The material supply pipe 133a is branched in the middle into a plurality of (four in the illustrated example) branch pipes, which are laid above the material supply pipe 133b. The lower ends of the branch pipes of the material supply pipe 133a are placed around the lower end of the material supply pipe 133b. As shown in FIGS. 16A and 16B, the complex die 135 is configured such that a frame-like partition wall 139 is provided in an inner area of an outer frame 138 to divide the inside of the complex die 135 into two chambers 137a and 137b and thereby prevent two different raw materials supplied through the material supply pipes 133a and 133b from being mixed. Even in the case where an identical raw material is supplied, it is preferable to provide the partition wall 139 for the purpose of separately adjusting the extrusion rates. The above description regarding the apparatus 10 or the apparatus 50 for manufacturing the core material for cushion is applied to the details of the internal configuration of the die of the extrusion molding machine 111. The material supply tube 133a is branched into four branch pipes in the embodiment but may be branched in any adequate number of branch pipes, for example, two (shown in FIG. 17A) or three (shown in FIG. 17B).

Figure 18A:
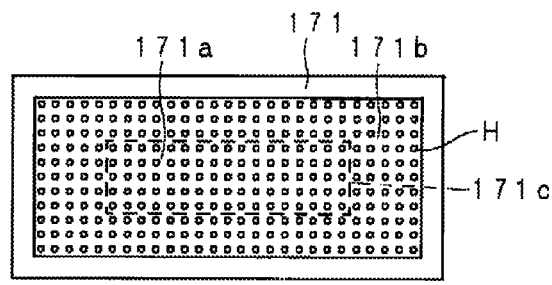
FIGS. 18A, 18B and 18D are plan views illustrating various configurations of nozzles in a die.

The nozzle 136 has two or more areas configured to separately supply raw materials. This configuration significantly facilitates adjustment of the extrusion rate or the extrusion volume of filaments and remarkably improves the moldability. The above description regarding the apparatus 10 or the apparatus 50 for manufacturing the core material for cushion is applied to the details of the nozzle. An available example is a nozzle 171 (shown in FIG. 18A) configured to have holes H arranged at substantially equal intervals or at adequate intervals ((the size of the area filled with the nozzle holes H occupies 90% of the total area of the nozzle 171). This nozzle 171 has an inner area 171a and an outer area 171b separated by a partition wall 171c shown by the dotted line. The inner area 171a and the outer area 171b are provided respectively corresponding to the material supply pipe 133a and the material supply pipe 133b to separately and independently extrude filaments of an identical or different raw materials.

Figure 18B:
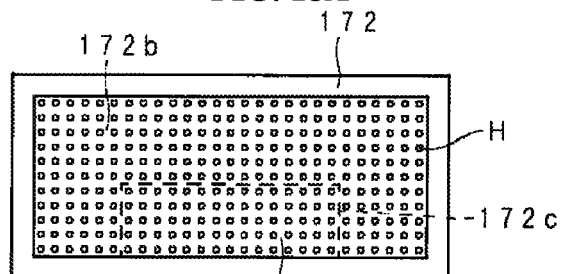

Another available example is a nozzle 172 (shown in FIG. 18B) configured such that an inner area 172a and an outer area 172b having a large number of holes H are separated by a partition wall 172c shown by the dotted line and the inner area 172a is located to one side relative to the outer area 172b. This configuration facilitates separation of filaments corresponding to the inner area 172a.

Figure 18C:
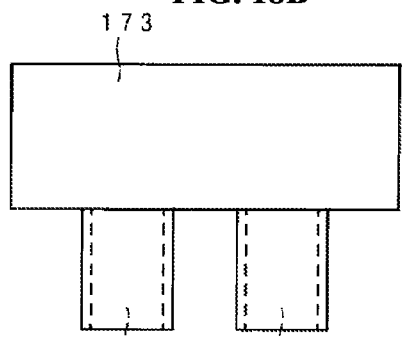
FIG. 18C is a front view of FIG. 18D.
Figure 18D:
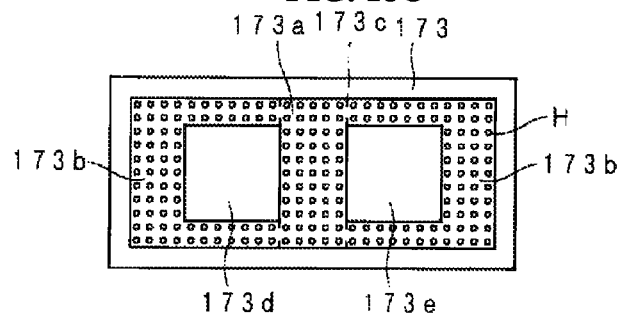

Another available example is a nozzle 173 (shown in FIGS. 18C and 18D) configured such that an inner area 173a and outer areas 173b having a large number of holes H are separated by a partition wall 173c shown by the dotted line and the inner area 173a is placed between the outer areas 173b. The nozzle 173 includes areas 173d and 173e without holes H formed in predetermined locations for formation of cavities and has rectangular guide members (for example, pipes) 173f and 173g that are extended downward from the areas 173d and 173e.

Figure 19A:
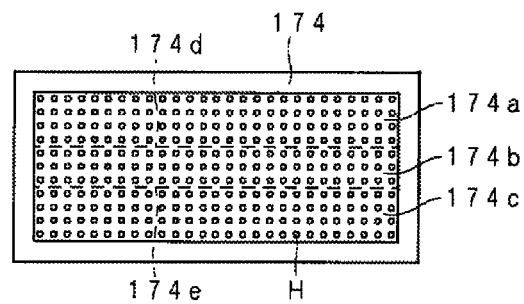
FIGS. 19A to 19D are plan views illustrating various configurations of nozzles in a die.

Another available example is a nozzle 174 (shown in FIG. 19A) configured such that an upper area 174a, a middle area 174b and a lower area 174c having a large number of holes H are separated by partition walls 174d and 174e shown by the dotted line to form a three-layered structure.

Figure 19B:
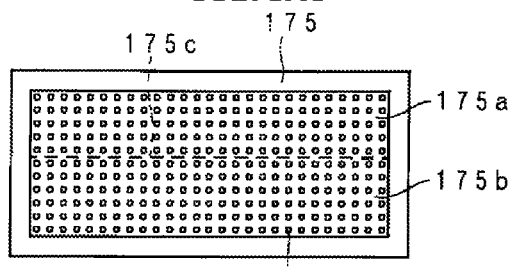

Another available example is a nozzle 175 (shown in FIG. 19B) configured such that an upper area 175a and a lower area 175b having a large number of holes H are separated by a partition wall 175c shown by the dotted line to form a two-layered structure.

Figure 19C:
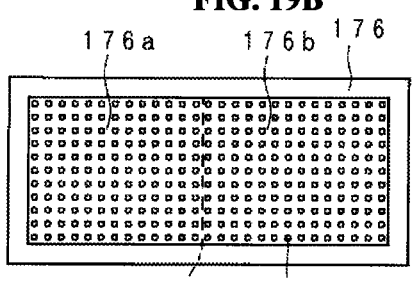

Another available example is a nozzle 176 (shown in FIG. 19C) configured such that a left area 176a and a right area 176b having a large number of holes H are separated by a partition wall 176c shown by the dotted line to form a two-layered structure.

Figure 3B:
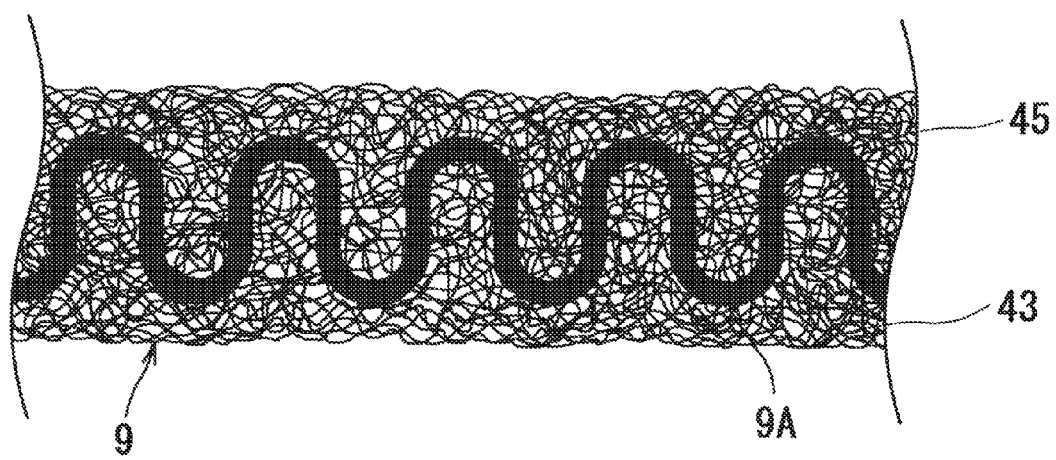
FIG. 3B is a side view illustrating the core material for cushion according to the ninth embodiment.
Figure 19D:
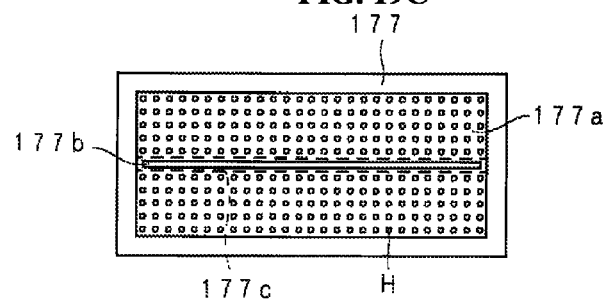

Another available example is a nozzle 177 (shown in FIG. 19D) configured such that an area 177a having a large number of holes H and a slit (linear groove) 177b formed at an adequate location, for example, in a middle part parallel to a predetermined direction (longitudinal direction in the illustrated example) are separated by a partition wall 177c shown by the dotted line. The slit 177b is located inside of the area of the partition wall 177c. The groove width, the length and the position of the slit (linear groove) 177b may be selected adequately. In the case where the raw material is supplied from one identical die to the area 177a having the large number of holes H and the slit (linear groove) 177b, the waveform of FIG. 3B is likely to be deformed and cause poor moldability. The configuration of the nozzle 177, however, allows raw materials to be separately and independently supplied from two or more different extrusion molding machines 111 to the holes H of the area 177a and o the slit 177b. This advantageously forms a favorable waveform. The slit 177b may be replaced by holes H. In this case, it is preferable to increase the density of the holes H.

The nozzle may have any of various other configurations. The density of the holes H formed in the nozzle is preferably 1 to 5 holes/cm².

The above description is applied to the method of manufacturing such core materials for cushion.

In the configurations of the core materials for cushion 101 to 106 of the tenth to the fifteenth embodiments, the resins that are difficult to be separated or unable to be separated are divided into the first area 101a and the second area 101b and are separated from each other for recycling. This allows for repeated recycling. A three-dimensional net-like structure may be manufactured to have divisional areas according to the characteristics of thermoplastic resins. This ensures smooth recycling of the thermoplastic resins. Another advantage is that the later shape change is allowed by the simple operation of, for example, area separation. Separately and independently supplying the raw materials from a plurality of extrusion molding machines into the nozzle improves the moldability of the three-dimensional net-like structure.

In the core material for cushion, the layer including the polyolefin resin and the layer including the polyester and/or polyurethane elastomer may be bonded to each other, may be stitched to each other or may be simply stacked without bonding or stitching. Stacking herein is not limited to stacking flat layers but also includes providing an outer layer on an inner layer. The layer including the polyolefin resin and the layer including the polyester and/or polyurethane elastomer may be unified in an inner bag or the like having high air permeability or may be integrated with a cover or a case described later by quilting.

A mattress is provided by placing an air-permeable cover over the entire side facing the layer including the polyester and/or polyurethane elastomer of the core material for cushion. In the description hereof, the cover means a visible outer case. The air-permeable cover has the air permeability in the thickness direction (JIS-L-1018) of preferably not lower than 10 cc/cm²/sec, more preferably not lower than 50 cc/cm²/sec or furthermore preferably not lower than 100 cc/cm²/sec. The air-permeable cover is, however, not limited to those having this property but may be a bag made of a conventionally used fabric or material such as cotton or polyester or a quilt material by quilting thin double raschel fabric of cotton or polyester. The air-permeable cover may be configured by using different material for the lying surface and the other surfaces. For example, the lying surface may be formed from a three-dimensional double raschel knit that has low skin irritancy and high air permeability and allows the user to directly lie on. The surfaces other than the lying surface may be coated with a quilt cover material. The peripheral edge of the three-dimensional knit and the cover material may be stitched to each other. This takes advantage of the excellent air permeability of the three-dimensional net-like structure placed inside. According to another possible configuration, an upper layer (A) is provided by wrapping a layer including a polyester and/or polyurethane elastomer in an inner bag of, for example, double raschel fabric, and a lower layer (B) is formed from a PE net-like structure. The upper layer and the lower layer (A)+(B) are entirely coated with a quilt cover or a double raschel fabric cover.

A mattress suitable for medical care is provided by placing a water-impermeable cover over the entire side of the core material for cushion facing the layer including the polyester and/or polyurethane elastomer. The water-impermeable cover is a cover made of, for example, artificial leather, polyvinyl chloride, water-repellent polyurethane sheet, nylon taffeta or polyester taffeta. The water-impermeable cover may be configured by making the lying surface and the other surfaces from different materials and stitching the boundaries of these surfaces.

An apparatus 210 for manufacturing a core material for cushion according to another embodiment is configured to provide a method of manufacturing a three-dimensional net-like structure that suppresses potential troubles due to deformation of endless belts, eliminates the need for finishing in the post process, increases the degree of alignment, has applicability to atypical shapes and improves the durability and a corresponding manufacturing apparatus.

Figure 20:
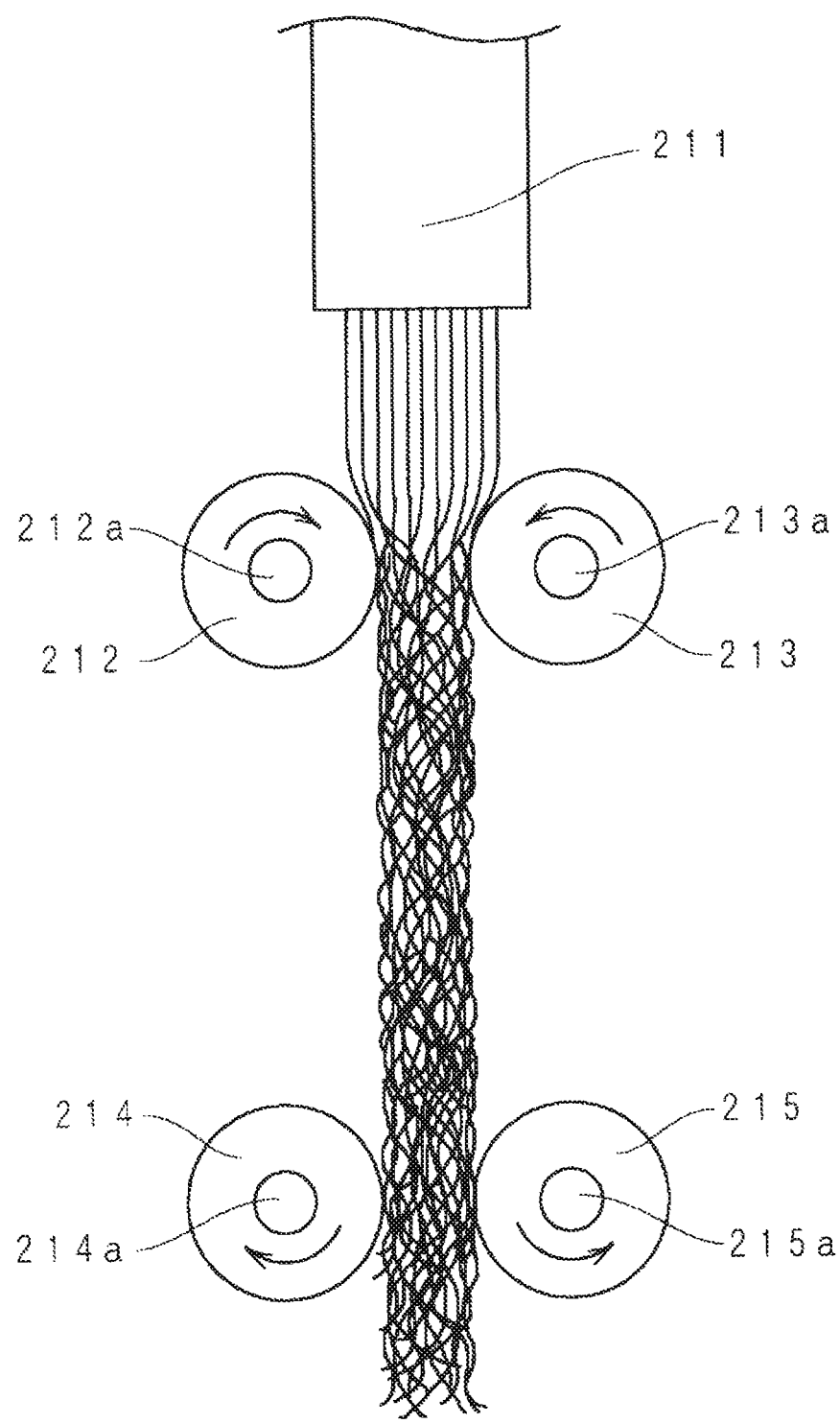
FIG. 20 is a diagram illustrating the operations of an apparatus for manufacturing a core material for cushion according to another embodiment.
Figure 22A:
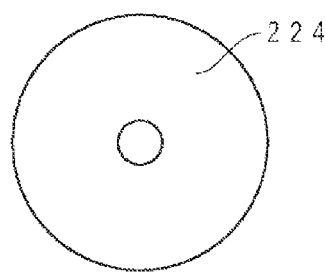
FIGS. 22A to 22G are side views illustrating the apparatus for manufacturing the core material for cushion and modifications of rolls.
Figure 22B:
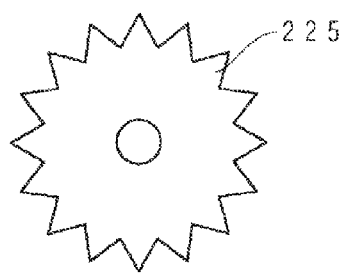
Figure 22C:
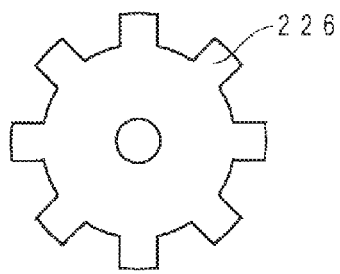
Figure 22D:
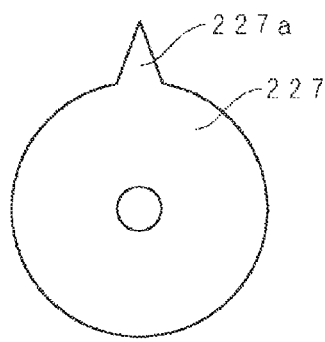
Figure 22E:
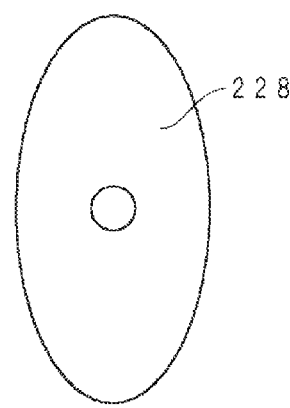
Figure 22F:
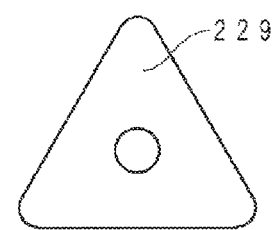
Figure 22G:
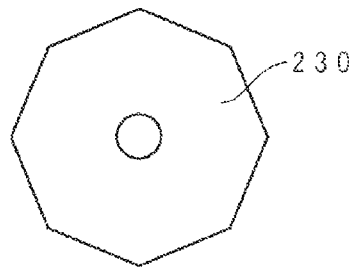

The above description of the first embodiment is applied to the apparatus 210 for manufacturing the core material for cushion, and the following describes a configuration that is different from the first embodiment. The apparatus 210 for manufacturing the core material for cushion includes an extrusion molding machine 211, a pair of rolls 212 and 213 arranged horizontally across a predetermined interval, a pair of rolls 214 and 215 placed below and respectively aligned with the pair of rolls 212 and 213 to be arranged horizontally across the predetermined interval (as shown in FIG. 20), a drive motor configured to drive the rolls 212 to 215, a transmission configured to have chains and gears and change the moving speeds of the rolls 212 to 215, a water tank configured to make the pair of rolls 212 and 213 partly submerged and the pair of rolls 214 and 215 completely submerged in water, a controller and various meters and gauges. A modified configuration may omit one of the lower rolls shown in FIG. 20 and use three rolls. A roll 224 formed in a circular sectional shape (shown in FIG. 22A), as well as rolls having various atypical sectional shapes are employable for the rolls 212 and 213. Available examples include a roll 225 formed to have a circumferential surface in a jagged sectional shape (shown in FIG. 22B), a roll 226 formed to have a circumferential surface in a continuous concave-convex shape, for example, a circumferential surface in a gear sectional shape (shown in FIG. 22C), a roll 227 formed with one or more projection 227a (for example, in a triangular shape or a circular shape) on a circumferential surface (shown in FIG. 22D, a roll 228 formed in an elliptical sectional shape (shown in FIG. 22E), a roll 229 formed in a triangular or chamfered triangular sectional shape (shown in FIG. 22F) and a roll 230 formed in a polygonal sectional shape, for example, octagonal sectional shape (shown in FIG. 22G).

Figure 21A:
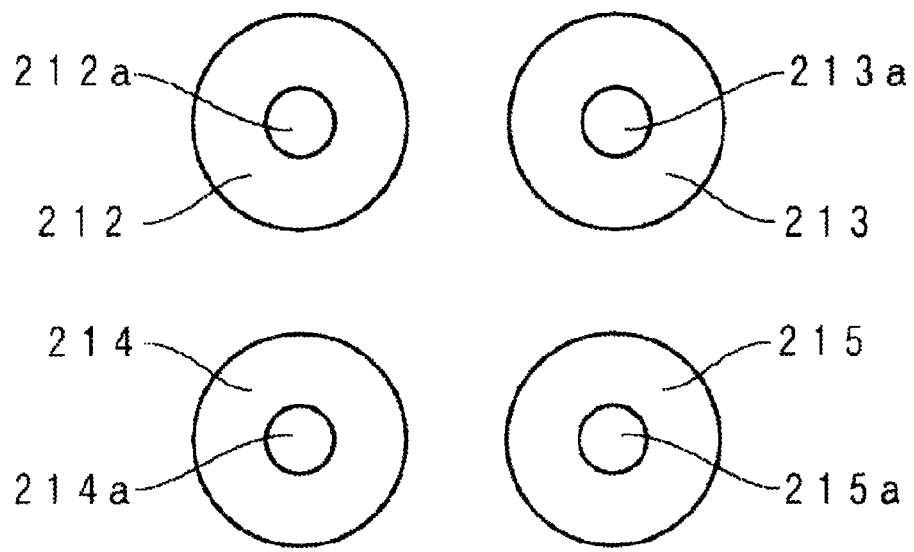
FIGS. 21A and 21B are respectively a side view and a front view of rolls in the apparatus for manufacturing the core material for cushion.
Figure 21B:
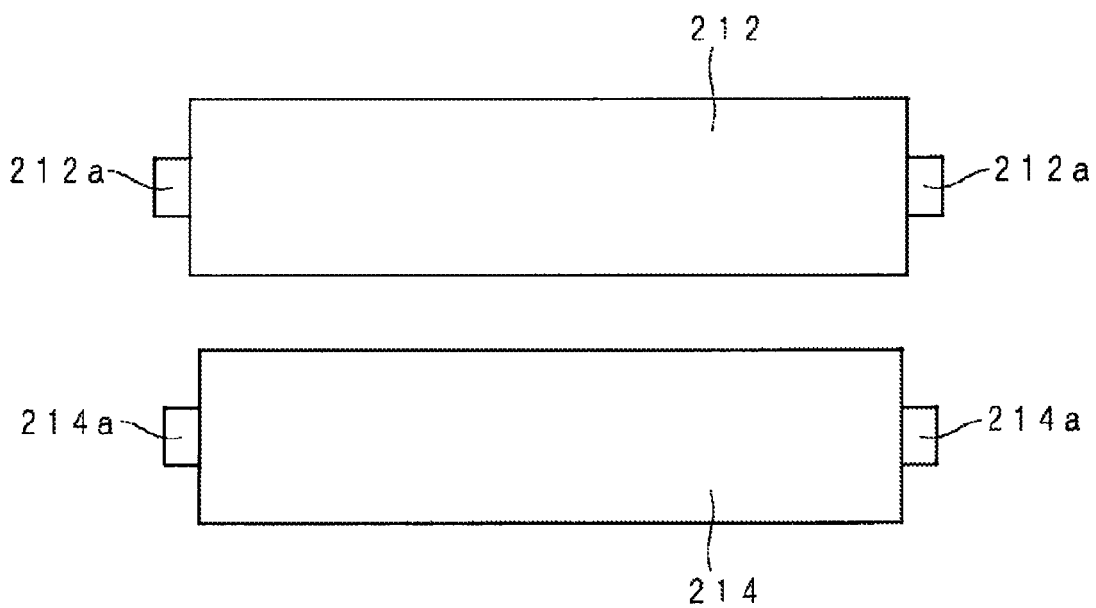

As shown in FIG. 21, the rolls 212 to 215 respectively have drive shafts 212a to 215a. The drive shafts 212a to 215a are supported by corresponding bearings to be rotatable and are driven by the drive motor via the transmission in the directions of arrows shown in FIG. 20.

The apparatus 210 for manufacturing the core material for cushion described above eliminates the need for finishing such as cutting or shape forming (profile forming) in the post process to a net-like structure in a desired atypical shape, increases the degree of alignment, has applicability to atypical shapes and improves the durability. The configuration of this embodiment immediately provides a product without finishing in the post process for a desired shape and desired dimensions and thereby eliminates the need for the post process.

The apparatus may be configured to manufacture a three-dimensional net-like structure that is made of or mainly made of a thermoplastic resin as a raw material, is formed by extrusion molding a plurality of filaments to be spirally tangled at random and partly thermally bonded, cooling down with a liquid and applying a flame retardant material, wrapping with a carbon fiber non-woven fabric or adding a flame retardant material to the thermoplastic resin.

Figure 23:
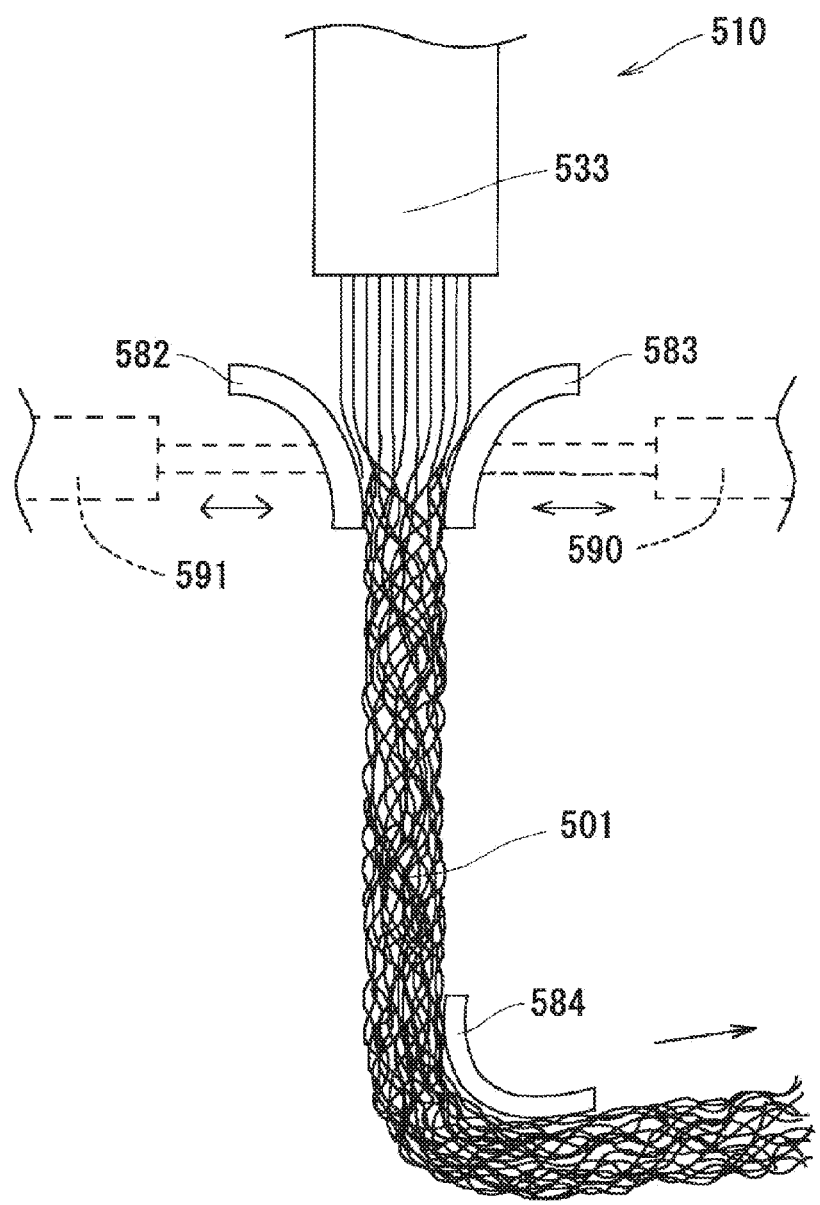
FIG. 23 is a configuration diagram illustrating part of an apparatus for manufacturing a core material for cushion according to a fourth embodiment.

As shown in FIG. 23, an apparatus 510 for manufacturing a core material for cushion according to a fourth embodiment uses chutes 582 and 583 of bent plates, in place of endless belts or rolls, to form a three-dimensional net-like structure 501. The chutes 582 and 583 are extended perpendicularly to the sheet surface and include surfaces having slippage provided by, for example, polytetrafluoroethylene coating. The chutes 582 and 583 are formed in a rectangular shape in the side view. The chutes 582 and 583 are arranged to have the interval gradually decreasing from the top to the bottom. The chutes 582 and 583 may have a fixed configuration or may have a movable configuration to vary the interval by reciprocation driving devices 590 and 591 (for example, hydraulic cylinders) as shown by the dotted line and thereby change the density, the shape and the like of the three-dimensional net-like structure from front to back and from side to side. Another chute 584 is provided below the chutes 582 and 583 to adequately guide the three-dimensional net-like structure 501 to a downstream haul-off machine.

The invention is described more specifically with reference to some examples. The invention is, however, not limited to these examples. The following methods were employed in the examples for measurement and evaluation of characteristic values.

(1) Filament Diameter (mm)

Resin filaments were cut from a center portion of each sample. The thicknesses of the resin filaments were measured five times with a caliper, and the average of five measurement values was specified as the filament diameter with regard to S1 and S2. The filament diameter of an elastomer sample was estimated from the result of measurement of a polyester sample. The temperature was set to 60° C. with annealing and set to 23° C. without annealing.

(2) Sample Thickness and Bulk Density (g/cm$^3$)

Each sample was cut in the size of 30 cm×30 cm. After being left under no load for 24 hours, the height of the same was measured at four different positions. The average of the four measured values was specified as the sample thickness. The volume of the sample was calculated from the sample thickness, and the bulk density of the sample was calculated by dividing the weight of the sample by the volume.

(3) Average Diameter (mm) of Random Loops

Each sample was cut in the size of 20 cm×20 cm. With regard to random loops in irregular shapes formed on the surface in the extruding direction, the lengths of the major axes of ten loops were measured. The average value was rounded down to the centimeter and was specified as the average diameter of random loops.

(4) Hardness (N)

Each sample was cut in the size of 30 cm (in length)×30 cm (in width). The test piece was measured in conformity with JIS K 6400-2: 2012 method A. The test temperature was 23° C., and the humidity was 50%.

(5) Impact Resilience (cm)

Each sample was cut in the size of 30 cm (in length)×30 cm (in width). The test piece was measured in conformity with JIS K 6400-3: 2011. A steel ball of 41.5 mm in diameter and 290 g in weight was used. The drop height was 500 mm. The test temperature was 23° C., and the humidity was 50%.

(6) Impact Resilience Change Rate (%) after Repeated Load Test

Each sample was cut in the size of 30 cm (in length)×30 cm (in width), and an impact resilience (a) of the sample before a repeated load test was measured by the method described in (5). After measurement of the impact resilience, the sample was subjected to a repeated load compression test. The repeated load compression test was performed in conformity with the repeated compressive residual stress test method A (fixed loading method) of JIS K6400-4. The repeated load compression test was performed at the temperature of 23±2° C. and the relative humidity of 50±5%. The method A (fixed loading method) uses a pressure plate of 25 cm in diameter and repeatedly compresses a sample under a load of 750 N±20 N 80000 times at a rate of 70±5 times per minute. A time duration when the maximum load 750±20 N is applied is set to be not longer than 25% of a time duration required for repeated compression. After completion of the test, the sample was left under no load for 100±0.5 minutes. An impact resilience (b) after the repeated load test was measured by the method described in (5). An impact resilience change rate (%) after the repeated load test was calculated according to the following equation by dividing the impact resilience after the repeated load test by the impact resilience before the repeated load test: (impact resilience change rate (%) after repeated load test=(1−(b)/(a))×100

(7) Compression Deflection (%)

Each sample was cut in the size of 30 cm (in length)×30 cm (in width). The test piece was measured in conformity with JIS K 6400-2: 2012 method E. The test temperature was 23° C., and the humidity was 50%.

(8) Hysteresis Loss (%)

Each sample was cut in the size of 30 cm (in length)×30 cm (in width). The test piece was measured in conformity with JIS K 6400-2: 2012 method E.

(9) Thermal Expansion Rate (%) before and after Hot-Air Drying Test

Each sample was cut in the size of 30 cm (in length)×30 cm (in width). Marking was made at two positions away from each other by 25 cm in the longitudinal direction and two positions away from each other by 25 cm in the lateral direction of the test piece. The marking was made with a pen to be readily recognizable even after the dry heating process. After the marking, the test piece was placed in a hot air drying oven for 30 minutes. The test piece was then taken out of the hot air drying oven and was cooled down at ambient temperature of 22° C. for 30 minutes. After cooling, the marking distances were measured at two different positions in each of the longitudinal direction and the lateral direction. The average values of the respective two positions were specified as longitudinal length after the test and lateral length after the test. A measuring instrument capable of measuring down to 0.01 cm was used for measurement of all the lengths. The thermal expansion rate before and after the hot-air drying test was calculated by (25−measured length)/25×100. The temperature of the hot-air drying test was set to 90° C. for the polyethylene resin, was 130° C. for the polyester thermoplastic elastomer and was 90° C. for the mixture of the polyethylene resin and the polyethylene thermoplastic elastomer.

Marking was made at two positions away from each other by 25 cm in the longitudinal direction and two positions away from each other by 25 cm in the lateral direction of the test piece before the dry heating process. The marking was made with a pen to be readily recognizable even after the dry heating process. After the marking, the test piece was placed in a hot air drying oven for 30 minutes. The test piece was then taken out of the hot air drying oven and was cooled down at ambient temperature of 22° C. for 30 minutes. After cooling, the marking distances were measured at two different positions in each of the longitudinal direction and the lateral direction. The average values of the respective two positions were specified as longitudinal length after the test and lateral length after the test. A measuring instrument capable of measuring down to 0.01 cm was used for measurement of all the lengths. The thermal expansion rate before and after the hot-air drying test was calculated by (25−measured length)/25×100.

(9) Tensile Strength (N)

Each sample was cut in the size of 20 cm (in length)×5 cm (in width). The test piece was fastened to a jig with fixing brackets placed across a distance of 10 cm. The tension rate was 10 cm/min. The room temperature during measurement was 20° C., and the humidity was 65%. A jig for fixation was used for the thermoplastic elastomer having a certain thickness. The test temperature was 23° C., and the humidity was 50%. Each sample was measured twice in each of the longitudinal direction and the lateral direction. The maximum point load was specified as the measurement value.

EXAMPLES

Example 1

Example 1 was an example of the layer 43. The conditions employed were as follows: the screw diameter of an extrusion machine was 65 mm; the temperature of a die was 205° C.; the die had the width of 890 mm and the thickness of 75 mm; the hole pitch was 10 mm; the nozzle hole diameter was 1.6 mm; and the air gap (distance between the lower surface of the nozzle and the water level) was 67 mm. Hexane, hexene and ethylene as main raw materials were polymerized by a known method using a metallocene compound as the catalyst. An obtained ethylene/α-olefin copolymer had the melt viscosity (Pa·s) of 1.05 at the shear rate of 24.3 $\sec^{-1}$, 1.12 at the shear rate of 60.8 $\sec^{-1}$, 1.15 at the shear rate of 121.6 $\sec^{-1}$, 1.18 at the shear rate of 243.2 $\sec^{-1}$, 1.23 at the shear rate of 608.0 $\sec^{-1}$ and 1.26 at the shear rate of 1216 $\sec^{-1}$, the MFR of 12 g/10 min and the density of 0.90 g/cm$^3$. Filaments of the ethylene/α-olefin copolymer were ejected downward from a nozzle at the extrusion rate of 86 kg/h at the melt temperature of 180° C. The lower ends of chutes were placed 36 mm below the nozzle surface and were submerged in water. A pair of stainless steel haul-off conveyors of 105 cm in width were placed parallel to each other across an opening width of 71 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional net-like structure. The respective surfaces of the net-like structure in the molten state were placed between the haul-off conveyors and were hauled off into warm water of 36° C. at the haul-off rate of 6.7 mm/sec to be solidified and flattened. The three-dimensional net-like structure was cut into a predetermined size and was subjected to annealing by dry heating process with the hot air of 60° C. for 5 minutes. The resulting three-dimensional net-like structure was formed in a rectangular sectional shape from filaments of 0.6 to 1.1 mm in diameter and had the flattened surfaces, the bulk specific gravity of 53 kg/m$^3$, the thickness of 75 mm, the width of 890 mm, the thermal expansion rates of 2.31% in the lateral direction and 1.52% in the longitudinal direction before and after the hot-air drying test at 90° C. for 5 minutes, the hysteresis loss of 28.7%, the impact resilience of 31 cm and the impact resilience change rate of 0% after the repeated load test. The temperature was 19° C., and the humidity was 42%.

Example 2

Example 2 was another example of the layer 43. The conditions employed were as follows: the screw diameter of an extrusion machine was 40 mm; the temperature of a die was 190° C.; the die had the width of 500 mm and the thickness of 25 mm; the hole pitch was 10 mm; the nozzle hole diameter was 1.6 mm; and the air gap (distance between the lower surface of the nozzle and the water level) was 38 mm. Filaments of an ethylene/α-olefin copolymer (produced from the same raw materials as those of Example 1) and polyethylene were ejected downward from a nozzle at the extrusion rate of 13 kg/h at the melt temperature of 160° C. The lower ends of chutes were placed 36 mm below the nozzle surface and were submerged in water. A pair of stainless steel haul-off conveyors of 55 cm in width were placed parallel to each other across an opening width of 23 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional net-like structure. The respective surfaces of the net-like structure in the molten state were placed between the haul-off conveyors and were hauled off into warm water of 36° C. at the haul-off rate of 4.1 mm/sec to be solidified and flattened. The three-dimensional net-like structure was cut into a predetermined size and was subjected to annealing by dry heating process with the hot air of 60° C. for 5 minutes. The resulting three-dimensional net-like structure was formed in a rectangular sectional shape from filaments of 0.6 to 1.1 mm in diameter and had the flattened surfaces, the bulk specific gravity of 70 kg/m$^3$, the thickness of 25 mm, the width of 500 mm, the thermal expansion rates of 1.87% in the lateral direction and 1.39% in the longitudinal direction before and after the hot-air drying test at 90° C. for 5 minutes, the hysteresis loss of 28.6%, the impact resilience of 33 cm and the impact resilience change rate of 6.1% after the repeated load test. The temperature was 21° C., and the humidity was 48%.

Example 3

Example 3 was an example of the layer 45. The conditions employed were as follows: the screw diameter of an extrusion machine was 65 mm; the temperature of a die was 217° C.; the die had the width of 900 mm and the thickness of 30 mm; the hole pitch was 10 mm; the nozzle hole diameter was 1 mm; and the air gap (distance between the lower surface of the nozzle and the water level) was 69 mm. A thermoplastic elastomer (Hytrel (registered trademark)) had the melt viscosity (Pa·s) of 1.26 at the shear rate of 60.8 sec$^{-1}$, 1.28 at the shear rate of 121.6 sec$^{-1}$, 1.30 at the shear rate of 243.2 sec$^{-1}$, 1.30 at the shear rate of 608.0 sec$^{-1}$ and 1.33 at the shear rate of 1216 sec$^{-1}$, the MFR of 14 g/10 min and the density of 1.08 g/cm$^3$. Filaments of the thermoplastic elastomer were ejected downward from a nozzle at the extrusion rate of 27.5 kg/h at the melt temperature of 195° C. The lower ends of chutes were placed 69 mm below the nozzle surface and were submerged in water. A pair of stainless steel haul-off conveyors of 105 cm in width were placed parallel to each other across an opening width of 70 mm to be arranged partly above the water surface. The ejected filaments in the molten state were solidified on the chutes with supply of water heated to 63° C. The filaments were brought in contact with one another and were tangled to form loops, while being fused at the points of contact, so as to form a three-dimensional net-like structure. The respective surfaces of the net-like structure in the molten state were placed between the haul-off conveyors, were hauled off at the haul-off rate of 3.9 mm/sec to be solidified and flattened, and were annealed with hot water of 80° C. The three-dimensional net-like structure was cut into a predetermined size and was subjected to annealing by dry heating process with the hot air of 130° C. for 5 minutes. The resulting three-dimensional net-like structure was formed in a rectangular sectional shape from filaments of 0.5 to 1.0 mm in diameter and had the flattened surfaces, the bulk specific gravity of 71 kg/m$^3$, the thickness of 30 mm, the width of 900 mm, the thermal expansion rates of 0.78% in the lateral direction and 1.7% in the longitudinal direction before and after the hot-air drying test at 130° C. for 5 minutes, the hysteresis loss of 19.1%, the impact resilience of 33 cm and the impact resilience change rate of 0% after the repeated load test. The temperature was 33° C., and the humidity was 48%.

Example 4

Example 4 was another example of the layer 45. The conditions employed were as follows: the screw diameter of an extrusion machine was 65 mm; the temperature of a die was 225° C.; the die had the width of 900 mm and the thickness of 73 mm; the hole pitch was 10 mm; the nozzle hole diameter was 1.6 mm; and the air gap (distance between the lower surface of the nozzle and the water level) was 69 mm. Filaments of a thermoplastic elastomer (Hytrel (registered trademark)) (the same raw material as that of Example 3) were ejected downward from a nozzle at the extrusion rate of 40 kg/h at the melt temperature of 202° C. The lower ends of chutes were placed 69 mm below the nozzle surface and were submerged in water. A pair of stainless steel haul-off conveyors of 105 cm in width were placed parallel to each other across an opening width of 72 mm to be arranged partly above the water surface. The ejected filaments in the molten state were solidified on the chutes with supply of water heated to 63° C. The filaments were brought in contact with one another and were tangled to form loops, while being fused at the points of contact, so as to form a three-dimensional net-like structure. The respective surfaces of the net-like structure in the molten state were placed between the haul-off conveyors, were hauled off at the haul-off rate of 2.7 mm/sec to be solidified and flattened, and were annealed with hot water of 80° C. The three-dimensional net-like structure was cut into a predetermined size and was subjected to annealing by dry heating process with the hot air of 130° C. for 5 minutes. The resulting three-dimensional net-like structure was formed in a rectangular sectional shape from filaments of 0.5 to 1.2 mm in diameter and had the flattened surfaces, the bulk specific gravity of 63 kg/m$^3$, the thickness of 73 mm, the thermal expansion rates of 1.22% in the lateral direction and 3.08% in the longitudinal direction before and after the hot-air drying test, the hysteresis loss of 18.5%, the impact resilience of 34 cm and the impact resilience change rate of 5.9% after the repeated load test. The temperature was 30° C., and the humidity was 44%.

Example 5

Example 5 was another example of the layer 43. The conditions employed were as follows: the screw diameter of an extrusion machine was 40 mm; the temperature of a die was 195° C.; the die had the width of 500 mm and the thickness of 51 mm; the hole pitch was 10 mm; the nozzle hole diameter was 1 mm; and the air gap (distance between the lower surface of the nozzle and the water level) was 38 mm. Filaments of a mixture including an ethylene/α-olefin copolymer (produced from the same raw materials as those of Example 1) as the main component and an incombustible material were ejected downward from a nozzle at the extrusion rate of 23 kg/h at the melt temperature of 160° C. The lower ends of chutes were placed 38 mm below the nozzle surface and were submerged in water. A pair of stainless steel haul-off conveyors of 55 cm in width were placed parallel to each other across an opening width of 40 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional net-like structure. The respective surfaces of the net-like structure in the molten state were placed between the haul-off conveyors and were hauled off into warm water of 36° C. at the haul-off rate of 6.8 mm/sec to be solidified and flattened. The three-dimensional net-like structure was cut into a predetermined size and was subjected to dry heating process with the hot air of 60° C. for 5 minutes. This provided a three-dimensional net-like structure having the bulk density of 45 kg/m³. The resulting three-dimensional net-like structure was formed in a rectangular sectional shape from filaments of 0.7 to 1.3 mm in diameter and had the flattened surfaces, the bulk specific gravity of 50 kg/m³, the thickness of 51 mm, the width of 400 mm, the thermal expansion rates of 2.68% in the lateral direction and 1.28% in the longitudinal direction before and after the hot-air drying test at 90° C. for 5 minutes, the hysteresis loss of 27.0%, the impact resilience of 24 cm and the impact resilience change rate of 16.7% after the repeated load test. The temperature was 15° C., and the humidity was 52%.

Example 6

Example 6 was another example of the layer 43. The conditions employed were as follows: the screw diameter of an extrusion machine was 40 mm; the temperature of a die was 195° C.; the die had the width of 500 mm and the thickness of 25 mm; the hole pitch was 10 mm; the nozzle hole diameter was 1 mm; and the air gap (distance between the lower surface of the nozzle and the water level) was 38 mm. Hexane, hexene and ethylene as main raw materials were polymerized by a known method using a metallocene compound as the catalyst. Filaments of a mixture including the resulting ethylene/α-olefin copolymer (produced from the same raw materials as those of Example 1) as the main component and an incombustible material were ejected downward from a nozzle at the extrusion rate of 17 kg/h at the melt temperature of 160° C. The lower ends of chutes were placed 36 mm below the nozzle surface and were submerged in water. A pair of stainless steel haul-off conveyors of 55 cm in width were placed parallel to each other across an opening width of 40 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional net-like structure. The respective surfaces of the net-like structure in the molten state were placed between the haul-off conveyors and were hauled off into warm water of 36° C. at the haul-off rate of 4.5 mm/sec to be solidified and flattened. The three-dimensional net-like structure was cut into a predetermined size and was subjected to dry heating process with the hot air of 60° C. for 5 minutes. This provided a three-dimensional net-like structure having the bulk density of 65 kg/m³. The resulting three-dimensional net-like structure was formed in a rectangular sectional shape from filaments of 0.7 to 1.3 mm in diameter and had the flattened surfaces, the bulk specific gravity of 50 kg/m³, the thickness of 43 mm, the width of 400 mm, the thermal expansion rates of 2.06% in the lateral direction and 1.22% in the longitudinal direction before and after the hot-air drying test at 90° C. for 5 minutes, the hysteresis loss of 30.0%, the impact resilience of 32 cm and the impact resilience change rate of 12.5% after the repeated load test. The temperature was 21° C., and the humidity was 48%.

Example 7

Example 7 was another example of the layer 43. The conditions employed were as follows: the screw diameter of an extrusion machine was 40 mm; the temperature of a die was 205° C.; the die had the width of 500 mm and the thickness of 60 mm; the hole pitch was 10 mm; the nozzle hole diameter was 1 mm; and the air gap (distance between the lower surface of the nozzle and the water level) was 38 mm. Hexane, hexene and ethylene as main raw materials were polymerized by a known method using a metallocene compound as the catalyst. Filaments of a mixture including the resulting ethylene/α-olefin copolymer (produced from the same raw materials as those of Example 1) and 20% by weight of an olefin block copolymer (polyolefin elastomer) were ejected downward from a nozzle at the extrusion rate of 22 kg/h at the melt temperature of 200° C. The lower ends of chutes were placed 39 mm below the nozzle surface and were submerged in water. A pair of stainless steel haul-off conveyors of 55 cm in width were placed parallel to each other across an opening width of 40 mm to be arranged partly above the water surface. The ejected filaments in the molten state were solidified on the chutes with supply of water heated to 29° C. The filaments were brought in contact with one another and were tangled to form loops, while being fused at the points of contact, so as to form a three-dimensional net-like structure. The respective surfaces of the net-like structure in the molten state were placed between the haul-off conveyors and were hauled off into warm water of 29° C. at the haul-off rate of 4.5 mm/sec to be solidified and flattened. The three-dimensional net-like structure was cut into a predetermined size and was subjected to dry heating process with the hot air of 60° C. for 5 minutes. This provided a three-dimensional net-like structure having the bulk density of 65 kg/m³. The resulting three-dimensional net-like structure was formed in a rectangular sectional shape from filaments of 0.8 to 1.5 mm in diameter and had the flattened surfaces, the bulk specific gravity of 65 kg/m³, the thickness of 50 mm, the width of 405 mm, the thermal expansion rates of 2.72% in the lateral direction and 3.04% in the longitudinal direction before and after the hot-air drying test at 90° C. for 5 minutes, the hysteresis loss of 29.1%, the impact resilience of 16 cm and the impact resilience change rate of 5.5% after the repeated load test. The temperature was 12° C., and the humidity was 45%.

Comparative Example 1

A net-like structure of a polyester thermoplastic elastomer manufactured by Toyobo Co., Ltd. (BREATHAIR (registered trademark)) (thickness of 45 mm and width of 400 mm) was examined by the above respective tests. The net-like structure had the bulk specific gravity of 40 kg/m³, the thermal expansion rates of −0.12% (contracted) in the lateral direction and −0.32% (contracted) in the longitudinal direction before and after the hot-air drying test at 130° C. for 5 minutes, the hysteresis loss of 70.4%, the impact resilience of 22 cm and the impact resilience change rate of 68.2% after the repeated load test.

Comparative Example 2

A net-like structure of a polyester thermoplastic elastomer manufactured by Toyobo Co., Ltd. (BREATHAIR (registered trademark)) (thickness of 25 mm and width of 400 mm) was examined by the above respective tests. The net-like structure had the bulk specific gravity of 50 kg/m³, the thermal expansion rates of −0.20% (contracted) in the lateral direction and −0.28% (contracted) in the longitudinal direction before and after the hot-air drying test at 130° C. for 5 minutes, the hysteresis loss of 81.0%, the impact resilience of 21 cm and the impact resilience change rate of 4.8% after the repeated load test.

Figure 24:
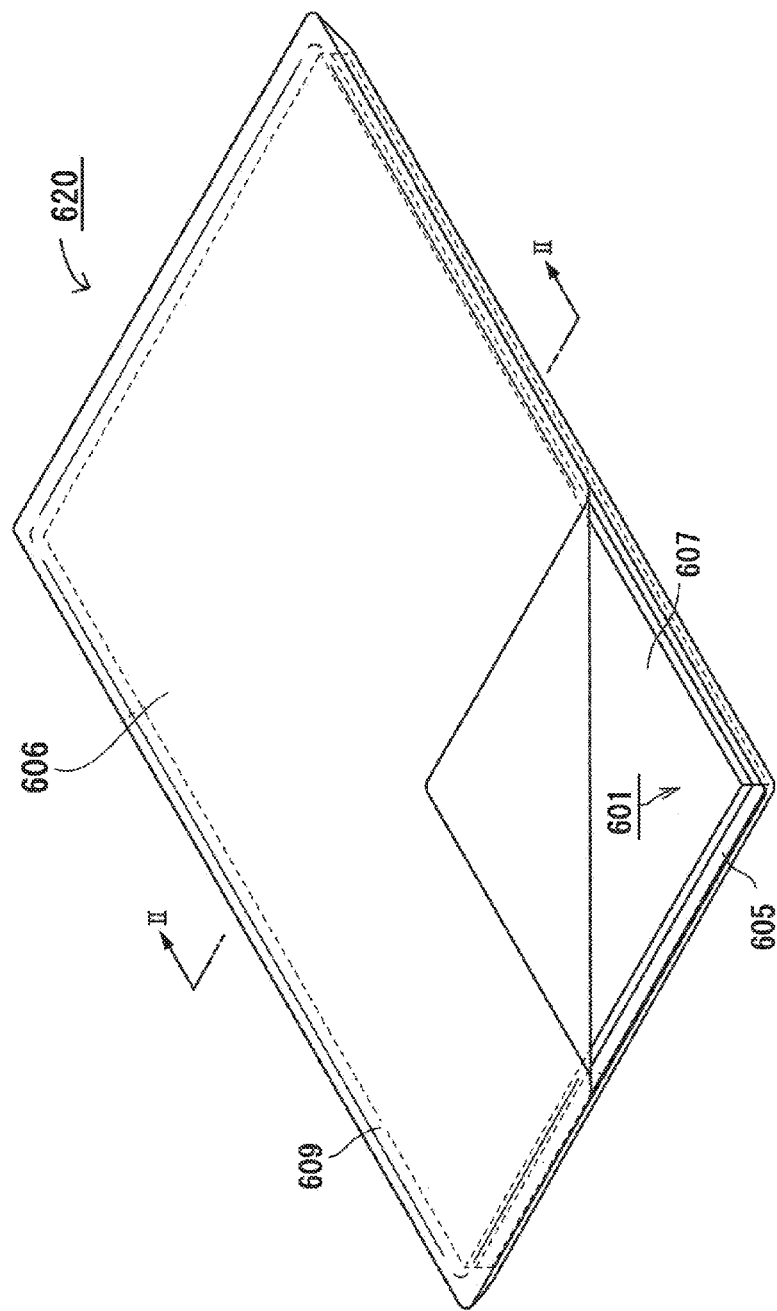
FIG. 24 is a perspective view illustrating a core material for cushion according to a sixteenth embodiment of the invention.
Figure 25:
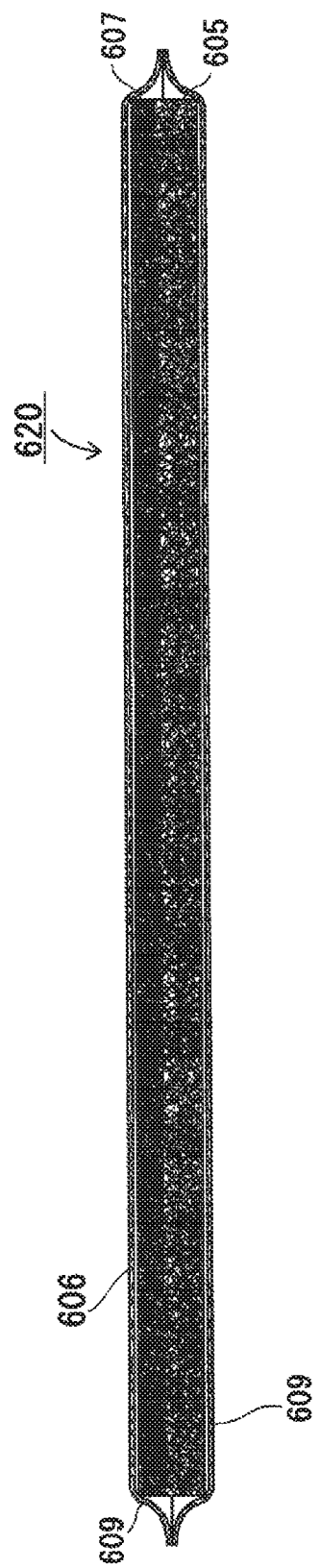
FIG. 25 is a II-II vertical sectional view illustrating the core material for cushion of the sixteenth embodiment of the invention.

A core material for cushion 601 according to a sixteenth embodiment is used to produce a cushion 620. As shown in FIGS. 24 and 25, a soft urethane foam 607 is stacked on a single face of a three-dimensional net-like structure layer 605 in a plate-like form that is made of or mainly made of a thermoplastic resin as a raw material and is formed by spirally tangling a plurality of filaments at random and partially bonding the tangles by heat.

The thermoplastic resin used for producing the three-dimensional net-like structure layer 605 is one or two or more selected from the group consisting of polyester elastomers and polyurethane elastomers. The above description regarding the layer 43 and the above description regarding the layer 45 are respectively applied to the polyester resin and to the polyester elastomer. The following describes the polyurethane elastomer.

The polyurethane elastomer may be any elastic polymer having urethane bond in the main chain. The polyurethane elastomer may be, for example, a block copolymer including a hard segment comprised of a diisocyanate and a glycol and a soft segment comprised of a polyester, a polyether, polycarbonate or an aliphatic polyol with a diisocyanate as appropriate. One or a mixture of two or more of polyurethane elastomers may be used. An antimicrobial, an incombustible material or a flame retardant may be mixed with the polyurethane elastomer as the raw material to provide a layer including the polyurethane elastomer with the corresponding function.

The soft urethane foam layer 697 has an open cell foam and/or continuous space. The soft urethane foam may be a generally called low-resilient urethane foam having impact resilience of lower than 25%, not higher than 20% or not higher than 15% or a filter foam having impact resilience of not lower than 25% or not lower than 30% and not higher than 40%, not higher than 60% or not higher than 85%. The impact resilience is measured in conformity with JIS K6400. The soft urethane foam may be a commercially available product such as Tempur (registered trademark) (manufactured by Tempur World Inc.), low-resilient foam EGR series (manufactured by INOAC CORPORATION), Moltofilter MF series (manufactured by INOAC CORPORATION), Moltofilter CF series (manufactured by INOAC CORPORATION), and Everlight series (manufactured by Bridgestone Corporation). An antimicrobial, an incombustible material or a flame retardant may be kneaded in the soft urethane foam or may be applied on the surface of the soft urethane foam to provide the corresponding functions. It is preferable to use filter foam having the impact resilience of not lower than 25% and not higher than 85% for the soft urethane foam, in terms of utilizing the repulsive force which the three-dimensional net-like structure on the lower layer intrinsically has and thereby providing the lying surface with adequate repulsive force, in addition to the softness.

The soft urethane foam layer 607 is roughly classified into polyether urethane foam and polyester urethane foam. Either of these urethane foams may be used, but polyether urethane foam is preferable in terms of unlikelihood of hydrolysis and water absorption.

The soft urethane foam layer 607 generally has the open cell foam size of not lower than 5 cells/25 mm and not higher than 40 cells/25 mm measured in conformity with JI K6400-1, Appendix 1. This range satisfies both the effect of uniformly warming the entire lying surface and the effect of providing soft and comfortable sleep. The more preferable upper limit is 30 cells/25 mm, and the furthermore preferable upper limit is 25 cells/25 mm.

The soft urethane foam layer 607 preferably has a thickness of 3 mm to 50 mm. The ratio of the thickness of the soft urethane foam layer 607 is generally set to ⅓ to ⅛ of the thickness of the three-dimensional net-like structure, but is not limited to this range. The soft urethane foam layer 607 is endless in the length direction and is cut in an adequate size (for example, 1800 mm to 2300 mm), although this is not restrictive.

In the core material for cushion 601 of this aspect, the three-dimensional net-like structure layer and the soft urethane foam may be bonded to each other, may be stitched to each other or may be simply stacked without bonding or stitching. The three-dimensional net-like structure layer and the soft urethane foam may be unified in an inner bag 609 or the like having high air permeability to be provided as a cushion 620 or may be integrated with a case by quilting.

Figure 26A:
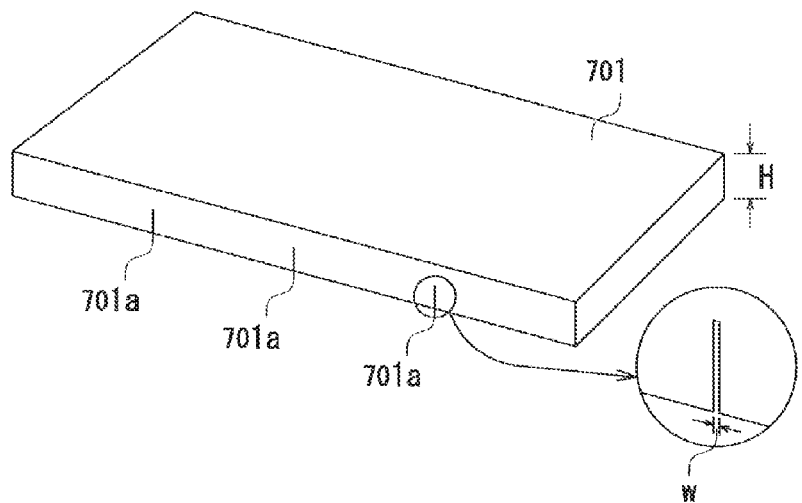
FIG. 26 is a perspective view illustrating a core material for cushion according to a seventeenth embodiment of the invention.
Figure 26B:
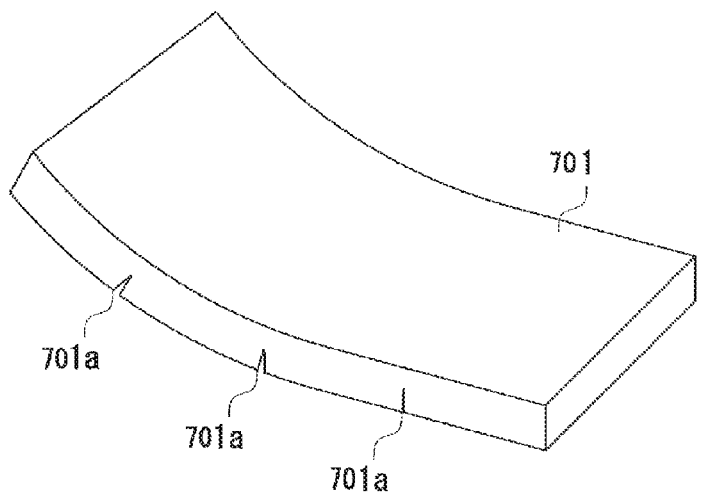
Figure 26C:
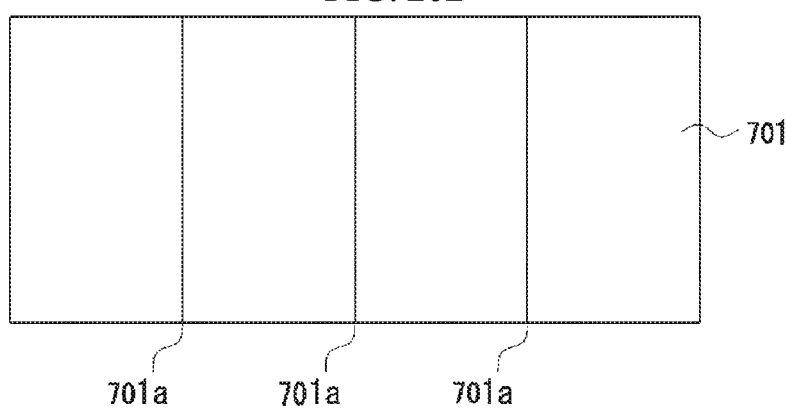

A core material for cushion 701 according to a seventeenth embodiment (shown in FIG. 26) has a plurality of continuous grooves 701a that are formed from the lower surface toward the upper surface of a three-dimensional net-like structure layer to pass through in the short side direction and are arranged at predetermined intervals along the longitudinal direction. The continuous grooves 701a are spread when the three-dimensional net-like structure is bent upward. A soft urethane foam stacked on the three-dimensional net-like structure layer is set to have such a thickness that allows the soft urethane foam to be bent upward accompanied by the upward bent of the three-dimensional net-like structure. This configuration provides non-separated, non-parted, one seamless cushion and eliminates troubles such as misalignment of cushion layers and unevenness of cushion layers. This core material for cushion 701 is applicable to a core material for reclining bed.

Figure 27A:
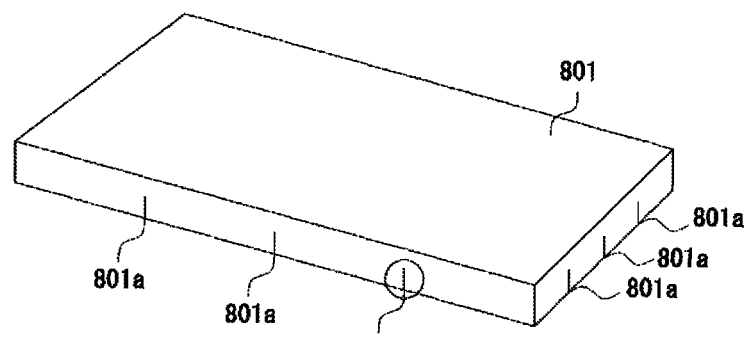
FIG. 27 is a perspective view illustrating a core material for cushion according to an eighteenth embodiment of the invention.
Figure 27B:
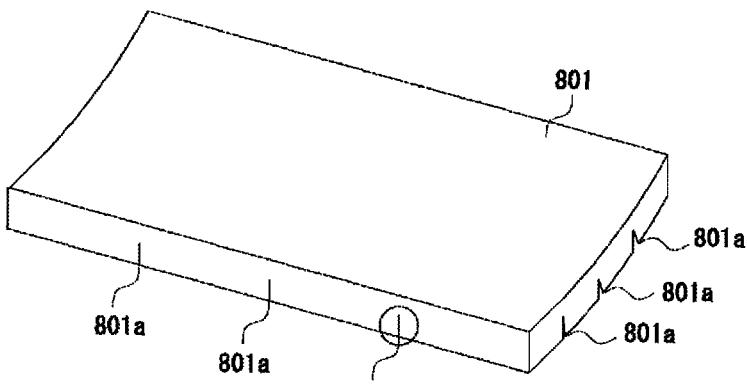

A core material for cushion 801 according to an eighteenth embodiment (shown in FIG. 27) is configured such that continuous grooves 801a are formed in all the four side faces of a three-dimensional net-like structure as shown in FIG. 27A. More specifically, continuous groves 801a are formed in lattice on the lower surface of the core material for cushion 801 to include a plurality of grooves that are formed to pass through in the short side direction and are arranged at predetermined intervals or adequate intervals in the longitudinal direction and a plurality of grooves that are formed from the lower surface toward the upper surface of the three-dimensional net-like structure to pass through in the longitudinal direction and are arranged at predetermined intervals or adequate intervals in the short side direction (shown in FIG. 27C). FIG. 27B illustrates a state that one side face out of the four side faces of the core material for cushion 801 is bent upward.

According to this embodiment, the continuous grooves 801a are formed in lattice on the lower surface of the core material for cushion 801. This configuration enables the core material for cushion 801 to be bent upward from any of the four side faces. For example, in an application that a floor cushion or the like is placed on the rear side of a mattress, the mattress may be bent such that the head to the back of a person lying on the mattress is lifted up or the mattress may be bent such that the body side of a person lying on the mattress is lifted up. An application of the core material for cushion to a conventional stationary bed achieves the similar effects to those of a reclining bed, for example, lifting up a leg portion or a backrest portion of the bed, as well as lifting up the right half or the left half of the body from the lying position.

Figure 27C:
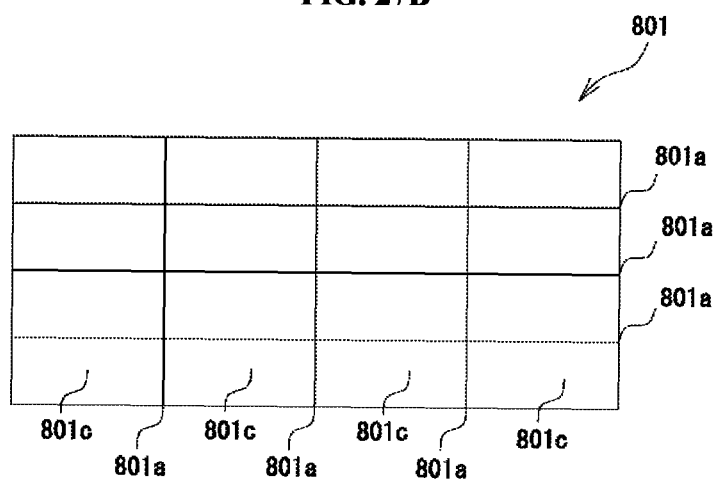
Figure 28A:
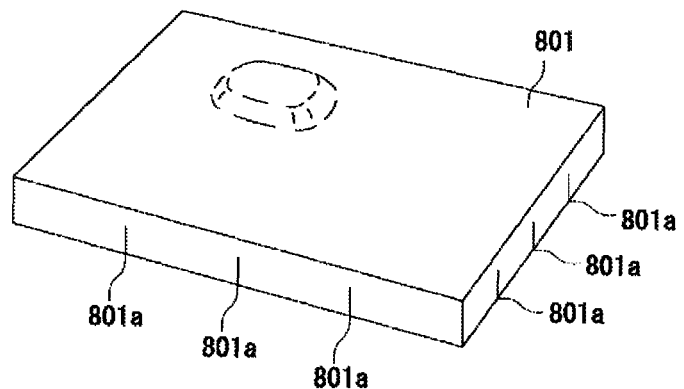
FIG. 28 is a diagram illustrating a method of using the core material for cushion of the eighteenth embodiment of the invention.
Figure 28B:
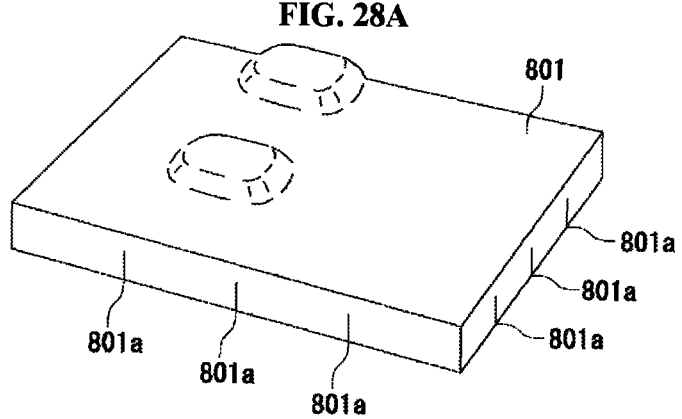
Figure 28C:
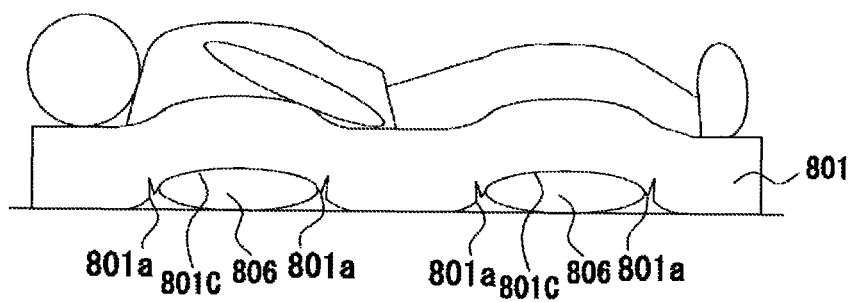

Additionally, according to this embodiment, forming the continuous grooves 801a on the lower surface of the core material for cushion 801 divides the lower surface of the core material for cushion 801 into a plurality of areas. According to this embodiment, as shown in FIG. 27C, the lower surface of the core material for cushion 801 is divided into sixteen to form sixteen blocks 801c. Placing a floor cushion 806 or the like in the block 801c enables only part of the core material for cushion 801 to be lifted up as shown in FIG. 28A. Additionally, a plurality of different places of the core material for cushion 801 may be lifted up as shown in FIG. 28B or FIG. 28C. This configuration provides the core material for cushion 801 which an elderly person, a disabled person or an injured or diseased person as well as a healthy person lies on in a comfortable position. This is useful to prevent congestion, bedsore, pressure sore and the like.

A mattress of the invention is provided by placing an air-permeable cover over the entire side facing the soft polyurethane foam of the core material for cushion. In the description hereof, the cover means a visible outer case. The air-permeable cover has the air permeability in the thickness direction (JIS-L-1096) of preferably not lower than 10 cc/cm$^2$/sec, more preferably not lower than 50 cc/cm$^2$/sec or furthermore preferably not lower than 100 cc/cm$^2$/sec. The air-permeable cover is, however, not limited to those having this property but may be a bag made of a conventionally used fabric or material such as cotton or polyester or a quilt material by quilting thin double raschel fabric of cotton or polyester. The air-permeable cover may be configured by using different material for the lying surface and the other surfaces. For example, the lying surface may be formed from a three-dimensional double raschel knit that has low skin irritancy and high air permeability and allows the user to directly lie on. The surfaces other than the lying surface may be coated with a quilt cover material. The peripheral edge of the three-dimensional knit and the cover material may be stitched to each other. This takes advantage of the excellent air permeability of the core material for cushion placed inside.

A mattress suitable for medical care is provided by placing a water-impermeable cover over the entire side of the core material for cushion facing the soft polyurethane foam. The water-impermeable cover is a cover made of, for example, artificial leather, polyvinyl chloride, water-repellent polyurethane sheet, nylon taffeta or polyester taffeta. The water-impermeable cover may be configured by making the lying surface and the other surfaces from different materials and stitching the boundaries of these surfaces.

The above description regarding the method of manufacturing the core material for cushion is applied to this embodiment.

Figure 29:
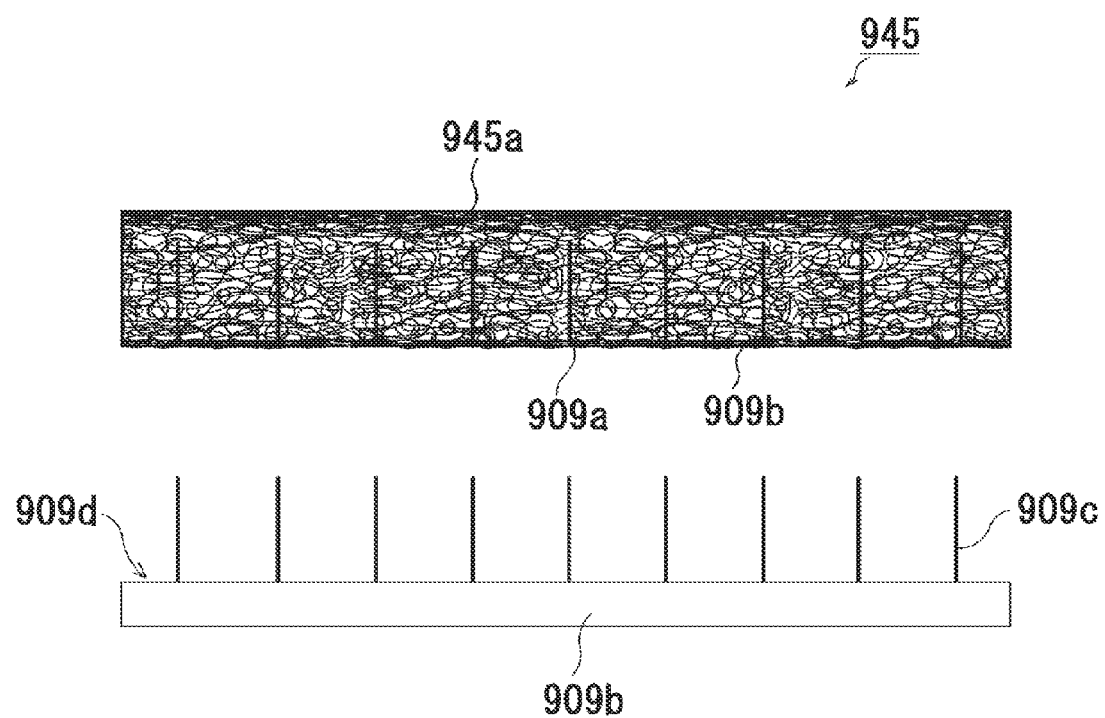
FIG. 29 is a diagram illustrating a method of forming a continuous groove.

In the process of cutting the three-dimensional net-like structure manufactured as described above by melting means such as a hot plate, a hot wire, an ultrasonic knife, an ultrasonic cutter or the like, the cut surface may be flattened or a continuous groove may be formed. As shown in FIG. 29, the continuous groove may be formed by a procedure using a hot plate 909d formed by coupling thin plates 909c perpendicularly with an iron plate 909b. This procedure presses the thin plates 909c into a surface layer 945a at right angles and pulls out the hot plate 909d after forcible cooling or natural cooling. Forming the continuous groove with heat or ultrasonic wave fuses the cut surface to increase the strength and close the gap at the edge. This advantageously prevents invasion of water and microorganisms even in an application using hollow filaments.

The invention is not limited to the above embodiments but various modifications, changes and additions may be made to the embodiments without departing from the scope of the invention. Such modifications as well as their equivalents are also included in the scope of the invention.

REFERENCE SIGNS LIST 1 core material for cushion
41 three-dimensional net-like structure
43, 45 layer
2 core material for cushion
3 core material for cushion
4 core material for cushion
4A, 4B cavity
5 core material for cushion
5A, 5B cavity
5C, 5D recycled member
6 core material for cushion
6A, 6B, 6C high-density area
7 core material for cushion
8 core material for cushion
8A high-density area
9 core material for cushion
9A sheet
75a slit (linear through groove)
10, 50, 110, 210, 510 apparatus for manufacturing core material for cushion
11 extrusion molding machine
12, 13 endless belt
12a, 13a endless chain
14, 15 endless conveyor
16 drive motor 17 transmission
18 water tank
19 controller
20 plate member
22 clearance
23 belt
24 convex shape
25 concave shape
26 jagged shape
27 concavo-convex shape
14a, 14c, 15a, 15c sprocket drive shaft
14, 14d, 15b, 15d driven shaft
21 filament assembly
H water level
36 chute
37a, 37b inclined plane
31 container
32 material feed port
33 die
34 nozzle
20 filament
38 water supply port
21 filament assembly
39 water supply port
38 supply pipe
50 manufacturing apparatus
54a, 55a rotating shaft
54, 55 endless conveyor
56a, 57a rotating shaft
56, 57 roll
54b, 54c bevel gear
56b, 57b bevel gear
M motor
58a, 58b bearing
59a, 59b endless conveyor
66, 67 roll
64a, 65a rotating shaft
64, 65 endless conveyor
66a, 67a rotating shaft
66, 67 roll
68a, 68b bearing
69a, 69b chute
71 nozzle
72 nozzle
74a to 74c slit (linear through hole)
74 nozzle
75a slit (linear through hole)
75 nozzle
76a slit (linear through hole)
76 nozzle
H hole
77c, 77d area
77a, 77b guide member (e.g., pipe)
77 nozzle
96 projection
101 core material for cushion
101a inner area
101b outer area
102 core material for cushion
102a inner area
102b outer area
103 core material for cushion
103a inner area
103b outer area
104 core material for cushion
104c cavity
104a inner area
104b outer area
105 core material for cushion
105a, 105b, 105c area
106 core material for cushion
106a, 106b area
701 core material for cushion
701a continuous groove
801 core material for cushion
801a continuous groove
801c block
806 floor cushion
909b iron plate
909c thin plate
909d hot plate
945a surface layer

The invention claimed is:

1. A core material for cushion comprising a three-dimensional net-like structure in a plate-like form that is formed by spirally tangling a plurality of filaments, which are made of or mainly made of a thermoplastic resin as a raw material, at random and partially bonding the tangles by heat, wherein
the three-dimensional net-like structure has a first layer that includes a thermoplastic resin and a second layer that is stacked on a single surface or both surfaces of the first layer and includes a thermoplastic resin different from the thermoplastic resin of the first layer, wherein
the thermoplastic resin of the first layer has a higher melt temperature than the thermoplastic resin of the second layer,
the first layer or the second layer forms the three-dimensional net-like structure that has a longitudinal direction corresponding to an extrusion direction, a lateral direction and a thickness direction perpendicular to the extrusion direction and is comprised of a polyethylene thermoplastic resin, a polyester thermoplastic elastomer or a mixture of a polyethylene thermoplastic resin and a polyethylene thermoplastic elastomer, wherein
the three-dimensional net-like structure has an impact resilience of not lower than 13 cm, a hysteresis loss of not higher than 34% and not lower than 13%, and a thermal expansion rate of 0 to 8% in the longitudinal direction before and after a hot-air drying test that is performed at a temperature of 90° C. for 30 minutes with regard to the polyethylene thermoplastic resin, that is performed at a temperature of 130° C. for 30 minutes with regard to the polyester thermoplastic elastomer and that is performed at a temperature of 90° C. for 30 minutes with regard to the mixture of the polyethylene thermoplastic resin and the polyethylene thermoplastic elastomer.

2. The core material of claim 1, wherein the first layer includes a polyolefin resin, and the second layer includes a polyester elastomer and/or polyurethane elastomer.

3. The core material of claim 1, wherein the core material is substantially comprised of the three-dimensional net-like structure.

4. The core material of claim 2, wherein the layer including the polyolefin resin has a thickness of not less than 8 mm and less than 250 mm, and the layer including the polyester elastomer and/or polyurethane elastomer has a thickness of 3 mm to 160 mm.

5. A cushion, comprising the core material of claim 1, wherein at least a partial area on a side of the core material for cushion that faces the second layer is covered with an air-permeable cover.

6. A cushion for medical area, comprising the core material of claim 1, wherein at least a partial area on a side of the core material for cushion that faces the second layer is covered with a water-impermeable material.

7. The core material of claim 1, wherein the three-dimensional net-like structure has a thermal expansion rate of 0 to 8% in the lateral direction before and after the hot-air drying test that is performed at the temperature of 90° C. for 30 minutes with regard to the polyethylene thermoplastic resin, that is performed at the temperature of 130° C. for 30 minutes with regard to the polyester thermoplastic elastomer and that is performed at the temperature of 90° C. for 30 minutes with regard to the mixture of the polyethylene thermoplastic resin and the polyethylene thermoplastic elastomer.

8. The core material of claim 1, wherein the three-dimensional net-like structure has an anisotropic thermal expansion characteristic providing different thermal expansion rates in the longitudinal direction and in the lateral direction.

9. The core material of claim 1, wherein the three-dimensional net-like structure has an impact resilience change rate of not higher than 20% after a repeated load test.

10. The core material of claim 1, wherein the three-dimensional net-like structure has an apparent density of 0.025 g/cm3 to 0.2 g/cm3, a thickness of 5 mm to 500 mm in each layer and a filament diameter of 0.1 mm to 1.5 mm.

11. The core material of claim 1, wherein the polyethylene thermoplastic resin is selected from the group consisting of polyethylene, an ethylene/α-olefin copolymer resin that is mainly made of ethylene and an α-olefin containing 3 or more carbon atoms, and an ethylene/vinyl acetate copolymer resin.

12. The core material of claim 1, wherein the mixture of the polyethylene thermoplastic resin and the polyethylene thermoplastic elastomer is a mixture of an ethylene/α-olefin copolymer resin, which is mainly made of ethylene and an α-olefin containing 3 or more carbon atoms, and the polyethylene thermoplastic elastomer, and a content of the polyethylene thermoplastic elastomer in the mixture is not higher than 45% in weight ratio.

13. The core material of claim 1, the core material for cushion has a plurality of surfaces, among which two surface, three surfaces or four surfaces are molded, and has multiple layers having different bulk densities.

* * * * *